US012723942B2

(12) United States Patent
Yeung et al.

(10) Patent No.: US 12,723,942 B2
(45) Date of Patent: Sep. 1, 2026

(54) FUEL, COMMUNICATIONS, AND POWER CONNECTION SYSTEMS AND RELATED METHODS

(71) Applicant: BJ Energy Solutions, LLC

(72) Inventors: Tony Yeung, The Woodlands, TX (US); Ricardo Rodriguez-Ramon, The Woodlands, TX (US); Patrick Thomson, The Woodlands, TX (US)

(73) Assignee: BJ Energy Solutions, LLC, The Woodlands, TX (US)

( * ) Notice: Subject to any disclaimer, the term of this patent is extended or adjusted under 35 U.S.C. 154(b) by 0 days.

(21) Appl. No.: 19/093,060

(22) Filed: Mar. 27, 2025

(65) Prior Publication Data

US 2025/0224301 A1 Jul. 10, 2025

Related U.S. Application Data

(60) Continuation of application No. 18/213,468, filed on Jun. 23, 2023, now Pat. No. 12,276,577, which is a (Continued)

(51) Int. Cl.
*G01M 3/28* (2006.01)
*E21B 34/08* (2006.01)
(Continued)

(52) U.S. Cl.
CPC ........... *G01M 3/2815* (2013.01); *E21B 34/08* (2013.01); *E21B 43/2607* (2020.05); (Continued)

(58) Field of Classification Search
CPC ....... G01M 3/2815; G01M 3/26; E21B 34/08; E21B 43/2607; E21B 43/267; (Continued)

(56) References Cited

U.S. PATENT DOCUMENTS 1,716,049 A 6/1929 Greve
1,726,633 A 9/1929 Smith
(Continued)

FOREIGN PATENT DOCUMENTS

CN 205805471 U 12/2016
CN 205858306 U 1/2017
(Continued)

OTHER PUBLICATIONS

Gladstein: "High Horsepower HHP Summit 2012," Review of HHP Summit 2012, Gladstein, Neandross & Associates, Sep. 26-28, 2012, 4 Pages, Retrieved from URL: https://www.gladstein.orgigna-conferences/high-horsepower-summit-2012/.
(Continued)

*Primary Examiner* — James G Sayre
(74) *Attorney, Agent, or Firm* — Norton Rose Fulbright US LLP

(57) ABSTRACT

Embodiments of systems and methods for supplying fuel, enabling communications, and conveying electric power associated with operation of a hydraulic fracturing unit of a plurality of hydraulic fracturing units are disclosed and may include a fuel line connection assembly configured to be connected to the first hydraulic fracturing unit and to supply fuel from a fuel source to a gas turbine engine connected to the hydraulic fracturing unit. A system also may include a communications cable assembly configured to be connected to the hydraulic fracturing unit and to enable data communications between the hydraulic fracturing unit and a data center or another hydraulic fracturing unit. A system further may include a power cable assembly configured to be connected to the hydraulic fracturing unit and to convey electric power between the hydraulic fracturing unit and a remote electrical power source or the plurality of hydraulic fracturing units.

20 Claims, 18 Drawing Sheets

Related U.S. Application Data continuation of application No. 17/895,757, filed on Aug. 25, 2022, now Pat. No. 11,761,846, which is a continuation of application No. 17/717,328, filed on Apr. 11, 2022, now Pat. No. 11,460,368, which is a division of application No. 15/929,708, filed on May 18, 2020, now Pat. No. 11,604,113.

(60) Provisional application No. 62/704,401, filed on May 8, 2020, provisional application No. 62/900,100, filed on Sep. 13, 2019, provisional application No. 62/900,112, filed on Sep. 13, 2019.

(51) Int. Cl.

| | |
|---|---|
| ***E21B 43/26*** | (2006.01) |
| ***E21B 43/267*** | (2006.01) |
| ***E21B 47/12*** | (2012.01) |
| ***F02C 7/22*** | (2006.01) |
| ***F02C 9/28*** | (2006.01) |
| ***F02C 9/56*** | (2006.01) |
| ***G01M 3/26*** | (2006.01) |

(52) U.S. Cl.
CPC ............ *E21B 43/267* (2013.01); *E21B 47/12* (2013.01); *F02C 7/222* (2013.01); *F02C 9/28* (2013.01); *F02C 9/56* (2013.01); *G01M 3/26* (2013.01)

(58) Field of Classification Search
CPC .. E21B 47/12; F02C 7/222; F02C 9/28; F02C 9/56; F02C 7/22; F02C 7/32; F05D 2260/83
See application file for complete search history.

(56) References Cited

U.S. PATENT DOCUMENTS

| | | | |
|---|---|---|---|
| 2,178,662 | A | 11/1939 | Lars et al. |
| 2,427,638 | A | 9/1947 | Vilter et al. |
| 2,498,229 | A | 2/1950 | Adler |
| 2,535,703 | A | 12/1950 | Smith et al. |
| 2,572,711 | A | 10/1951 | Fischer |
| 2,820,341 | A | 1/1958 | Amann |
| 2,868,004 | A | 1/1959 | Runde |
| 2,940,377 | A | 6/1960 | Darnell et al. |
| 2,947,141 | A | 8/1960 | Russ |
| 2,956,738 | A | 10/1960 | Af et al. |
| 3,068,796 | A | 12/1962 | Pfluger et al. |
| 3,191,517 | A | 6/1965 | Solzman, I |
| 3,257,031 | A | 6/1966 | Dietz |
| 3,274,768 | A | 9/1966 | Hans-Christof et al. |
| 3,378,074 | A | 4/1968 | Kiel |
| 3,382,671 | A | 5/1968 | Ehni, III et al. |
| 3,401,873 | A | 9/1968 | Privon et al. |
| 3,463,612 | A | 8/1969 | Whitsel, Jr. et al. |
| 3,496,880 | A | 2/1970 | Wolff et al. |
| 3,550,696 | A | 12/1970 | Kenneday et al. |
| 3,560,053 | A | 2/1971 | Ortloff et al. |
| 3,586,459 | A | 6/1971 | Zerlauth et al. |
| 3,632,222 | A | 1/1972 | Cronstedt et al. |
| 3,656,582 | A | 4/1972 | Alcock et al. |
| 3,667,868 | A | 6/1972 | Brunner et al. |
| 3,692,434 | A | 9/1972 | Schnear et al. |
| 3,739,872 | A | 6/1973 | Mc et al. |
| 3,757,581 | A | 9/1973 | Mankin et al. |
| 3,759,063 | A | 9/1973 | Bendall et al. |
| 3,765,173 | A | 10/1973 | Harris et al. |
| 3,771,916 | A | 11/1973 | Flanigan et al. |
| 3,773,438 | A | 11/1973 | Hall et al. |
| 3,781,135 | A | 12/1973 | Nickell et al. |
| 3,786,835 | A | 1/1974 | Finger et al. |
| 3,791,682 | A | 2/1974 | Mitchell et al. |
| 3,796,045 | A | 3/1974 | Foster et al. |
| 3,814,549 | A | 6/1974 | Cronstedt et al. |
| 3,820,922 | A | 6/1974 | Buse et al. |
| 3,847,511 | A | 11/1974 | Cole et al. |
| 3,866,108 | A | 2/1975 | Yannone et al. |
| 3,875,380 | A | 4/1975 | Rankin |
| 3,963,372 | A | 6/1976 | Mclain et al. |
| 4,010,613 | A | 3/1977 | Mcinerney |
| 4,019,477 | A | 4/1977 | Overton |
| 4,031,407 | A | 6/1977 | Reed |
| 4,050,862 | A | 9/1977 | Buse |
| 4,059,045 | A | 11/1977 | Mcclain |
| 4,086,976 | A | 5/1978 | Holm et al. |
| 4,117,342 | A | 9/1978 | Melley, Jr. et al. |
| 4,173,121 | A | 11/1979 | Yu |
| 4,204,808 | A | 5/1980 | Clayton et al. |
| 4,209,079 | A | 6/1980 | Deschamps et al. |
| 4,209,979 | A | 7/1980 | Mattson et al. |
| 4,222,229 | A | 9/1980 | Uram |
| 4,239,396 | A | 12/1980 | Arribau et al. |
| 4,269,569 | A | 5/1981 | Hoover |
| 4,311,395 | A | 1/1982 | Douthitt et al. |
| 4,330,237 | A | 5/1982 | Battah |
| 4,341,508 | A | 7/1982 | Rambin, Jr. et al. |
| 4,357,027 | A | 11/1982 | Zeitlow |
| 4,383,478 | A | 5/1983 | Jones et al. |
| 4,402,504 | A | 9/1983 | Christian |
| 4,430,047 | A | 2/1984 | Ilg |
| 4,442,665 | A | 4/1984 | Fick et al. |
| 4,457,325 | A | 7/1984 | Green |
| 4,470,771 | A | 9/1984 | Hall et al. |
| 4,483,684 | A | 11/1984 | Black |
| 4,505,650 | A | 3/1985 | Hannett et al. |
| 4,574,880 | A | 3/1986 | Handke |
| 4,584,654 | A | 4/1986 | Crane |
| 4,620,330 | A | 11/1986 | Izzi, Sr. |
| 4,672,813 | A | 6/1987 | David |
| 4,754,607 | A | 7/1988 | Mackay |
| 4,782,244 | A | 11/1988 | Wakimoto |
| 4,796,777 | A | 1/1989 | Keller |
| 4,869,209 | A | 9/1989 | Young |
| 4,913,625 | A | 4/1990 | Gerlowski |
| 4,983,259 | A | 1/1991 | Duncan et al. |
| 4,990,058 | A | 2/1991 | Eslinger |
| 5,032,065 | A | 7/1991 | Yamamuro et al. |
| 5,135,361 | A | 8/1992 | Dion |
| 5,167,493 | A | 12/1992 | Kobari |
| 5,245,970 | A | 9/1993 | Iwaszkiewicz et al. |
| 5,291,842 | A | 3/1994 | Sallstrom et al. |
| 5,326,231 | A | 7/1994 | Pandeya et al. |
| 5,362,219 | A | 11/1994 | Paul et al. |
| 5,511,956 | A | 4/1996 | Hasegawa et al. |
| 5,537,813 | A | 7/1996 | Davis et al. |
| 5,553,514 | A | 9/1996 | Walkowc |
| 5,560,195 | A | 10/1996 | Anderson |
| 5,586,444 | A | 12/1996 | Fung |
| 5,622,245 | A | 4/1997 | Reik et al. |
| 5,626,103 | A | 5/1997 | Haws et al. |
| 5,634,777 | A | 6/1997 | Albertin et al. |
| 5,651,400 | A | 7/1997 | Corts et al. |
| 5,678,460 | A | 10/1997 | Walkowc |
| 5,717,172 | A | 2/1998 | Griffin, Jr. et al. |
| 5,720,598 | A | 2/1998 | De |
| 5,761,084 | A | 6/1998 | Edwards |
| 5,811,676 | A | 9/1998 | Spalding et al. |
| 5,839,888 | A | 11/1998 | Harrison |
| 5,846,062 | A | 12/1998 | Yanagisawa et al. |
| 5,875,744 | A | 3/1999 | Vallejos |
| 5,983,962 | A | 11/1999 | Gerardot |
| 5,992,944 | A | 11/1999 | Hara |
| 6,041,856 | A | 3/2000 | Thrasher et al. |
| 6,050,080 | A | 4/2000 | Horner |
| 6,067,962 | A | 5/2000 | Bartley et al. |
| 6,071,188 | A | 6/2000 | O'Neill et al. |
| 6,074,170 | A | 6/2000 | Bert et al. |
| 6,123,751 | A | 9/2000 | Nelson et al. |
| 6,129,335 | A | 10/2000 | Yokogi |
| 6,145,318 | A | 11/2000 | Kaplan et al. |
| 6,196,555 | B1 | 3/2001 | Gaibler |
| 6,230,481 | B1 | 5/2001 | Jahr |

(56) References Cited

U.S. PATENT DOCUMENTS 6,279,309 B1 8/2001 Lawlor et al.
6,321,860 B1 11/2001 Reddoch
6,334,746 B1 1/2002 Nguyen et al.
6,401,472 B2 6/2002 Pollrich et al.
6,530,224 B1 3/2003 Conchieri
6,543,395 B2 4/2003 Green
6,616,005 B1 9/2003 Pereira et al.
6,621,873 B1 9/2003 Lee et al.
6,655,922 B1 12/2003 Flek
6,669,453 B1 12/2003 Breeden et al.
6,672,606 B1 1/2004 Dwyer, Jr. et al.
6,765,304 B2 7/2004 Baten et al.
6,770,329 B2 8/2004 Ott et al.
6,786,051 B2 9/2004 Kristich et al.
6,801,394 B2 10/2004 Fritsch et al.
6,832,900 B2 12/2004 Leu
6,851,441 B2 2/2005 Wilson
6,851,514 B2 2/2005 Han et al.
6,859,740 B2 2/2005 Stephenson et al.
6,901,735 B2 6/2005 Lohn
6,962,057 B2 11/2005 Kurokawa et al.
7,007,966 B2 3/2006 Campion
7,047,747 B2 5/2006 Tanaka
7,065,953 B1 6/2006 Kopko
7,143,016 B1 11/2006 Discenzo et al.
7,222,015 B2 5/2007 Davis et al.
7,281,519 B2 10/2007 Schroeder et al.
7,388,303 B2 6/2008 Seiver
7,404,294 B2 7/2008 Sundin
7,442,239 B2 10/2008 Armstrong et al.
7,524,173 B2 4/2009 Cummins
7,545,130 B2 6/2009 Latham
7,552,903 B2 6/2009 Dunn et al.
7,563,076 B2 7/2009 Brunet et al.
7,563,413 B2 7/2009 Naets et al.
7,574,325 B2 8/2009 Dykstra
7,581,379 B2 9/2009 Yoshida et al.
7,594,424 B2 9/2009 Fazekas
7,614,239 B2 11/2009 Herzog et al.
7,627,416 B2 12/2009 Batenburg et al.
7,677,316 B2 3/2010 Butler et al.
7,721,521 B2 5/2010 Kunkle et al.
7,730,711 B2 6/2010 Kunkle et al.
7,779,961 B2 8/2010 Matte
7,789,452 B2 9/2010 Dempsey et al.
7,836,949 B2 11/2010 Dykstra
7,841,394 B2 11/2010 Mcneel et al.
7,845,413 B2 12/2010 Shampine et al.
7,861,679 B2 1/2011 Lemke et al.
7,886,702 B2 2/2011 Jerrell et al.
7,900,724 B2 3/2011 Promersberger et al.
7,921,914 B2 4/2011 Bruins et al.
7,938,151 B2 5/2011 Hoeckner
7,955,056 B2 6/2011 Pettersson
7,980,357 B2 7/2011 Edwards
8,056,635 B2 11/2011 Shampine et al.
8,083,504 B2 12/2011 Williams et al.
8,099,942 B2 1/2012 Alexander et al.
8,186,334 B2 5/2012 Ooyama
8,196,555 B2 6/2012 Ikeda et al.
8,202,354 B2 6/2012 Iijima
8,316,936 B2 11/2012 Roddy et al.
8,336,631 B2 12/2012 Shampine et al.
8,388,317 B2 3/2013 Sung
8,414,673 B2 4/2013 Raje et al.
8,469,826 B2 6/2013 Brosowske
8,500,215 B2 8/2013 Gastauer et al.
8,506,267 B2 8/2013 Gambier et al.
8,575,873 B2 11/2013 Peterson et al.
8,616,005 B1 12/2013 Cousino, Sr.
8,621,873 B2 1/2014 Robertson et al.
8,641,399 B2 2/2014 Mucibabic et al.
8,656,990 B2 2/2014 Kajaria et al.
8,672,606 B2 3/2014 Glynn et al.
8,707,853 B1 4/2014 Dille et al.
8,708,667 B2 4/2014 Collingborn
8,714,253 B2 5/2014 Sherwood et al.
8,757,918 B2 6/2014 Ramnarain et al.
8,763,583 B2 7/2014 Hofbauer et al.
8,770,329 B2 7/2014 Spitler
8,784,081 B1 7/2014 Blume
8,789,601 B2 7/2014 Broussard et al.
8,794,307 B2 8/2014 Coquilleau et al.
8,801,394 B2 8/2014 Anderson
8,851,186 B2 10/2014 Shampine et al.
8,851,441 B2 10/2014 Acuna et al.
8,894,356 B2 11/2014 Lafontaine et al.
8,905,056 B2 12/2014 Kendrick
8,951,019 B2 2/2015 Hains et al.
8,973,560 B2 3/2015 Krug
8,997,904 B2 4/2015 Cryer et al.
9,011,111 B2 4/2015 Lesko
9,016,383 B2 4/2015 Shampine et al.
9,032,620 B2 5/2015 Frassinelli et al.
9,057,247 B2 6/2015 Kumar et al.
9,097,249 B2 8/2015 Petersen
9,103,193 B2 8/2015 Coli et al.
9,121,257 B2 9/2015 Coli et al.
9,140,110 B2 9/2015 Coli et al.
9,175,810 B2 11/2015 Hains et al.
9,187,982 B2 * 11/2015 Dehring .............. E21B 43/2607
9,206,667 B2 12/2015 Khvoshchev et al.
9,212,643 B2 12/2015 Deliyski
9,222,346 B1 12/2015 Walls
9,324,049 B2 4/2016 Thomeer et al.
9,341,055 B2 5/2016 Weightman et al.
9,346,662 B2 5/2016 Van et al.
9,366,114 B2 6/2016 Coli et al.
9,376,786 B2 6/2016 Numasawa
9,394,829 B2 7/2016 Cabeen et al.
9,395,049 B2 7/2016 Vicknair et al.
9,401,670 B2 7/2016 Minato
9,410,410 B2 8/2016 Broussard et al.
9,410,546 B2 8/2016 Jaeger et al.
9,429,078 B1 8/2016 Crowe et al.
9,435,333 B2 9/2016 Mccoy et al.
9,488,169 B2 11/2016 Cochran et al.
9,493,997 B2 11/2016 Liu et al.
9,512,783 B2 12/2016 Veilleux, Jr. et al.
9,534,473 B2 1/2017 Morris et al.
9,546,652 B2 1/2017 Yin
9,550,501 B2 1/2017 Ledbetter et al.
9,556,721 B2 1/2017 Jang et al.
9,562,420 B2 2/2017 Morris et al.
9,570,945 B2 2/2017 Fischer
9,579,980 B2 2/2017 Cryer et al.
9,587,649 B2 3/2017 Oehring
9,593,710 B2 3/2017 Laimboeck et al.
9,611,728 B2 4/2017 Oehring
9,617,808 B2 4/2017 Liu et al.
9,638,101 B1 5/2017 Crowe et al.
9,638,194 B2 5/2017 Wiegman et al.
9,650,871 B2 5/2017 Oehring et al.
9,656,762 B2 5/2017 Kamath et al.
9,689,316 B1 6/2017 Crom
9,695,808 B2 7/2017 Giessbach et al.
9,739,130 B2 8/2017 Young
9,764,266 B1 9/2017 Carter
9,777,748 B2 10/2017 Lu et al.
9,803,467 B2 10/2017 Tang et al.
9,803,793 B2 10/2017 Davi et al.
9,809,308 B2 11/2017 Aguilar et al.
9,829,002 B2 11/2017 Crom
9,840,897 B2 12/2017 Larson
9,840,901 B2 12/2017 Oehring et al.
9,845,730 B2 12/2017 Betti et al.
9,850,422 B2 12/2017 Lestz et al.
9,856,131 B1 1/2018 Moffitt, Jr.
9,863,279 B2 1/2018 Laing et al.
9,869,305 B1 1/2018 Crowe et al.
9,871,406 B1 1/2018 Churnock et al.
9,879,609 B1 1/2018 Crowe et al.
RE46,725 E 2/2018 Case et al.
9,893,500 B2 2/2018 Oehring et al.

(56) References Cited

U.S. PATENT DOCUMENTS 9,893,660 B2 2/2018 Peterson et al.
9,897,003 B2 2/2018 Motakef et al.
9,920,615 B2 3/2018 Zhang et al.
9,945,365 B2 4/2018 Hernandez et al.
9,964,052 B2 5/2018 Millican et al.
9,970,278 B2 5/2018 Broussard et al.
9,981,840 B2 5/2018 Shock
9,995,102 B2 6/2018 Dille et al.
9,995,218 B2 6/2018 Oehring et al.
10,008,880 B2 6/2018 Vicknair et al.
10,008,912 B2 6/2018 Davey et al.
10,018,096 B2 7/2018 Wallimann et al.
10,020,711 B2 7/2018 Oehring et al.
10,024,123 B2 7/2018 Steffenhagen et al.
10,029,289 B2 7/2018 Wendorski et al.
10,030,579 B2 7/2018 Austin et al.
10,036,238 B2 7/2018 Oehring
10,040,541 B2 8/2018 Wilson et al.
10,060,293 B2 8/2018 Del
10,060,349 B2 8/2018 Morales et al.
10,077,933 B2 9/2018 Nelson et al.
10,082,137 B2 9/2018 Graham et al.
10,094,366 B2 10/2018 Marica
10,100,827 B2 10/2018 Devan et al.
10,107,084 B2 10/2018 Coli et al.
10,107,085 B2 10/2018 Coli et al.
10,114,061 B2 10/2018 Frampton et al.
10,119,381 B2 11/2018 Oehring et al.
10,125,750 B2 11/2018 Pfaff et al.
10,134,257 B2 11/2018 Zhang et al.
10,138,098 B2 11/2018 Sørensen et al.
10,151,244 B2 12/2018 Giancotti et al.
10,161,423 B2 12/2018 Rampen et al.
10,174,599 B2 1/2019 Shampine et al.
10,184,397 B2 1/2019 Austin et al.
10,196,258 B2 2/2019 Kalala et al.
10,221,856 B2 3/2019 Hernandez et al.
10,227,854 B2 3/2019 Glass
10,227,855 B2 3/2019 Coli et al.
10,246,984 B2 4/2019 Payne et al.
10,247,182 B2 4/2019 Zhang et al.
10,254,732 B2 4/2019 Oehring et al.
10,267,439 B2 4/2019 Pryce et al.
10,280,724 B2 5/2019 Hinderliter
10,287,943 B1 5/2019 Schiltz
10,288,519 B2 5/2019 De
10,303,190 B2 5/2019 Shock
10,305,350 B2 5/2019 Johnson et al.
10,316,832 B2 6/2019 Byrne
10,317,875 B2 6/2019 Pandurangan et al.
10,337,402 B2 7/2019 Austin et al.
10,358,035 B2 7/2019 Cryer et al.
10,371,012 B2 8/2019 Davis et al.
10,374,485 B2 8/2019 Morris et al.
10,378,326 B2 8/2019 Morris et al.
10,393,108 B2 8/2019 Chong et al.
10,407,990 B2 9/2019 Oehring et al.
10,408,031 B2 9/2019 Oehring et al.
10,415,348 B2 9/2019 Zhang et al.
10,415,557 B1 9/2019 Crowe et al.
10,415,562 B2 9/2019 Kajita et al.
RE47,695 E 11/2019 Case et al.
10,465,689 B2 11/2019 Crom
10,478,753 B1 11/2019 Elms et al.
10,526,882 B2 1/2020 Oehring et al.
10,563,649 B2 2/2020 Zhang et al.
10,577,910 B2 3/2020 Stephenson
10,584,645 B2 3/2020 Nakagawa et al.
10,590,867 B2 3/2020 Thomassin et al.
10,598,258 B2 3/2020 Oehring et al.
10,610,842 B2 4/2020 Chong
10,655,413 B2 5/2020 Brandsdal et al.
10,662,749 B1 5/2020 Hill et al.
10,711,787 B1 7/2020 Darley
10,738,580 B1 8/2020 Fischer et al.
10,753,153 B1 8/2020 Fischer et al.
10,753,165 B1 8/2020 Fischer et al.
10,760,556 B1 9/2020 Crom et al.
10,794,165 B2 10/2020 Fischer et al.
10,794,166 B2 10/2020 Reckels et al.
10,801,311 B1 10/2020 Cui et al.
10,815,764 B1 10/2020 Yeung et al.
10,815,978 B2 10/2020 Glass
10,830,032 B1 11/2020 Zhang et al.
10,830,225 B2 11/2020 Repaci
10,859,203 B1 12/2020 Cui et al.
10,864,487 B1 12/2020 Han et al.
10,865,624 B1 12/2020 Cui et al.
10,865,631 B1 12/2020 Zhang et al.
10,870,093 B1 12/2020 Zhong et al.
10,871,045 B2 12/2020 Fischer et al.
10,892,596 B2 1/2021 Enya et al.
10,895,202 B1 1/2021 Yeung et al.
10,900,475 B2 1/2021 Weightman et al.
10,907,459 B1 2/2021 Yeung et al.
10,927,774 B2 2/2021 Cai et al.
10,927,802 B2 2/2021 Oehring et al.
10,954,770 B1 3/2021 Yeung et al.
10,954,855 B1 3/2021 Ji et al.
10,961,614 B1 3/2021 Djavanroodi
10,961,908 B1 3/2021 Yeung et al.
10,961,912 B1 3/2021 Yeung et al.
10,961,914 B1 3/2021 Yeung et al.
10,961,993 B1 3/2021 Ji et al.
10,961,995 B2 3/2021 Mayorca
10,968,837 B1 4/2021 Yeung et al.
10,982,523 B1 4/2021 Hill et al.
10,989,019 B2 4/2021 Cai et al.
10,989,180 B2 4/2021 Yeung et al.
10,995,564 B2 5/2021 Miller et al.
11,002,189 B2 5/2021 Yeung et al.
11,008,950 B2 5/2021 Ethier et al.
11,015,423 B1 5/2021 Yeung et al.
11,015,536 B2 5/2021 Yeung et al.
11,015,594 B2 5/2021 Yeung et al.
11,022,526 B1 6/2021 Yeung et al.
11,028,677 B1 6/2021 Yeung et al.
11,035,213 B2 6/2021 Dusterhoft et al.
11,035,214 B2 6/2021 Cui et al.
11,047,379 B1 6/2021 Li et al.
11,053,853 B2 7/2021 Li et al.
11,060,455 B1 7/2021 Yeung et al.
11,066,915 B1 7/2021 Yeung et al.
11,068,455 B2 7/2021 Shabi et al.
11,085,281 B1 8/2021 Yeung et al.
11,085,282 B2 8/2021 Mazrooee et al.
11,092,152 B2 8/2021 Yeung et al.
11,098,651 B1 8/2021 Yeung et al.
11,105,250 B1 8/2021 Zhang et al.
11,105,266 B2 8/2021 Zhou et al.
11,109,508 B1 8/2021 Yeung et al.
11,111,768 B1 9/2021 Yeung et al.
11,125,066 B1 9/2021 Yeung et al.
11,125,156 B2 9/2021 Zhang et al.
11,129,295 B1 9/2021 Yeung et al.
11,143,000 B2 10/2021 Li et al.
11,143,005 B2 10/2021 Dusterhoft et al.
11,143,006 B1 10/2021 Zhang et al.
11,149,533 B1 10/2021 Yeung et al.
11,149,726 B1 10/2021 Yeung et al.
11,156,159 B1 10/2021 Yeung et al.
11,168,681 B2 11/2021 Boguski et al.
11,174,716 B1 11/2021 Yeung et al.
11,193,360 B1 12/2021 Yeung et al.
11,193,361 B1 12/2021 Yeung et al.
11,205,880 B1 12/2021 Zhou
11,205,881 B2 12/2021 Makino
11,208,879 B1 12/2021 Yeung et al.
11,208,953 B1 12/2021 Yeung et al.
11,220,895 B1 1/2022 Yeung et al.
11,236,739 B2 2/2022 Yeung et al.
11,242,737 B2 2/2022 Zhang et al.
11,243,509 B2 2/2022 Cai et al.
11,251,650 B1 2/2022 Liu et al.

(56) References Cited

U.S. PATENT DOCUMENTS 11,261,717 B2 3/2022 Yeung et al.
11,268,346 B2 3/2022 Yeung et al.
11,280,266 B2 3/2022 Yeung et al.
11,306,835 B1 4/2022 Dille et al.
RE49,083 E 5/2022 Case et al.
11,332,999 B1 5/2022 Eriksen et al.
11,339,638 B1 5/2022 Yeung et al.
11,346,200 B2 5/2022 Cai et al.
11,373,058 B2 6/2022 Jaaskelainen et al.
RE49,140 E 7/2022 Case et al.
11,377,943 B2 7/2022 Kriebel et al.
RE49,155 E 8/2022 Case et al.
RE49,156 E 8/2022 Case et al.
11,401,927 B2 8/2022 Li et al.
11,408,794 B2 8/2022 Yeung et al.
11,419,269 B2 8/2022 Oubre, Jr.
11,428,165 B2 8/2022 Yeung et al.
11,441,483 B2 9/2022 Li et al.
11,448,122 B2 9/2022 Feng et al.
11,460,368 B2 10/2022 Yeung et al.
11,466,680 B2 10/2022 Yeung et al.
11,480,040 B2 10/2022 Han et al.
11,492,887 B2 11/2022 Cui et al.
11,499,405 B2 11/2022 Zhang et al.
11,506,039 B2 11/2022 Zhang et al.
11,512,570 B2 11/2022 Yeung et al.
11,519,369 B1 12/2022 Dupre et al.
11,519,395 B2 12/2022 Zhang et al.
11,519,405 B2 12/2022 Deng et al.
11,530,602 B2 12/2022 Yeung et al.
11,549,349 B2 1/2023 Wang et al.
11,555,390 B2 1/2023 Cui et al.
11,555,756 B2 1/2023 Yeung et al.
11,557,887 B2 1/2023 Ji et al.
11,560,779 B2 1/2023 Mao et al.
11,560,845 B2 1/2023 Yeung et al.
11,572,775 B2 2/2023 Mao et al.
11,575,249 B2 2/2023 Ji et al.
11,592,020 B2 2/2023 Chang et al.
11,596,047 B2 2/2023 Liu et al.
11,598,263 B2 3/2023 Yeung et al.
11,603,797 B2 3/2023 Zhang et al.
11,604,113 B2 3/2023 Yeung et al.
11,607,982 B2 3/2023 Tian et al.
11,608,726 B2 3/2023 Zhang et al.
11,624,326 B2 4/2023 Yeung et al.
11,629,583 B2 4/2023 Yeung et al.
11,629,589 B2 4/2023 Lin et al.
11,649,766 B1 5/2023 Yeung et al.
11,662,384 B2 5/2023 Liu et al.
11,668,173 B2 6/2023 Zhang et al.
11,668,289 B2 6/2023 Chang et al.
11,677,238 B2 6/2023 Liu et al.
12,281,964 B2 4/2025 Yeung et al.
2002/0126922 A1 9/2002 Cheng et al.
2002/0197176 A1 12/2002 Kondo
2003/0031568 A1 2/2003 Stiefel
2003/0061819 A1 4/2003 Kuroki et al.
2003/0161212 A1 8/2003 Neal et al.
2004/0016245 A1 1/2004 Pierson
2004/0074238 A1 4/2004 Wantanabe et al.
2004/0076526 A1 4/2004 Fukano et al.
2004/0187950 A1 9/2004 Cohen et al.
2004/0219040 A1 11/2004 Kugelev et al.
2005/0051322 A1 3/2005 Speer
2005/0056081 A1 3/2005 Gocho
2005/0139286 A1 6/2005 Poulter et al.
2005/0196298 A1 9/2005 Manning
2005/0226754 A1 10/2005 Orr et al.
2005/0274134 A1 12/2005 Ryu et al.
2006/0061091 A1 3/2006 Osterloh
2006/0062914 A1 3/2006 Garg et al.
2006/0196251 A1 9/2006 Richey
2006/0211356 A1 9/2006 Grassman
2006/0228225 A1 10/2006 Rogers
2006/0260331 A1 11/2006 Andreychuk
2006/0272333 A1 12/2006 Sundin
2007/0029090 A1 2/2007 Andreychuk et al.
2007/0041848 A1 2/2007 Wood et al.
2007/0066406 A1 3/2007 Keller et al.
2007/0098580 A1 5/2007 Petersen
2007/0107981 A1 5/2007 Sicotte
2007/0125544 A1 6/2007 Robinson et al.
2007/0169543 A1 7/2007 Fazekas
2007/0181212 A1 8/2007 Fell
2007/0277982 A1* 12/2007 Shampine .............. E21B 43/25 166/308.1
2007/0295569 A1 12/2007 Manzoor et al.
2008/0006089 A1 1/2008 Adnan et al.
2008/0098891 A1 5/2008 Feher et al.
2008/0161974 A1 7/2008 Alston
2008/0212275 A1 9/2008 Waryck et al.
2008/0229757 A1 9/2008 Alexander et al.
2008/0264625 A1 10/2008 Ochoa
2008/0264649 A1 10/2008 Crawford
2008/0298982 A1 12/2008 Pabst et al.
2009/0064685 A1 3/2009 Busekros et al.
2009/0068031 A1 3/2009 Gambier et al.
2009/0092510 A1 4/2009 Williams et al.
2009/0124191 A1 5/2009 Van
2009/0178412 A1 7/2009 Spytek
2009/0212630 A1 8/2009 Flegel et al.
2009/0249794 A1 10/2009 Wilkes et al.
2009/0252616 A1 10/2009 Brunet et al.
2009/0308602 A1 12/2009 Bruins et al.
2010/0019626 A1 1/2010 Stout et al.
2010/0071899 A1 3/2010 Coquilleau et al.
2010/0218508 A1 9/2010 Brown et al.
2010/0300683 A1 12/2010 Looper et al.
2010/0310384 A1 12/2010 Stephenson et al.
2011/0041681 A1 2/2011 Duerr
2011/0052423 A1 3/2011 Gambier et al.
2011/0054704 A1 3/2011 Karpman et al.
2011/0085924 A1 4/2011 Shampine et al.
2011/0146244 A1 6/2011 Farman et al.
2011/0146246 A1 6/2011 Farman et al.
2011/0173991 A1 7/2011 Dean et al.
2011/0197988 A1 8/2011 Van et al.
2011/0241888 A1 10/2011 Lu et al.
2011/0265443 A1 11/2011 Ansari et al.
2011/0272158 A1 11/2011 Neal
2012/0023973 A1 2/2012 Mayorca
2012/0048242 A1 3/2012 Surnilla et al.
2012/0085541 A1 4/2012 Love et al.
2012/0137699 A1 6/2012 Montagne et al.
2012/0179444 A1 7/2012 Ganguly et al.
2012/0192542 A1 8/2012 Chillar et al.
2012/0199001 A1 8/2012 Chillar et al.
2012/0204627 A1 8/2012 Anderl et al.
2012/0255734 A1 10/2012 Coli et al.
2012/0310509 A1 12/2012 Pardo et al.
2012/0324903 A1 12/2012 Dewis et al.
2013/0068307 A1 3/2013 Hains et al.
2013/0087045 A1 4/2013 Sullivan et al.
2013/0087945 A1 4/2013 Kusters et al.
2013/0134702 A1 5/2013 Boraas et al.
2013/0189915 A1 7/2013 Hazard
2013/0205798 A1 8/2013 Kwok et al.
2013/0233165 A1 9/2013 Matzner et al.
2013/0255953 A1 10/2013 Tudor
2013/0259707 A1 10/2013 Yin
2013/0284455 A1 10/2013 Kajaria et al.
2013/0300341 A1 11/2013 Gillette, II
2013/0306322 A1 11/2013 Sanborn et al.
2014/0000668 A1 1/2014 Lessard
2014/0010671 A1 1/2014 Cryer et al.
2014/0013768 A1 1/2014 Laing et al.
2014/0032082 A1 1/2014 Gehrke et al.
2014/0044517 A1 2/2014 Saha et al.
2014/0048253 A1 2/2014 Andreychuk
2014/0090729 A1 4/2014 Coulter et al.
2014/0090742 A1 4/2014 Coskrey et al.
2014/0094105 A1 4/2014 Lundh et al.
2014/0095114 A1 4/2014 Thomeer et al.

(56) References Cited

U.S. PATENT DOCUMENTS

2014/0095554 A1 4/2014 Thomeer et al.
2014/0123621 A1 5/2014 Driessens et al.
2014/0130422 A1 5/2014 Laing et al.
2014/0138079 A1 5/2014 Broussard et al.
2014/0144641 A1 5/2014 Chandler
2014/0147291 A1 5/2014 Burnette
2014/0158345 A1 6/2014 Jang et al.
2014/0174097 A1 6/2014 Hammer et al.
2014/0196459 A1 7/2014 Futa et al.
2014/0216736 A1 8/2014 Leugemors et al.
2014/0219824 A1 8/2014 Burnette
2014/0250845 A1 9/2014 Jackson et al.
2014/0251623 A1 9/2014 Lestz et al.
2014/0277772 A1 9/2014 Lopez et al.
2014/0290266 A1 10/2014 Veilleux, Jr. et al.
2014/0318638 A1 10/2014 Harwood et al.
2014/0322050 A1 10/2014 Marette et al.
2015/0027730 A1 1/2015 Hall et al.
2015/0078924 A1 3/2015 Zhang et al.
2015/0101344 A1 4/2015 Jarrier et al.
2015/0114652 A1 4/2015 Lestz et al.
2015/0129210 A1 5/2015 Chong et al.
2015/0135659 A1 5/2015 Jarrier et al.
2015/0159553 A1 6/2015 Kippel et al.
2015/0192117 A1 7/2015 Bridges
2015/0204148 A1 7/2015 Liu et al.
2015/0204322 A1 7/2015 Iund et al.
2015/0211512 A1 7/2015 Wiegman et al.
2015/0214816 A1 7/2015 Raad
2015/0217672 A1 8/2015 Shampine et al.
2015/0226140 A1 8/2015 Zhang et al.
2015/0252661 A1 9/2015 Glass
2015/0275891 A1 10/2015 Chong
2015/0337730 A1 11/2015 Kupiszewski et al.
2015/0340864 A1 11/2015 Compton
2015/0345385 A1 12/2015 Santini
2015/0369351 A1 12/2015 Hermann et al.
2016/0032703 A1 2/2016 Broussard et al.
2016/0032836 A1 2/2016 Hawkinson et al.
2016/0076447 A1 3/2016 Merlo et al.
2016/0102581 A1 4/2016 Del
2016/0105022 A1 4/2016 Oehring et al.
2016/0108713 A1 4/2016 Dunaeva et al.
2016/0123185 A1 5/2016 Le et al.
2016/0168979 A1 6/2016 Zhang et al.
2016/0177675 A1 6/2016 Morris et al.
2016/0177945 A1 6/2016 Byrne et al.
2016/0186671 A1 6/2016 Austin et al.
2016/0195082 A1 7/2016 Wiegman et al.
2016/0215774 A1 7/2016 Oklejas et al.
2016/0230525 A1 8/2016 Lestz et al.
2016/0244314 A1 8/2016 Van et al.
2016/0248230 A1 8/2016 Tawy et al.
2016/0253634 A1 9/2016 Thomeer et al.
2016/0258267 A1 9/2016 Payne et al.
2016/0273328 A1 9/2016 Oehring
2016/0273346 A1 9/2016 Tang et al.
2016/0290114 A1 10/2016 Oehring et al.
2016/0319650 A1 11/2016 Oehring et al.
2016/0326845 A1 11/2016 Djikpesse et al.
2016/0348479 A1 12/2016 Oehring et al.
2016/0369609 A1 12/2016 Morris et al.
2017/0009905 A1 1/2017 Arnold
2017/0016433 A1 1/2017 Chong et al.
2017/0030177 A1 2/2017 Oehring et al.
2017/0038137 A1 2/2017 Turney
2017/0045055 A1 2/2017 Hoefel et al.
2017/0052087 A1 2/2017 Faqihi et al.
2017/0074074 A1 3/2017 Joseph et al.
2017/0074076 A1 3/2017 Joseph et al.
2017/0074089 A1 3/2017 Agarwal et al.
2017/0082110 A1 3/2017 Lammers
2017/0089189 A1 3/2017 Norris et al.
2017/0114613 A1 4/2017 Lecerf et al.
2017/0114625 A1 4/2017 Norris et al.
2017/0122310 A1 5/2017 Ladrón
2017/0131174 A1 5/2017 Enev et al.
2017/0145918 A1 5/2017 Oehring et al.
2017/0191350 A1 7/2017 Johns et al.
2017/0218727 A1 8/2017 Oehring et al.
2017/0226839 A1 8/2017 Broussard et al.
2017/0226842 A1 8/2017 Omont et al.
2017/0226998 A1 8/2017 Zhang et al.
2017/0227002 A1 8/2017 Mikulski et al.
2017/0233103 A1 8/2017 Teicholz et al.
2017/0234165 A1 8/2017 Kersey et al.
2017/0234308 A1 8/2017 Buckley
2017/0241336 A1 8/2017 Jones et al.
2017/0241671 A1 8/2017 Ahmad
2017/0248034 A1 8/2017 Dzieciol et al.
2017/0248208 A1 8/2017 Tamura
2017/0248308 A1 8/2017 Makarychev-Mikhailov et al.
2017/0275149 A1 9/2017 Schmidt
2017/0288400 A1 10/2017 Williams
2017/0292409 A1 10/2017 Aguilar et al.
2017/0302135 A1 10/2017 Cory
2017/0305736 A1 10/2017 Haile et al.
2017/0306847 A1 10/2017 Suciu et al.
2017/0306936 A1 10/2017 Dole et al.
2017/0322086 A1 11/2017 Luharuka et al.
2017/0333086 A1 11/2017 Jackson
2017/0334448 A1 11/2017 Schwunk
2017/0335842 A1 11/2017 Robinson et al.
2017/0350471 A1 12/2017 Steidl et al.
2017/0356470 A1 12/2017 Jaffrey
2017/0370199 A1 12/2017 Witkowski et al.
2017/0370480 A1 12/2017 Witkowski et al.
2018/0034280 A1 2/2018 Pedersen
2018/0038216 A1 2/2018 Zhang et al.
2018/0038328 A1 2/2018 Louven et al.
2018/0041093 A1 2/2018 Miranda
2018/0042087 A1 2/2018 Keating
2018/0045202 A1 2/2018 Crom
2018/0058171 A1 3/2018 Roesner et al.
2018/0087499 A1 3/2018 Zhang et al.
2018/0087996 A1 3/2018 De
2018/0156210 A1 6/2018 Oehring et al.
2018/0172294 A1 6/2018 Owen
2018/0183219 A1 6/2018 Oehring et al.
2018/0186442 A1 7/2018 Maier
2018/0187662 A1 7/2018 Hill et al.
2018/0209415 A1 7/2018 Zhang et al.
2018/0223640 A1 8/2018 Keihany et al.
2018/0224044 A1 8/2018 Penney et al.
2018/0229998 A1 8/2018 Shock
2018/0258746 A1 9/2018 Broussard et al.
2018/0266412 A1 9/2018 Stokkevåg et al.
2018/0278124 A1 9/2018 Oehring et al.
2018/0283102 A1 10/2018 Cook
2018/0283618 A1 10/2018 Cook
2018/0284817 A1 10/2018 Cook et al.
2018/0290877 A1 10/2018 Shock
2018/0291781 A1 10/2018 Pedrini
2018/0298731 A1 10/2018 Bishop
2018/0298735 A1 10/2018 Conrad
2018/0307255 A1 10/2018 Bishop
2018/0313456 A1 11/2018 Bayyouk et al.
2018/0328157 A1 11/2018 Bishop
2018/0334893 A1 11/2018 Oehring
2018/0363435 A1 12/2018 Coli et al.
2018/0363436 A1 12/2018 Coli et al.
2018/0363437 A1 12/2018 Coli et al.
2018/0363438 A1 12/2018 Coli et al.
2019/0003272 A1 1/2019 Morris et al.
2019/0003329 A1 1/2019 Morris et al.
2019/0010793 A1 1/2019 Hinderliter
2019/0011051 A1 1/2019 Yeung
2019/0048993 A1 2/2019 Akiyama et al.
2019/0063263 A1 2/2019 Davis et al.
2019/0063341 A1 2/2019 Davis
2019/0067991 A1 2/2019 Davis et al.
2019/0071992 A1 3/2019 Feng
2019/0072005 A1 3/2019 Fisher et al.
2019/0078471 A1 3/2019 Braglia et al.

(56) References Cited

U.S. PATENT DOCUMENTS

2019/0088845 A1 3/2019 Sugi et al.
2019/0091619 A1 3/2019 Huang
2019/0106316 A1 4/2019 Van et al.
2019/0106970 A1 4/2019 Oehring
2019/0112908 A1 4/2019 Coli et al.
2019/0112910 A1 4/2019 Oehring et al.
2019/0119096 A1 4/2019 Haile et al.
2019/0120024 A1 4/2019 Oehring et al.
2019/0120031 A1 4/2019 Gilje
2019/0120134 A1 4/2019 Goleczka et al.
2019/0128247 A1 5/2019 Douglas, III
2019/0128288 A1 5/2019 Konada et al.
2019/0131607 A1 5/2019 Gillette
2019/0136677 A1 5/2019 Shampine et al.
2019/0153843 A1 5/2019 Headrick
2019/0153938 A1 5/2019 Hammoud
2019/0154020 A1 5/2019 Glass
2019/0155318 A1 5/2019 Meunier
2019/0178234 A1 6/2019 Beisel
2019/0178235 A1 6/2019 Coskrey et al.
2019/0185312 A1 6/2019 Bush et al.
2019/0203572 A1 7/2019 Morris et al.
2019/0204021 A1 7/2019 Morris et al.
2019/0211661 A1 7/2019 Reckels et al.
2019/0211814 A1 7/2019 Weightman et al.
2019/0217258 A1 7/2019 Bishop
2019/0226317 A1 7/2019 Payne et al.
2019/0245348 A1 8/2019 Hinderliter et al.
2019/0249652 A1 8/2019 Stephenson et al.
2019/0249754 A1 8/2019 Oehring et al.
2019/0257297 A1 8/2019 Botting et al.
2019/0264667 A1 8/2019 Byrne
2019/0277279 A1 9/2019 Byrne et al.
2019/0277295 A1 9/2019 Clyburn et al.
2019/0309585 A1 10/2019 Miller et al.
2019/0316447 A1 10/2019 Oehring et al.
2019/0316456 A1 10/2019 Beisel et al.
2019/0323337 A1 10/2019 Glass et al.
2019/0330923 A1 10/2019 Gable et al.
2019/0331117 A1 10/2019 Gable et al.
2019/0337392 A1 11/2019 Joshi et al.
2019/0338762 A1 11/2019 Curry et al.
2019/0345920 A1 11/2019 Surjaatmadja et al.
2019/0353103 A1 11/2019 Roberge
2019/0356199 A1 11/2019 Morris et al.
2019/0376449 A1 12/2019 Carrell
2019/0383123 A1 12/2019 Hinderliter
2020/0003205 A1 1/2020 Stokkevåg et al.
2020/0011165 A1 1/2020 George et al.
2020/0040878 A1 2/2020 Morris
2020/0049136 A1 2/2020 Stephenson
2020/0049153 A1 2/2020 Headrick et al.
2020/0071998 A1 3/2020 Oehring et al.
2020/0072201 A1 3/2020 Marica
2020/0088202 A1 3/2020 Sigmar et al.
2020/0095854 A1 3/2020 Hinderliter
2020/0109610 A1 4/2020 Husøy et al.
2020/0109616 A1 4/2020 Oehring et al.
2020/0132058 A1 4/2020 Mollatt
2020/0141219 A1 5/2020 Oehring et al.
2020/0141326 A1 5/2020 Redford et al.
2020/0141907 A1 5/2020 Meck et al.
2020/0166026 A1 5/2020 Marica
2020/0206704 A1 7/2020 Chong
2020/0208733 A1 7/2020 Kim
2020/0223648 A1 7/2020 Herman et al.
2020/0224645 A1 7/2020 Buckley
2020/0232454 A1 7/2020 Chretien et al.
2020/0256333 A1 8/2020 Surjaatmadja et al.
2020/0263498 A1 8/2020 Fischer et al.
2020/0263525 A1 8/2020 Reid et al.
2020/0263526 A1 8/2020 Fischer et al.
2020/0263527 A1 8/2020 Fischer et al.
2020/0263528 A1 8/2020 Fischer et al.
2020/0267888 A1 8/2020 Putz
2020/0291731 A1 9/2020 Haiderer et al.
2020/0295574 A1 9/2020 Batsch-Smith
2020/0300050 A1 9/2020 Oehring et al.
2020/0309027 A1 10/2020 Rytkönen
2020/0309113 A1 10/2020 Hunter et al.
2020/0325752 A1 10/2020 Clark et al.
2020/0325760 A1 10/2020 Markham
2020/0325761 A1 10/2020 Williams
2020/0325791 A1 10/2020 Himmelmann
2020/0325893 A1 10/2020 Kraige et al.
2020/0332784 A1 10/2020 Zhang et al.
2020/0332788 A1 10/2020 Cui et al.
2020/0340313 A1 10/2020 Fischer et al.
2020/0340322 A1 10/2020 Sizemore et al.
2020/0340340 A1 10/2020 Oehring et al.
2020/0340344 A1 10/2020 Reckels et al.
2020/0340404 A1 10/2020 Stockstill et al.
2020/0347725 A1 11/2020 Morris et al.
2020/0354928 A1 11/2020 Wehler et al.
2020/0355055 A1 11/2020 Dusterhoft et al.
2020/0362760 A1 11/2020 Morenko et al.
2020/0362764 A1 11/2020 Saintignan et al.
2020/0370394 A1 11/2020 Cai et al.
2020/0370408 A1 11/2020 Cai et al.
2020/0370429 A1 11/2020 Cai et al.
2020/0371490 A1 11/2020 Cai et al.
2020/0386169 A1 12/2020 Hinderliter et al.
2020/0386222 A1 12/2020 Pham et al.
2020/0388140 A1 12/2020 Gomez et al.
2020/0392826 A1 12/2020 Cui et al.
2020/0392827 A1 12/2020 George et al.
2020/0393088 A1 12/2020 Sizemore et al.
2020/0398238 A1 12/2020 Zhong et al.
2020/0400000 A1 12/2020 Ghasripoor et al.
2020/0400005 A1 12/2020 Han et al.
2020/0407625 A1 12/2020 Stephenson
2020/0408071 A1 12/2020 Li et al.
2020/0408144 A1 12/2020 Feng et al.
2020/0408147 A1 12/2020 Zhang et al.
2020/0408149 A1 12/2020 Li et al.
2021/0025324 A1 1/2021 Morris et al.
2021/0025383 A1 1/2021 Bodishbaugh et al.
2021/0032961 A1 2/2021 Hinderliter et al.
2021/0054727 A1 2/2021 Floyd
2021/0071503 A1 3/2021 Ogg et al.
2021/0071574 A1 3/2021 Feng et al.
2021/0071579 A1 3/2021 Li et al.
2021/0071654 A1 3/2021 Brunson, Jr.
2021/0071752 A1 3/2021 Cui et al.
2021/0079758 A1 3/2021 Yeung et al.
2021/0079851 A1 3/2021 Yeung et al.
2021/0086851 A1 3/2021 Zhang et al.
2021/0087883 A1 3/2021 Zhang et al.
2021/0087916 A1 3/2021 Zhang et al.
2021/0087925 A1 3/2021 Heidari et al.
2021/0087943 A1 3/2021 Cui et al.
2021/0088042 A1 3/2021 Zhang et al.
2021/0123425 A1 4/2021 Cui et al.
2021/0123434 A1 4/2021 Cui et al.
2021/0123435 A1 4/2021 Cui et al.
2021/0131409 A1 5/2021 Cui et al.
2021/0140416 A1 5/2021 Buckley
2021/0148208 A1 5/2021 Thomas et al.
2021/0156240 A1 5/2021 Cicci et al.
2021/0156241 A1 5/2021 Cook
2021/0172282 A1 6/2021 Wang et al.
2021/0180517 A1 6/2021 Zhou et al.
2021/0190045 A1 6/2021 Zhang et al.
2021/0199110 A1 7/2021 Albert et al.
2021/0222690 A1 7/2021 Beisel
2021/0239112 A1 8/2021 Buckley
2021/0246774 A1 8/2021 Cui et al.
2021/0270261 A1 9/2021 Zhang et al.
2021/0270264 A1 9/2021 Byrne et al.
2021/0285311 A1 9/2021 Ji et al.
2021/0285432 A1 9/2021 Ji et al.
2021/0301807 A1 9/2021 Cui et al.
2021/0301815 A1 9/2021 Chretien et al.
2021/0306720 A1 9/2021 Sandoval et al.

(56) References Cited

U.S. PATENT DOCUMENTS

2021/0308638 A1 10/2021 Zhong et al.
2021/0324718 A1 10/2021 Anders
2021/0348475 A1 11/2021 Yeung et al.
2021/0348476 A1 11/2021 Yeung et al.
2021/0348477 A1 11/2021 Yeung et al.
2021/0355927 A1 11/2021 Jian et al.
2021/0372394 A1 12/2021 Bagulayan et al.
2021/0372395 A1 12/2021 Li et al.
2021/0376413 A1 12/2021 Asfha
2021/0388760 A1 12/2021 Feng et al.
2022/0082007 A1 3/2022 Zhang et al.
2022/0090476 A1 3/2022 Zhang et al.
2022/0090477 A1 3/2022 Zhang et al.
2022/0090478 A1 3/2022 Zhang et al.
2022/0112892 A1 4/2022 Cui et al.
2022/0120262 A1 4/2022 Ji et al.
2022/0145740 A1 5/2022 Yuan et al.
2022/0154775 A1 5/2022 Liu et al.
2022/0155373 A1 5/2022 Liu et al.
2022/0162931 A1 5/2022 Zhong et al.
2022/0162991 A1 5/2022 Zhang et al.
2022/0181859 A1 6/2022 Ji et al.
2022/0186724 A1 6/2022 Chang et al.
2022/0213777 A1 7/2022 Cui et al.
2022/0220836 A1 7/2022 Zhang et al.
2022/0224087 A1 7/2022 Ji et al.
2022/0228468 A1 7/2022 Cui et al.
2022/0228469 A1 7/2022 Zhang et al.
2022/0235639 A1 7/2022 Zhang et al.
2022/0235640 A1 7/2022 Mao et al.
2022/0235641 A1 7/2022 Zhang et al.
2022/0235642 A1 7/2022 Zhang et al.
2022/0235802 A1 7/2022 Jiang et al.
2022/0242297 A1 8/2022 Tian et al.
2022/0243613 A1 8/2022 Ji et al.
2022/0243724 A1 8/2022 Li et al.
2022/0250000 A1 8/2022 Zhang et al.
2022/0255319 A1 8/2022 Liu et al.
2022/0258659 A1 8/2022 Cui et al.
2022/0259947 A1 8/2022 Li et al.
2022/0259964 A1 8/2022 Zhang et al.
2022/0268201 A1 8/2022 Feng et al.
2022/0282606 A1 9/2022 Zhong et al.
2022/0282726 A1 9/2022 Zhang et al.
2022/0290549 A1 9/2022 Zhang et al.
2022/0294194 A1 9/2022 Cao et al.
2022/0298906 A1 9/2022 Zhong et al.
2022/0307359 A1 9/2022 Liu et al.
2022/0307424 A1 9/2022 Wang et al.
2022/0314248 A1 10/2022 Ge et al.
2022/0315347 A1 10/2022 Liu et al.
2022/0316306 A1 10/2022 Liu et al.
2022/0316362 A1 10/2022 Zhang et al.
2022/0316461 A1 10/2022 Wang et al.
2022/0325608 A1 10/2022 Zhang et al.
2022/0330411 A1 10/2022 Liu et al.
2022/0333471 A1 10/2022 Zhong et al.
2022/0339646 A1 10/2022 Yu et al.
2022/0341358 A1 10/2022 Ji et al.
2022/0341362 A1 10/2022 Feng et al.
2022/0341415 A1 10/2022 Deng et al.
2022/0345007 A1 10/2022 Liu et al.
2022/0349345 A1 11/2022 Zhang et al.
2022/0353980 A1 11/2022 Liu et al.
2022/0361309 A1 11/2022 Liu et al.
2022/0364452 A1 11/2022 Wang et al.
2022/0364453 A1 11/2022 Chang et al.
2022/0372865 A1 11/2022 Lin et al.
2022/0376280 A1 11/2022 Shao et al.
2022/0381126 A1 12/2022 Cui et al.
2022/0389799 A1 12/2022 Mao et al.
2022/0389803 A1 12/2022 Zhang et al.
2022/0389804 A1 12/2022 Cui et al.
2022/0389865 A1 12/2022 Feng et al.
2022/0389867 A1 12/2022 Li et al.
2022/0412196 A1 12/2022 Cui et al.
2022/0412199 A1 12/2022 Mao et al.
2022/0412200 A1 12/2022 Zhang et al.
2022/0412258 A1 12/2022 Li et al.
2022/0412379 A1 12/2022 Wang et al.
2023/0001524 A1 1/2023 Jiang et al.
2023/0003238 A1 1/2023 Du et al.
2023/0015132 A1 1/2023 Feng et al.
2023/0015529 A1 1/2023 Zhang et al.
2023/0015581 A1 1/2023 Ji et al.
2023/0017968 A1 1/2023 Deng et al.
2023/0029574 A1 2/2023 Zhang et al.
2023/0029671 A1 2/2023 Han et al.
2023/0036118 A1 2/2023 Xing et al.
2023/0040970 A1 2/2023 Liu et al.
2023/0042379 A1 2/2023 Zhang et al.
2023/0047033 A1 2/2023 Fu et al.
2023/0048551 A1 2/2023 Feng et al.
2023/0049462 A1 2/2023 Zhang et al.
2023/0064964 A1 3/2023 Wang et al.
2023/0074794 A1 3/2023 Liu et al.
2023/0085124 A1 3/2023 Zhong et al.
2023/0092506 A1 3/2023 Zhong et al.
2023/0092705 A1 3/2023 Liu et al.
2023/0106683 A1 4/2023 Zhang et al.
2023/0107300 A1 4/2023 Huang et al.
2023/0107791 A1 4/2023 Zhang et al.
2023/0109018 A1 4/2023 Du et al.
2023/0116458 A1 4/2023 Liu et al.
2023/0117362 A1 4/2023 Zhang et al.
2023/0119725 A1 4/2023 Wang et al.
2023/0119876 A1 4/2023 Mao et al.
2023/0119896 A1 4/2023 Zhang et al.
2023/0120810 A1 4/2023 Fu et al.
2023/0121251 A1 4/2023 Cui et al.
2023/0124444 A1 4/2023 Chang et al.
2023/0138582 A1 5/2023 Li et al.
2023/0144116 A1 5/2023 Li et al.
2023/0145963 A1 5/2023 Zhang et al.
2023/0151722 A1 5/2023 Cui et al.
2023/0151723 A1 5/2023 Ji et al.
2023/0152793 A1 5/2023 Wang et al.
2023/0160289 A1 5/2023 Cui et al.
2023/0160510 A1 5/2023 Bao et al.
2023/0163580 A1 5/2023 Ji et al.
2023/0167776 A1 6/2023 Cui et al.

FOREIGN PATENT DOCUMENTS

CN 205937833 U 2/2017
CN 210888905 U 6/2020

OTHER PUBLICATIONS

Green Field Energy Services: "Green Field Energy Services Deploys Third New Hydraulic Fracturing Spread," Jul. 11, 2012, 3 Pages, Retrieved from URL: https://www.prnewswire.cominews-releases/green-field-energy-services-deploys-third-new-hydraulic-facturing-spread-162113425.

Green Field Energy Services: "Green Field Energy Services Natural Gas Driven Turbine Frac Pumps," HHP Summit Presentation, Yumpu, Sep. 2012, 15 Pages, (Green Field), Retrieved from URL: https://www.yumpu.com/en/document/read/49685291/turbine-frac-pump-assembly-hhp.

* cited by examiner

GAS TURBINE ENGINE (GTE) 20
PRESSURE SOURCE 68
CONTROLLER 74
FUEL SOURCE 22

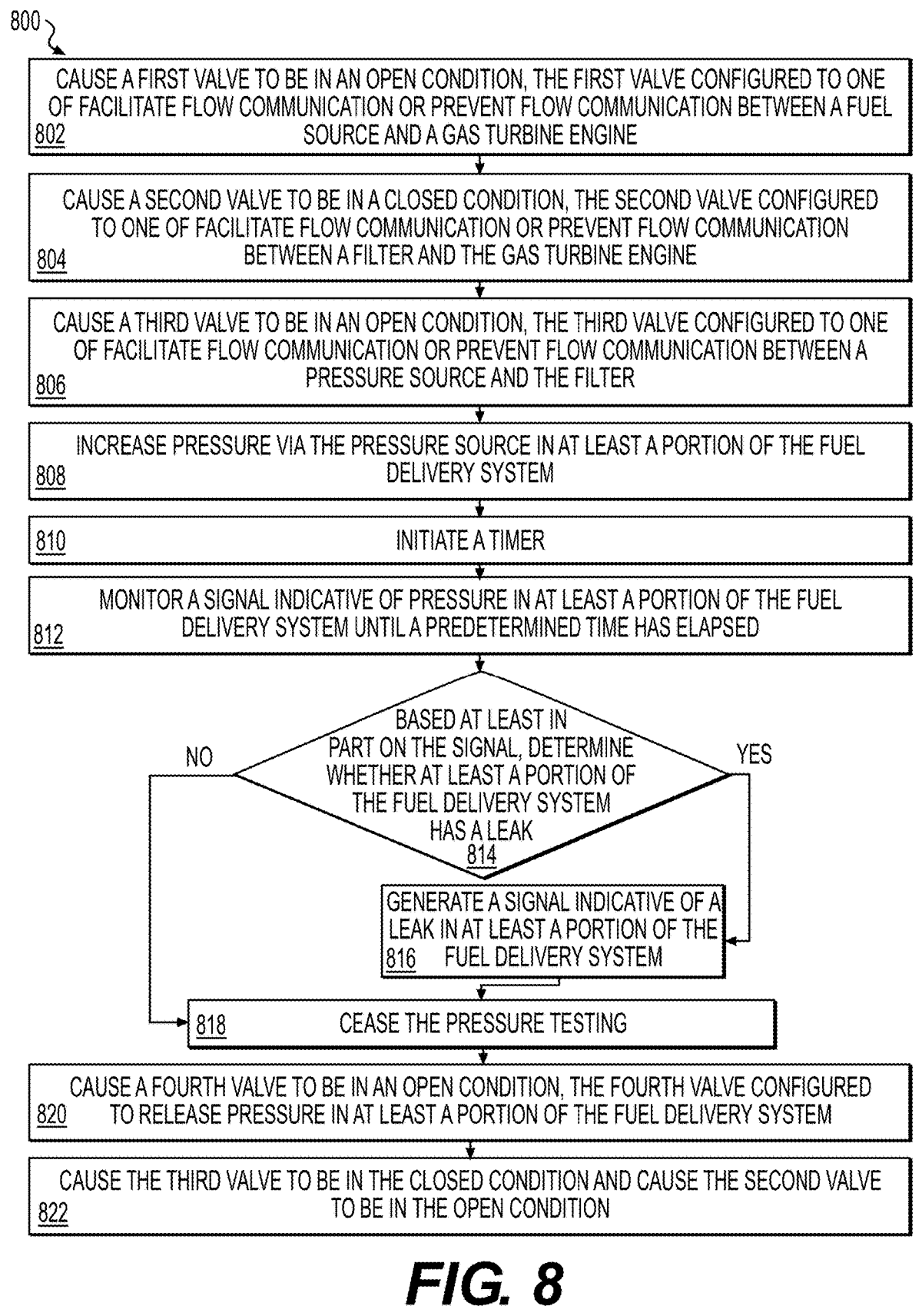

800

802 CAUSE A FIRST VALVE TO BE IN AN OPEN CONDITION, THE FIRST VALVE CONFIGURED TO ONE OF FACILITATE FLOW COMMUNICATION OR PREVENT FLOW COMMUNICATION BETWEEN A FUEL SOURCE AND A GAS TURBINE ENGINE

804 CAUSE A SECOND VALVE TO BE IN A CLOSED CONDITION, THE SECOND VALVE CONFIGURED TO ONE OF FACILITATE FLOW COMMUNICATION OR PREVENT FLOW COMMUNICATION BETWEEN A FILTER AND THE GAS TURBINE ENGINE

806 CAUSE A THIRD VALVE TO BE IN AN OPEN CONDITION, THE THIRD VALVE CONFIGURED TO ONE OF FACILITATE FLOW COMMUNICATION OR PREVENT FLOW COMMUNICATION BETWEEN A PRESSURE SOURCE AND THE FILTER

808 INCREASE PRESSURE VIA THE PRESSURE SOURCE IN AT LEAST A PORTION OF THE FUEL DELIVERY SYSTEM

810 INITIATE A TIMER

812 MONITOR A SIGNAL INDICATIVE OF PRESSURE IN AT LEAST A PORTION OF THE FUEL DELIVERY SYSTEM UNTIL A PREDETERMINED TIME HAS ELAPSED

814 BASED AT LEAST IN PART ON THE SIGNAL, DETERMINE WHETHER AT LEAST A PORTION OF THE FUEL DELIVERY SYSTEM HAS A LEAK

NO

YES

816 GENERATE A SIGNAL INDICATIVE OF A LEAK IN AT LEAST A PORTION OF THE FUEL DELIVERY SYSTEM

818 CEASE THE PRESSURE TESTING

820 CAUSE A FOURTH VALVE TO BE IN AN OPEN CONDITION, THE FOURTH VALVE CONFIGURED TO RELEASE PRESSURE IN AT LEAST A PORTION OF THE FUEL DELIVERY SYSTEM

822 CAUSE THE THIRD VALVE TO BE IN THE CLOSED CONDITION AND CAUSE THE SECOND VALVE TO BE IN THE OPEN CONDITION

FIG. 8

FUEL, COMMUNICATIONS, AND POWER CONNECTION SYSTEMS AND RELATED METHODS

CROSS REFERENCE TO RELATED APPLICATION

This application is a continuation of U.S. Non-Provisional application Ser. No. 18/213,468, filed Jun. 23, 2023, titled "FUEL, COMMUNICATIONS, AND POWER CONNECTION SYSTEMS AND RELATED METHODS," which is a continuation of U.S. Non-Provisional application Ser. No. 17/895,757, filed Aug. 25, 2022, titled "FUEL, COMMUNICATIONS, AND POWER CONNECTION SYSTEMS AND RELATED METHODS," now U.S. Pat. No. 11,761,846, issued Sep. 19, 2023, which is a continuation of U.S. Non-Provisional application Ser. No. 17/717,328, filed Apr. 11, 2022, titled "FUEL, COMMUNICATIONS, AND POWER CONNECTION SYSTEMS AND RELATED METHODS," now U.S. Pat. No. 11,460,368, issued Oct. 4, 2022, which is a divisional of U.S. Non-Provisional application Ser. No. 15/929,708, filed May 18, 2020, titled "FUEL, COMMUNICATIONS, AND POWER CONNECTION SYSTEMS AND RELATED METHODS," now U.S. Pat. No. 11,604,113, issued Mar. 14, 2023, which claims priority to and the benefit of U.S. Provisional Application No. 62/900,100, filed Sep. 13, 2019, titled "ON BOARDING HOSES AND ELECTRICAL CONNECTIONS," U.S. Provisional Application No. 62/900,112, filed Sep. 13, 2019, titled "FUEL LINE CONNECTION SYSTEM AND METHODS FOR SAME," and U.S. Provisional Application No. 62/704,401, filed May 8, 2020, titled "FUEL, COMMUNICATIONS, AND POWER CONNECTION SYSTEMS AND RELATED METHODS," the entire disclosures of all of which are incorporated herein by reference.

TECHNICAL FIELD

The present disclosure relates to systems and methods for supplying fuel, enabling communications, and/or conveying electric power to machines, and more particularly, to systems and methods for supplying fuel, enabling communications, and/or conveying electric power to a plurality of hydraulic fracturing units.

BACKGROUND

Fracturing is an oilfield operation that stimulates production of hydrocarbons, such that the hydrocarbons may more easily or readily flow from a subsurface formation to a well. For example, a fracturing system may be configured to fracture a formation by pumping a fracking fluid into a well at high pressure and high flow rates. Some fracking fluids may take the form of a slurry including water, proppants, and/or other additives, such as thickening agents and/or gels. The slurry may be forced via one or more pumps into the formation at rates faster than can be accepted by the existing pores, fractures, faults, or other spaces within the formation. As a result, pressure builds rapidly to the point where the formation fails and begins to fracture. By continuing to pump the fracking fluid into the formation, existing fractures in the formation are caused to expand and extend in directions farther away from a well bore, thereby creating flow paths to the well bore. The proppants may serve to prevent the expanded fractures from closing when pumping of the fracking fluid is ceased or may reduce the extent to which the expanded fractures contract when pumping of the fracking fluid is ceased. Once the formation is fractured, large quantities of the injected fracking fluid are allowed to flow out of the well, and the production stream of hydrocarbons may be obtained from the formation.

A fracturing system includes a large number of separate components required for executing a fracturing operation, each of which must be transported to the fracturing site in an at least partially disassembled state, assembled, and provided with a supply of fuel and electricity for operation, as well as data communications links for controlling the operation. Providing fuel delivery lines, communications links, and electric power to and between the numerous components when setting-up the fracturing operation requires a significant number of skilled personnel, numerous tools, and a substantial amount of time, all contributing significantly to the cost of the fracturing operation. Following completion of the fracturing operation, the components must be broken-down and transported from the fracturing site to another fracturing site. Thus, significant time and cost are involved with setting-up and tearing-down the fracturing operation. In addition, depending on the requirements of a particular operation and the site on which it occurs, different a fracturing operations may require different components and arrangements, which may add complexity to setting-up and tearing-down the fracturing operation, further adding to the time and costs associated with the fracturing operation.

Accordingly, it can be seen that a need exists for systems and methods that provide greater efficiency when setting-up and tearing-down components associated with a fracturing operation. The present disclosure may address one or more of the above-referenced drawbacks, as well as other possible drawbacks.

SUMMARY

The present disclosure is generally directed to systems and methods for supplying fuel, enabling communications, and/or conveying electric power to machines, and more particularly, to a plurality of hydraulic fracturing units associated with a hydraulic fracturing system. For example, in some embodiments, a fuel line connection assembly for providing flow communication between a fuel source and a first gas turbine engine of a plurality of gas turbine engines may include a manifold line defining an inlet end, an outlet end, and a flow path for fuel extending between the inlet end and the outlet end. The fuel line connection assembly may further include an inlet coupling proximate the inlet end and configured to be connected to a fuel line providing flow communication with the fuel source, and an outlet coupling proximate the outlet end and configured to be connected to one of an inlet end of another manifold line or a blocking device configured to prevent flow from the outlet end of the manifold line. The fuel line connection assembly may further include a distribution line connected to the manifold line and configured to provide flow communication between the manifold line and the first gas turbine engine, and a valve in one of the manifold line or the distribution line and configured to change between an open condition through which fluid flows and a closed condition preventing fluid flow. The valve may be configured to one of facilitate flow communication or prevent flow communication between the fuel source and the first gas turbine engine. The fuel line connection assembly may be configured to one of: (1) provide flow communication between a second gas turbine engine of the plurality of gas turbine engines upstream of the first gas turbine engine and a third gas turbine engine of the plurality of gas turbine engines downstream of the first gas turbine engine; or (2) provide flow communication solely between the fuel source and the first gas turbine engine.

According some embodiments, a fuel delivery system configured to supply fuel to a plurality of gas turbine engines connected to a plurality of pumps of a hydraulic fracturing system may include a plurality of fuel line connection assemblies. The fuel line connection assemblies may include a manifold line defining an inlet end, an outlet end, and a flow path for fuel extending between the inlet end and the outlet end. The fuel line connection assembly may also include an inlet coupling proximate the inlet end and configured to be connected to a fuel line providing flow communication with the fuel source, and an outlet coupling proximate the outlet end and configured to be connected to one of an inlet end of another manifold line or a blocking device configured to prevent flow from the outlet end of the manifold line. The fuel line connection assembly may also include a distribution line connected to the manifold line and configured to provide flow communication between the manifold line and the first gas turbine engine, and a valve in one of the manifold line or the distribution line and configured to change between an open condition through which fluid flows and a closed condition preventing fluid flow. The valve may be further configured to one of facilitate flow communication or prevent flow communication between the fuel source and the first gas turbine engine. A first fuel line connection assembly of the plurality of fuel line connection assemblies may be in flow communication with a first outlet coupling of the fuel source via an inlet coupling of the first fuel line connection assembly. A second fuel line connection assembly of the plurality of fuel line connection assemblies may be in flow communication with one of an outlet coupling of the first fuel line connection assembly or a second outlet coupling of the fuel source via an inlet coupling of the second fuel line connection assembly.

According to some embodiments, a method for pressure testing at least a portion of a fuel delivery system for supplying fuel from a fuel source to a plurality of gas turbine engines may include causing a first valve to be in an open condition. The first valve may be configured to one of facilitate flow communication or prevent flow communication between the fuel source and a first gas turbine engine of the plurality of gas turbine engines. The method may further include causing a second valve to be in a closed condition. The second valve may be configured to one of facilitate flow communication or prevent flow communication between a filter configured to filter one or more of particulates or liquids from fuel and the first gas turbine engine. The method may further include causing a third valve to be in an open condition. The third valve may be configured to one of facilitate flow communication or prevent flow communication between a pressure source and the filter. The method may further include increasing pressure via the pressure source in the at least a portion of the fuel delivery system, and monitoring a signal indicative of pressure in the at least a portion of the fuel delivery system. The method may also include, based at least in part on the signal, determining whether the at least a portion of the fuel delivery system has a leak.

According to some embodiments, a system for supplying fuel, enabling communications, and conveying electric power associated with operation of a hydraulic fracturing unit associated with a plurality of hydraulic fracturing units may include a fuel line connection assembly configured to be connected to the hydraulic fracturing unit and to supply fuel from a fuel source to a first gas turbine engine connected to the hydraulic fracturing unit. The fuel line connection assembly may include a manifold line defining an inlet end, an outlet end, and a flow path for fuel extending between the inlet end and the outlet end. The fuel connection assembly may also include a distribution line connected to the manifold line and configured to provide flow communication between the manifold line and the first gas turbine engine. The fuel line connection assembly may be configured to one of: (1) provide flow communication between one of the fuel source or a second gas turbine engine of the plurality of the hydraulic fracturing units upstream of the first gas turbine engine and a third gas turbine engine of the plurality of hydraulic fracturing units downstream of the first gas turbine engine; or (2) provide flow communication solely between the fuel source and the first gas turbine engine. The system may also include a communications cable assembly configured to be connected to the hydraulic fracturing unit and to enable data communications between the hydraulic fracturing unit and one of a data center remote from the hydraulic fracturing unit or a second hydraulic fracturing unit of the plurality of hydraulic fracturing units. The communications cable assembly may include a length of communications cable and a communications cable storage apparatus configured to be connected to the hydraulic fracturing unit, to store the length of communications cable when not in use, and to facilitate deployment of at least a portion of the length of communications cable for connection to the one of the data center or the second hydraulic fracturing unit. The system may also include a power cable assembly configured to be connected to the hydraulic fracturing unit and to convey electric power between the hydraulic fracturing unit and one or more of a remote electrical power source or one or more of the plurality of hydraulic fracturing units. The power cable assembly may include a length of power cable and a power cable storage apparatus configured to be connected to the hydraulic fracturing unit, to store the length of power cable when not in use, and to facilitate deployment of at least a portion of the length of power cable for use.

According to some embodiments, a hydraulic fracturing unit may include a chassis, a pump connected to the chassis and configured to pump a fracturing fluid, and a first gas turbine engine connected to the chassis and configured to convert fuel into a power output for operating the pump. The hydraulic fracturing unit may also include a system for supplying fuel, enabling communications, and conveying electric power associated with operation of the hydraulic fracturing unit. The system may include a fuel line connection assembly connected to the hydraulic fracturing unit and configured to supply fuel from a fuel source to the first gas turbine engine connected to the chassis. The fuel line connection assembly may include a manifold line defining an inlet end, an outlet end, and a flow path for fuel extending between the inlet end and the outlet end. The fuel line connection assembly may also include a distribution line connected to the manifold line and configured to provide flow communication between the manifold line and the first gas turbine engine. The fuel line connection assembly may be configured to one of: (1) provide flow communication between one of the fuel source or a second gas turbine engine of a second hydraulic fracturing unit upstream of the first gas turbine engine and a third gas turbine engine of a hydraulic fracturing unit downstream of the first gas turbine engine; or (2) provide flow communication solely between the fuel source and the first gas turbine engine. The system may also include a communications cable assembly connected to the hydraulic fracturing unit and configured to enable data communications between the hydraulic fracturing unit and one of a data center remote from the hydraulic fracturing unit or an additional hydraulic fracturing unit. The communications cable assembly may include a length of communications cable and a communications cable storage apparatus connected to the hydraulic fracturing unit and configured to store the length of communications cable when not in use and to facilitate deployment of at least a portion of the length of communications cable for connection to the one of the data center or the another hydraulic fracturing unit. The system may also include a power cable assembly connected to the hydraulic fracturing unit and configured to convey electric power between the hydraulic fracturing unit and one or more of a remote electrical power source or one or more additional hydraulic fracturing units. The power cable assembly may include a length of power cable and a power cable storage apparatus connected to the hydraulic fracturing unit and configured to store the length of power cable when not in use and facilitate deployment of at least a portion of the length of power cable for use.

According to some embodiments, a hydraulic fracturing system may include a plurality of hydraulic fracturing units. The hydraulic fracturing system may include a main fuel line configured to supply fuel from a fuel source to a plurality of hydraulic fracturing units. The hydraulic fracturing system may also include a first hydraulic fracturing unit including a chassis, a pump connected to the chassis and configured to pump fracturing fluid, and a first gas turbine engine connected to the chassis and configured to convert fuel into a power output for operating the pump. The hydraulic fracturing system may also include a system for supplying fuel, enabling communications, and conveying electric power associated with operation of the first hydraulic fracturing unit. The system may include a fuel line connection assembly connected to the first hydraulic fracturing unit and configured to supply fuel from the fuel source to the first gas turbine engine. The fuel line connection assembly may include a manifold line defining an inlet end, an outlet end, and a flow path for fuel extending between the inlet end and the outlet end. The manifold line may be configured to provide at least a portion of a flow path for supplying fuel to the first gas turbine engine. The fuel line connection assembly may be configured to one of: (1) provide flow communication between one of the main fuel line or a second gas turbine engine of a second hydraulic fracturing unit upstream of the first gas turbine engine and a third gas turbine engine of a third hydraulic fracturing unit downstream of the first gas turbine engine; or (2) provide flow communication solely between the main fuel line and the first gas turbine engine. The system may also include a communications cable assembly including a length of communications cable connected to the first hydraulic fracturing unit and configured to enable data communications between the first hydraulic fracturing unit and one of a data center remote from the first hydraulic fracturing unit or one or more additional hydraulic fracturing units of the plurality of hydraulic fracturing units. The system may also include a power cable assembly including a length of power cable connected to the first hydraulic fracturing unit and configured to convey electric power between the first hydraulic fracturing unit and one or more of a remote electrical power source or one or more additional hydraulic fracturing units of the plurality of hydraulic fracturing units. The hydraulic fracturing system may also include a data center configured to one or more of transmit communications signals or receive communications signals. The communications signals may include data indicative of operation of one or more of the plurality of hydraulic fracturing units.

Still other aspects, embodiments, and advantages of these exemplary embodiments and embodiments, are discussed in detail below. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features of the present invention herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than can be necessary for a fundamental understanding of the embodiments discussed herein and the various ways in which they can be practiced. According to common practice, the various features of the drawings discussed below are not necessarily drawn to scale. Dimensions of various features and elements in the drawings can be expanded or reduced to more clearly illustrate embodiments of the disclosure.

FIG. 8 is a block diagram of an example method for pressure testing at least a portion of an example fuel delivery system for supplying fuel from a fuel source to a plurality of gas turbine engines according to embodiments of the disclosure.

DETAILED DESCRIPTION

Figure 1:
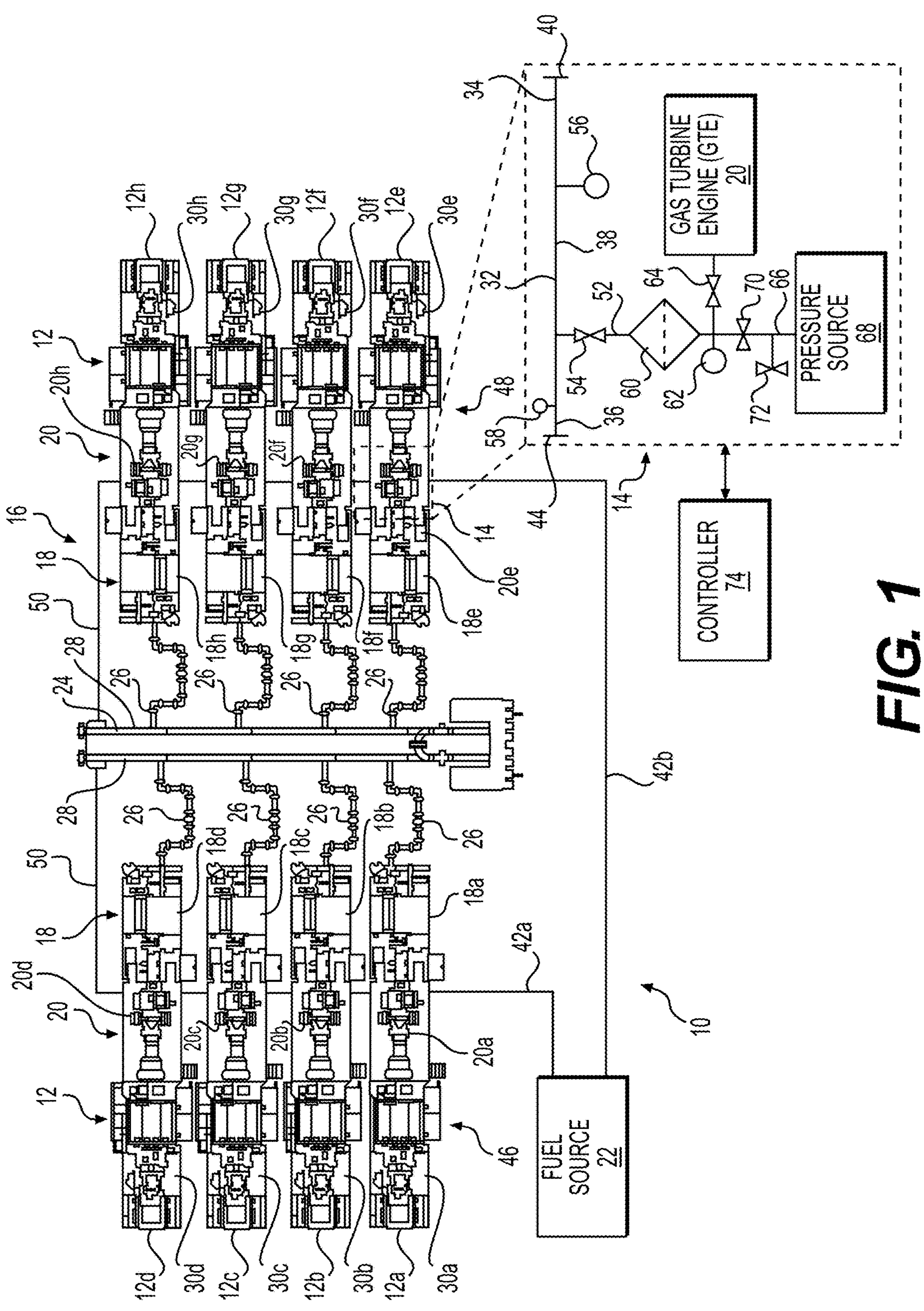
FIG. 1 schematically illustrates an example fuel delivery system for supplying fuel to a plurality of hydraulic fracturing units, including a detailed schematic view of an example fuel line connection assembly according to embodiments of the disclosure.

Referring now to the drawings in which like numerals indicate like parts throughout the several views, the following description is provided as an enabling teaching of exemplary embodiments, and those skilled in the relevant art will recognize that many changes can be made to the embodiments described. It also will be apparent that some of the desired benefits of the embodiments described can be obtained by selecting some of the features of the embodiments without utilizing other features. Accordingly, those skilled in the art will recognize that many modifications and adaptations to the embodiments described are possible and can even be desirable in certain circumstances. Thus, the following description is provided as illustrative of the principles of the embodiments and not in limitation thereof.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to," unless otherwise stated. Thus, the use of such terms is meant to encompass the items listed thereafter, and equivalents thereof, as well as additional items. The transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

FIG. 1 schematically illustrates an example fuel delivery system 10 for supplying fuel to a plurality of hydraulic fracturing units 12, including a detailed schematic view of an example fuel line connection assembly 14 according to embodiments of the disclosure. The fuel delivery system 10 may be part of a hydraulic fracturing system 16 that includes a plurality (or fleet) of hydraulic fracturing units 12 configured to pump a fracking fluid into a well at high pressure and high flow rates, so that a subterranean formation fails and begins to fracture in order to promote hydrocarbon production from the well.

In some examples, one or more of the hydraulic fracturing units 12 may include directly driven turbine (DDT) pumping units, in which pumps 18 are connected to one or more gas turbine engines (GTEs) 20 that supply power to the respective pump 18 for supplying fracking fluid at high pressure and high flow rates to a formation. For example, a GTE 20 may be connected to a respective pump 18 via a reduction transmission connected to a drive shaft, which, in turn, is connected to an input shaft or input flange of a respective reciprocating pump 18. Other types of GTE-to-pump arrangements are contemplated. In some examples, one or more of the GTEs 20 may be a dual-fuel or bi-fuel GTE, for example, capable of being operated using of two or more different types of fuel, such as natural gas and diesel fuel, although other types of fuel are contemplated. For example, a dual-fuel or bi-fuel GTE may be capable of being operated using a first type of fuel, a second type of fuel, and/or a combination of the first type of fuel and the second type of fuel. For example, the fuel may include compressed natural gas (CNG), natural gas, field gas, pipeline gas, methane, propane, butane, and/or liquid fuels, such as, for example, diesel fuel (e.g., #2 Diesel), bio-diesel fuel, bio-fuel, alcohol, gasoline, gasohol, aviation fuel, etc. Gaseous fuels may be supplied by CNG bulk vessels, a gas compressor, a liquid natural gas vaporizer, line gas, and/or well-gas produced natural gas. Other types and sources of fuel are contemplated. The one or more GTEs 20 may be operated to provide horsepower to drive via a transmission one or more of the pumps 18 to safely and successfully fracture a formation during a well stimulation project.

Although not shown in FIG. 1, the hydraulic fracturing system 16 may include a plurality of water tanks for supplying water for a fracking fluid, one or more chemical tanks for supplying gels or agents for adding to the fracking fluid, and a plurality of proppant tanks (e.g., sand tanks) for supplying proppants for the fracking fluid. The hydraulic fracturing system 16 may also include a hydration unit for mixing water from the water tanks and gels and/or agents from the chemical tank to form a mixture, for example, gelled water. The hydraulic fracturing system 16 may also include a blender, which receives the mixture from the hydration unit and proppants via conveyers from the proppant tanks. The blender may mix the mixture and the proppants into a slurry to serve as fracking fluid for the hydraulic fracturing system 16. Once combined, the slurry may be discharged through low-pressure hoses, which convey the slurry into two or more low-pressure lines in a frac manifold 24, as shown in FIG. 1. Low-pressure lines in the frac manifold 24 feed the slurry to the plurality of pumps 18 shown in FIG. 1 through low-pressure suction hoses.

FIG. 1 shows an example fuel delivery system 10 associated with a plurality, or fleet, of example hydraulic fracturing units 12 according to embodiments of the disclosure, identified as 12*a*, 12*b*, 12*c*, 12*d*, 12*e*, 12*f*, 12*g*, and 12*h*, although fewer or more hydraulic fracturing units 12 are contemplated. In the example shown, each of the plurality hydraulic fracturing units 12 includes a GTE 20, identified respectively as 20*a*, 20*b*, 20*c*, 20*d*, 20*e*, 20*f*, 20*g*, and 20*h*. Each of the GTEs 20 supplies power for each of the hydraulic fracturing units 12 to operate a pump 18, identified respectively as 18*a*, 18*b*, 18*c*, 18*d*, 18*e*, 18*f*, 18*g*, and 18*h*.

The pumps 18 are driven by the GTEs 20 of the respective hydraulic fracturing units 12 and discharge the slurry (e.g., the fracking fluid including the water, agents, gels, and/or proppants) at high pressure and/or a high flow rates through individual high-pressure discharge lines 26 into two or more high-pressure flow lines 28, sometimes referred to as "missiles," on the frac manifold 24. The flow from the flow lines 28 is combined at the frac manifold 24, and one or more of the flow lines 28 provide flow communication with a manifold assembly, sometimes referred to as a "goat head." The manifold assembly delivers the slurry into a wellhead manifold, sometimes referred to as a "zipper manifold" or a "frac manifold." The wellhead manifold may be configured to selectively divert the slurry to, for example, one or more well heads via operation of one or more valves. Once the fracturing process is ceased or completed, flow returning from the fractured formation discharges into a flowback manifold, and the returned flow may be collected in one or more flowback tanks.

In the example shown in FIG. 1, one or more of the components of the hydraulic fracturing system 16 may be configured to be portable, so that the hydraulic fracturing system 16 may be transported to a well site, assembled, operated for a relatively short period of time, at least partially disassembled, and transported to another location of another well site for use. In the example shown in FIG. 1, each of the pumps 18 and GTEs 20 of a respective hydraulic fracturing unit 12 may be connected to (e.g., mounted on) a chassis 30, identified respectively as 30*a*, 30*b*, 30*c*, 30*d*, 30*e*, 30*f*, 30*g*, and 30*h*. In some examples, the chassis 30 may include a trailer (e.g., a flat-bed trailer) and/or a truck body to which the components of a respective hydraulic fracturing unit 12 may be connected. For example, the components may be carried by trailers and/or incorporated into trucks, so that they may be easily transported between well sites.

As shown in FIG. 1, the example fuel delivery system 10 may include a plurality of fuel line connection assemblies 14, for example, for facilitating the supply of fuel from the fuel source 22 to each of the GTEs 20 of the hydraulic fracturing system 16. In some examples, for example, as shown in FIGS. 1, 2A, 2B, and 3, one or more of the fuel line connection assemblies 14 may include a manifold line 32 defining an inlet end 34, an outlet end 36, and a flow path 38 for fuel extending between the inlet end 36 and the outlet end 38. In addition, the fuel line connection assemblies 14 may include an inlet coupling 40 proximate the inlet end 34 and configured to be connected to a fuel line 42 providing flow communication with the fuel source 22, and an outlet coupling 44 proximate the outlet end 36 and configured to be connected to an inlet end of another manifold line or a blocking device configured to prevent flow from the outlet end 36 of the manifold line 32, for example, as explained in more detail herein.

For example, as shown in FIG. 1, the fuel delivery system 10 may include a fuel line connection assembly 14 associated with each of the hydraulic fracturing units 12*a* through 12*h*. In the example configuration shown in FIG. 1, a first hydraulic fracturing unit 12*a* may be in flow communication with the fuel source 22 via the fuel line 42 (e.g., via fuel line 42*a*). The inlet coupling 40 of the first hydraulic fracturing unit 12*a* may be coupled to the fuel line 42*a*. The outlet coupling 44 for the first hydraulic fracturing unit 12*a* may be coupled to an inlet coupling of a manifold line of a second hydraulic fracturing unit 12*b*. Similarly, the outlet coupling of the second hydraulic fracturing unit 12*b* may be coupled to the inlet coupling of a manifold line of a third hydraulic fracturing unit 12*c*. The outlet coupling of the manifold line of the third hydraulic fracturing unit 12*c* may be coupled to an inlet coupling of a manifold line of a fourth hydraulic fracturing unit 12*d*.

In the example shown, the first through fourth hydraulic fracturing units 12*a* through 12*d* may make up a first bank 46 of the hydraulic fracturing units 12, and fifth through eighth hydraulic fracturing units 12*e* through 12*h* may make up a second bank 48 of the hydraulic fracturing units 12. In some examples, for example, as shown in FIG. 1, a fifth hydraulic fracturing unit 12*e* may be in flow communication with the fuel source 22 via the fuel line 42 (e.g., via fuel line 42*b*). The inlet coupling of the fifth hydraulic fracturing unit 12*e* may be coupled to the fuel line 42. The outlet coupling for the fifth hydraulic fracturing unit 12*e* may be coupled to an inlet coupling of a manifold line of a sixth hydraulic fracturing unit 12*f*. Similarly, the outlet coupling of the sixth hydraulic fracturing unit 12*f* may be coupled to an inlet coupling of a manifold line of a seventh hydraulic fracturing unit 12*g*. The outlet coupling of the manifold line of the seventh hydraulic fracturing unit 12*g* may be coupled to an inlet coupling of a manifold line of an eighth hydraulic fracturing unit 12*h*. The example fuel delivery system 10 shown in FIG. 1 may sometimes be referred to as a "daisy-chain" arrangement.

In this example manner, the fuel source 22 may supply fuel to the GTEs 20 of the hydraulic fracturing units 12. In some examples, fuel that reaches the end of the first bank 46 of the hydraulic fracturing units 12 remote from the fuel source 22 (e.g., the fourth hydraulic fracturing unit 12*d*) and/or fuel that reaches the end of the second bank 48 of the hydraulic fracturing units 12 remote from the fuel source 22 (e.g., the eighth hydraulic fracturing unit 12*h*) may be combined and/or transferred between the first bank 46 and the second bank 48, for example, via a transfer line 50 configured to provide flow communication between the first bank 46 and the second bank 48. For example, unused fuel supplied to either of the first bank 46 or the second bank 48 of hydraulic fracturing units 12 may be passed to the other bank of the two banks.

In some examples, the inlet coupling 40 and/or the outlet coupling 44 may include a flange configured to be secured to another flange of another manifold line and/or a fuel line. For example, the manifold line 32 may be a four-inch schedule 40 steel pipe, and the inlet coupling 40 and/or the outlet coupling 44 may include a four-inch 300 class weld neck flange, although other manifold line types and sizes are contemplated, as well as other coupling types and sizes. In some examples, the inlet coupling 40 may include a quick connect coupling configured to connect the inlet end 34 of the manifold line 32 in a fluid-tight manner with a quick connect coupling (e.g., a complimentary coupling) of an outlet end of another manifold line. In some examples, the outlet coupling 44 may include quick connect coupling configured to connect the outlet end 36 of the manifold line 32 in a fluid-tight manner with a quick connect coupling of an inlet end of yet another manifold line and/or a quick connect coupling of a blocking device configured to prevent flow from the outlet end 36 of the manifold line 32, for example, to effectively prevent flow through the manifold line 32 to another hydraulic fracturing unit 12 of a common hydraulic fracturing system 16. In some examples, the quick connect coupling may include a quarter-turn quick connect (e.g., a twister locking quick connect) or a safety quick coupler (e.g., transfer-loading safety quick coupling), for example, as disclosed herein with respect to FIGS. 17A, 17B, and 17C.

In addition, as shown in FIGS. 1, 2A, 2B, and 3, the fuel line connection assemblies 14 may include a distribution line 52 connected to the manifold line 32 and configured to provide flow communication between the manifold line 32 and a GTE 20 of the respective hydraulic fracturing unit 12. In some examples, the fuel line connection assembly 14 may also include a valve 54 in the manifold line 32 or the distribution line 52 and configured to change between an open condition through which fluid flows and a closed condition preventing fluid flow. In some examples, the valve 54 may be configured to facilitate flow communication or prevent flow communication between the fuel source 22 and the GTE 20. For example, the valve 54 may be configured to change to the closed condition to prevent flow of fuel to the corresponding GTE 20, for example, to cease operation of the GTE 20 and/or during testing related to portions of the fuel delivery system 20.

As shown in FIGS. 1, 2A, 2B, and 3, some examples, of the fuel line connection assembly 14 may also include a sensor 56 disposed in the manifold line 32 (e.g., upstream relative to the distribution line 52) or the distribution line 52 and configured to generate a signal indicative of pressure associated with flow of fuel to the GTE 20 of the respective hydraulic fracturing unit 12. The sensor 56 may include any transducer configured to generate a signal indicative of pressure in the manifold line 32 and/or the distribution line 52. As shown in FIG. 1, some examples of the fuel line connection assembly 14 may include a pressure gauge 58 in flow communication with the manifold line 32 downstream of the distribution line 52, for example, configured to provide an indication of the pressure in the manifold line 32, for example, for an operator of the hydraulic fracturing system 16. The pressure gauge 58 may be any type of gauge configured to generate an indication of the pressure in the manifold line 32 downstream of the distribution line 52. In some examples, the indication of pressure may be viewed at a location remote from the manifold line 32, for example, at an operations console associated with the hydraulic fracturing operation.

Figures 2A, 2B:
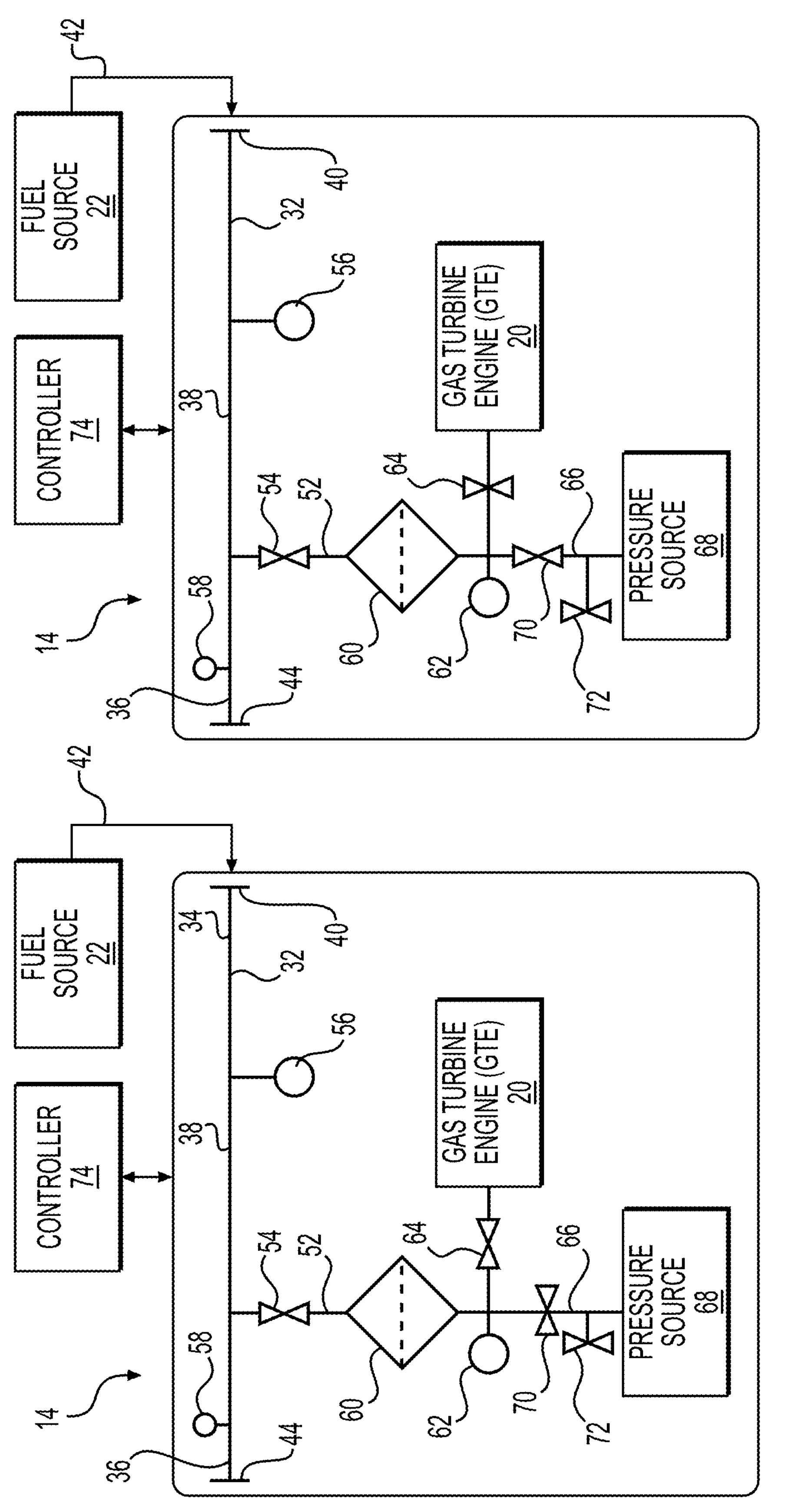
FIG. 2A is a schematic view of an example fuel line connection assembly in an example first condition for operation of a gas turbine engine according to embodiments of the disclosure.
FIG. 2B is a schematic view of the example fuel line connection assembly shown in FIG. 2A in an example second condition during an example pressure testing procedure.
Figure 3:
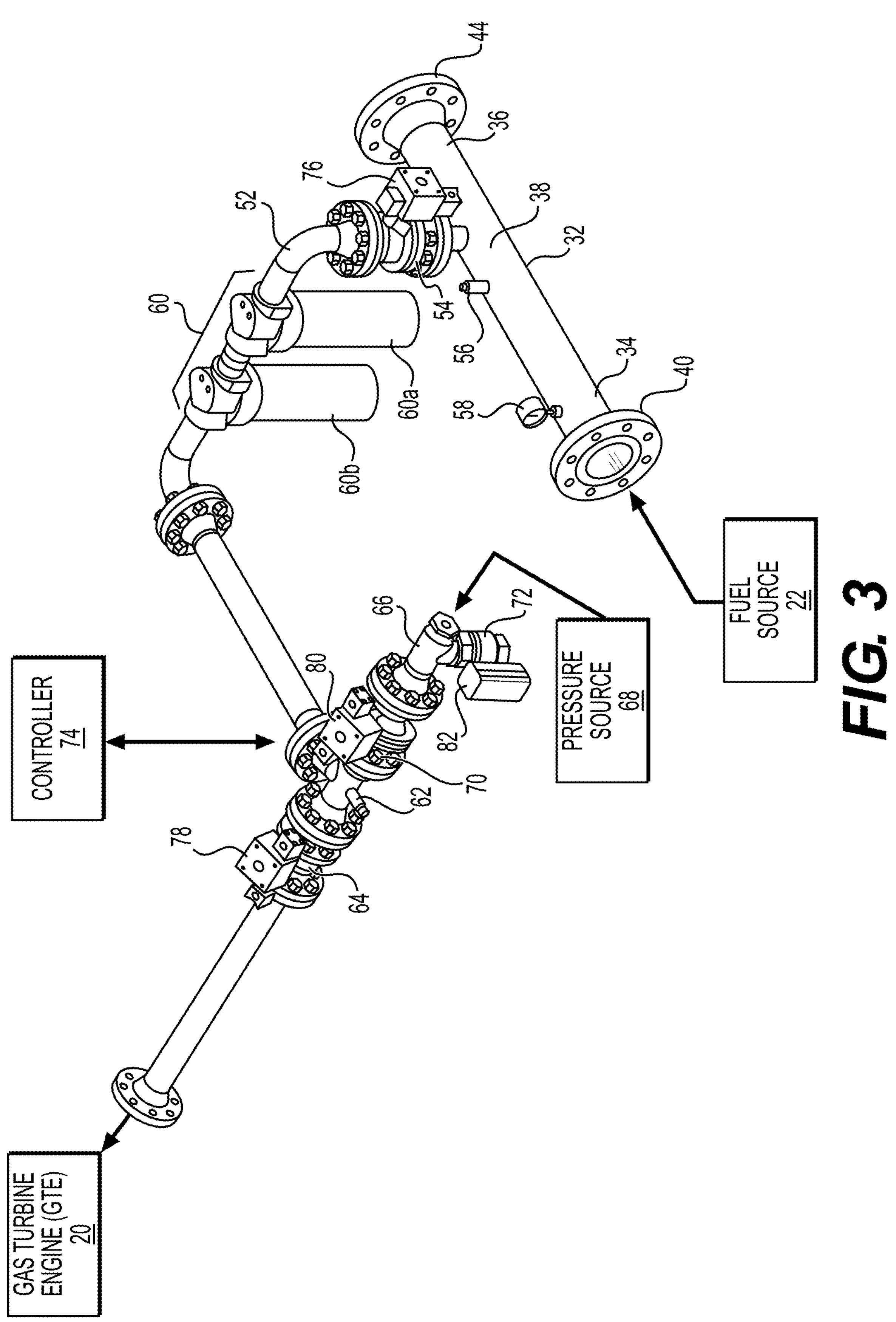
FIG. 3 is a perspective view of an example fuel line connection assembly according to embodiments of the disclosure.

As shown in FIGS. 1, 2A, and 2B, the fuel line connection assembly 14 may also include a filter 60 disposed in the distribution line 52 between the manifold line 32 and the GTE 20 and configured to filter one or more of particulates or liquids from fuel in flow communication with the GTE 20. For example, as shown in FIG. 3, the filter 60 may include a first filter 60*a* configured to remove particulates from fuel supplied to the GTE 20 and a second filter 60*b* (e.g., a coalescing filter) configured to remove liquids from the fuel line connection assembly 14 before fuel reaches the GTE 20. This may improve performance of the GTE 20 and/or reduce maintenance and/or damage to the GTE 20 due to contaminants in the fuel.

As shown in FIG. 1, some examples of the fuel line connection assembly 14 may also include a sensor 62 disposed in the distribution line 52 between the filter 60 and the GTE 20 of the respective hydraulic fracturing unit 12. The sensor 62 may be configured to generate a signal indicative of pressure associated with flow of fuel between the filter 60 and the GTE 20. The sensor 56 and/or the sensor 62, upstream and downstream, respectively, of the filter 60, may be used to determine a pressure differential across the filter 60, which, if higher than a predetermined pressure, may be an indication that the filter 60 is inhibiting fuel flow through the filter 60, which may be an indication that the filter 60 should be cleaned, serviced, and/or replaced.

In some examples, the fuel line connection assembly 14 may be configured to facilitate testing for leaks in at least a portion of the fuel delivery system 10 according to some embodiments of the disclosure. For example, as shown in FIGS. 1, 2A, 2B, and 3, the fuel line connection assembly 14 may be configured to perform a pressure test to identify leaks in at least a portion of the fuel delivery system 10. For example, the valve 54 may be a first valve 54, and the fuel line connection assembly 14 may further include a second valve 64 disposed in the distribution line 52 and configured to change between an open condition through which fluid flows and a closed condition preventing fluid flow. The second valve 64 may be configured to facilitate flow communication or prevent flow communication between the filter 60 and the GTE 20 of the respective hydraulic fracturing unit 12. The fuel line connection assembly 14 may also include a test line 66 in flow communication with the distribution line 52 between the filter 60 and the GTE 20 and configured to provide flow communication between a pressure source 68 and the filter 60. In some examples, the fuel line connection assembly 14 may also include a third valve 70 disposed in the test line 66 and configured to change between an open condition through which fluid flows and a closed condition preventing fluid flow. The third valve 70 may be configured to facilitate flow communication or prevent flow communication between the pressure source 68 and the filter 60. In some examples, the fuel line connection assembly 14 may further include a fourth valve 72 disposed between the pressure source 68 and the filter 60 and configured to change between an open condition through which fluid flows and a closed condition preventing fluid flow. The fourth valve 72 may be configured to release pressure in the test line 66 between the pressure source 68 and the third valve 70, for example as disclosed herein. One or more of the first valve 54, the second valve 64, the third valve 70, or the fourth valve 72 may be a ball valve, although other types of valves are contemplated.

As shown in FIGS. 1, 2A, 2B, and 3, the fuel line connection assembly 14 may also include a controller 74 configured to facilitate pressure testing at least a portion of the fuel delivery system 10 and in communication with one or more of the sensors 56 and 62 configured to generate signals indicative of pressure, one or more of the first valve 54, the second valve 64, the third valve 70, or the fourth valve 72, and the pressure source 68. In some examples, the controller 74 may be configured to cause operation of one or more of the first valve 54, the second valve 64, the third valve 70, or the fourth valve 72, and receive one or more signals from one or more of the sensors 56 and 62. Based at least in part on the one or more signals, the controller 74 may be configured to determine the presence of a leak in at least a portion of the fuel delivery system 14 and/or the fuel line connection assembly 14, for example, semi- or fully-autonomously.

For example, as shown in FIG. 3, the fuel line connection assembly 14 may include one or more actuators connected respectively to one or more of the first valve 54, the second valve 64, the third valve 70, or the fourth valve 72 and configured cause one or more of the first valve 54, the second valve 64, the third valve 70, or the fourth valve 72 to change conditions, for example, between an open condition and a closed condition. As shown, a first actuator 76, a second actuator 78, a third actuator 80, and a fourth actuator 82 are respectively connected to the first valve 54, the second valve 64, the third valve 70, and the fourth valve 72, and are configured to control the condition of the respective valve. As explained below, by coordinated activation of the first actuator 76, second actuator 78, third actuator 80, and/or fourth actuator 82, and in some examples, control of the pressure source 68, the controller 74 may be configured to pressure test at least a portion of the fuel delivery system 14 and/or one or more of the fuel line connection assemblies 14 of the fuel delivery system 10, for example, to identify leaks in at least a portion of the fuel delivery system 14, including one or more of the fuel line connection assemblies 14 of the fuel delivery system 10.

For example, FIG. 2A is a schematic view of an example fuel line connection assembly 14 in an example first condition for operation of the GTE 20 according to embodiments of the disclosure. As shown in FIG. 2A, the first valve 54 and the second valve 64 are in the open condition, such that fuel from the fuel source 22 flows via the fuel line 42, into the inlet end 34 of the manifold line 32 of the fuel line connection assembly 14, into the distribution line 52, through the first valve 54, through the filter 60, and through the second valve 64 to the GTE 20 for combustion to drive the pump 18 connected to the GTE 20. As shown in FIG. 2A, the third valve 70 and the fourth valve 72 are in the closed condition preventing fuel flow through those valves and/or preventing pressure from the pressure source 68 from entering the fuel line connection assembly 14 through the third valve 70. In some examples, the controller 74 may be configured to communicate with the first actuator 76, second actuator 78, third actuator 80, and/or fourth actuator 82 (see FIG. 3) to cause the respective valves to have the above-noted conditions (e.g., open or closed).

FIG. 2B is a schematic view of the example fuel line connection assembly 14 shown in FIG. 2A in an example second condition during a portion of an example pressure testing procedure. As shown in FIG. 2B, to perform a pressure test according to some embodiments of the disclosure, the controller 74 may be configured to cause the first valve 54 to be in the open condition, cause the second valve 64 to be in the closed condition, cause the third valve 70 to be in the open condition, and cause the pressure source 68 to increase pressure in one or more of the distribution line 52 or the manifold line 32. The controller 74 may be further configured to determine the presence of a leak in the fuel line connection assembly 14 based at least in part on signals indicative of pressure received from the sensor 62 between the pressure source 68 and the filter 60 and/or the sensor 56 between the filter 60 and the fuel source 22. For example, as explained in more detail herein with respect to FIG. 8, the controller 74 may be configured to cause (or allow) the pressure source 68 to cause an increase in pressure (or at least attempt to cause an increase in pressure) in the fuel line connection assembly 14 and/or at least portions of the fuel delivery system 10. Depending at least in part on whether a threshold pressure in the fuel line connection system 14 and/or the fuel delivery system 10 can be achieved, how quickly the threshold pressure is achieved, and/or once the threshold pressure is achieved, how long and/or how much of the threshold pressure is maintained, the controller 74 may be configured to determine whether a leak in the fuel line connection assembly 14 and/or the fuel delivery system 10 exists, and generate a signal indicative of the leak. In some examples, increasing pressure via the pressure source 68 in at least a portion of the fuel delivery system 10 and/or fuel line connection assembly 14 may include activating a compressor in flow communication with at least a portion of the fuel delivery system 10 and/or fuel line connection assembly 14 through the third valve 70 and/or opening a valve of a pressurized cylinder in flow communication with at least a portion of the fuel delivery system 10 and/or the fuel line connection assembly 14 through the third valve 70. In some examples, the pressure source 68 may include a cascade gas system, and in some examples, the pressurized gas may include nitrogen, argon, neon, helium, krypton, xenon, radon, and/or carbon dioxide, although other gases are contemplated. In some examples, the controller 74 may include one or more industrial control systems (ICS), such as, for example, supervisory control and data acquisition (SCADA) systems, distributed control systems (DCS), micro controllers, and/or programmable logic controllers (PLCs).

In some examples, once the testing is complete, or in order to cease the testing, the controller 74 may be configured to cause the third valve 70 to change from the open condition to the closed condition, for example, via activation of the third actuator 80, and cause the fourth valve 72 to change from the closed condition to the open condition, for example, via activation of the fourth actuator 82, to thereby close-off the pressure source 68 and/or bleed any remaining excess pressure between the pressure source 68 and the third valve 70. The controller 74 may also cause the second valve 64 to return to the open condition, for example, via activation of the second actuator 78, and/or ensure that the first valve 54 remains in the open condition (see FIG. 2A), thereby causing the fuel delivery system 10 and/or the fuel line connection assembly 14 to be in a condition to supply fuel from the fuel source 22 for operation of the GTE 20.

Figure 4:
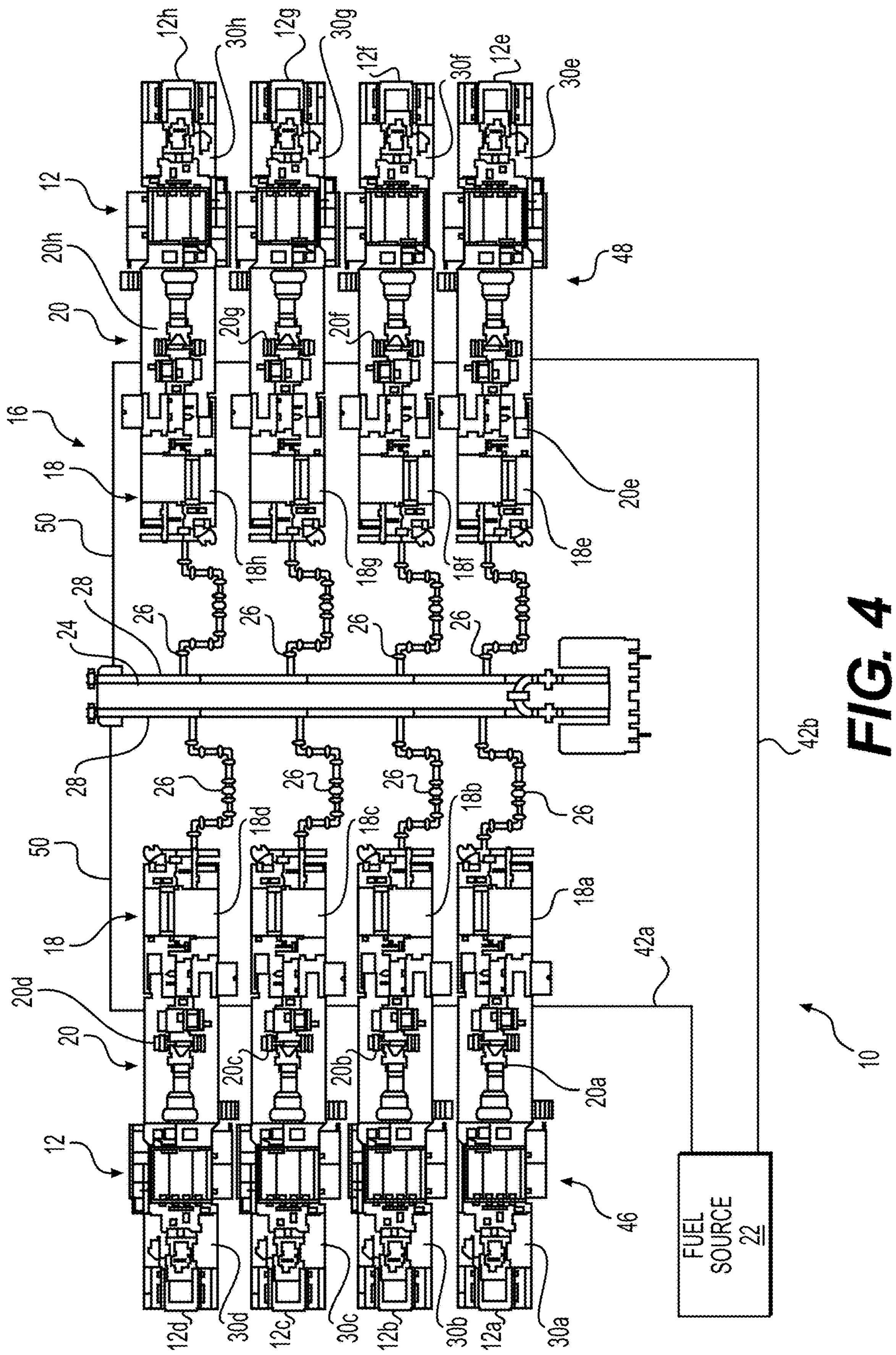
FIG. 4 is a schematic diagram showing an example fuel delivery system for supplying fuel to a plurality of hydraulic fracturing units according to embodiments of the disclosure.

FIG. 4 is a schematic diagram showing an example fuel delivery system 10 for supplying fuel to a plurality of hydraulic fracturing units 12 according to embodiments of the disclosure. As shown in FIG. 4, a first hydraulic fracturing unit 12*a* may be in flow communication with the fuel source 22 via the fuel line 42 (e.g., via a first fuel line 42*a*).

The inlet coupling 40 of the first hydraulic fracturing unit 12*a* may be coupled to the fuel line 42*a*. The outlet coupling 44 for the first hydraulic fracturing unit 12*a* may be coupled to an inlet coupling of a manifold line of a second hydraulic fracturing unit 12*b*. Similarly, the outlet coupling of the second hydraulic fracturing unit 12*b* may be coupled to the inlet coupling of a manifold line of a third hydraulic fracturing unit 12*c*. The outlet coupling of the manifold line of the third hydraulic fracturing unit 12*c* may be coupled to an inlet coupling of a manifold line of a fourth hydraulic fracturing unit 12*d*.

In the example shown, the first through fourth hydraulic fracturing units 12*a* through 12*d* may make up a first bank 46 of the hydraulic fracturing units 12, and fifth through eighth hydraulic fracturing units 12*e* through 12*h* may make up a second bank 48 of the hydraulic fracturing units 12. In some examples, for example as shown in FIG. 1, a fifth hydraulic fracturing unit 12*e* may be in flow communication with the fuel source 22 via the fuel line 42 (e.g., via a second fuel line 42*b*). The inlet coupling of the fifth hydraulic fracturing unit 12*e* may be coupled to the fuel line 42*b*. The outlet coupling for the fifth hydraulic fracturing unit 12*e* may be coupled to an inlet coupling of a manifold line of a sixth hydraulic fracturing unit 12*f*. Similarly, the outlet coupling of the sixth hydraulic fracturing unit 12*f* may be coupled to an inlet coupling of a manifold line of a seventh hydraulic fracturing unit 12*g*. The outlet coupling of the manifold line of the seventh hydraulic fracturing unit 12*g* may be coupled to an inlet coupling of a manifold line of an eighth hydraulic fracturing unit 12*h*. The example fuel delivery system 10 shown in FIG. 4 may sometimes be referred to as a "daisy-chain" arrangement.

Figure 5:
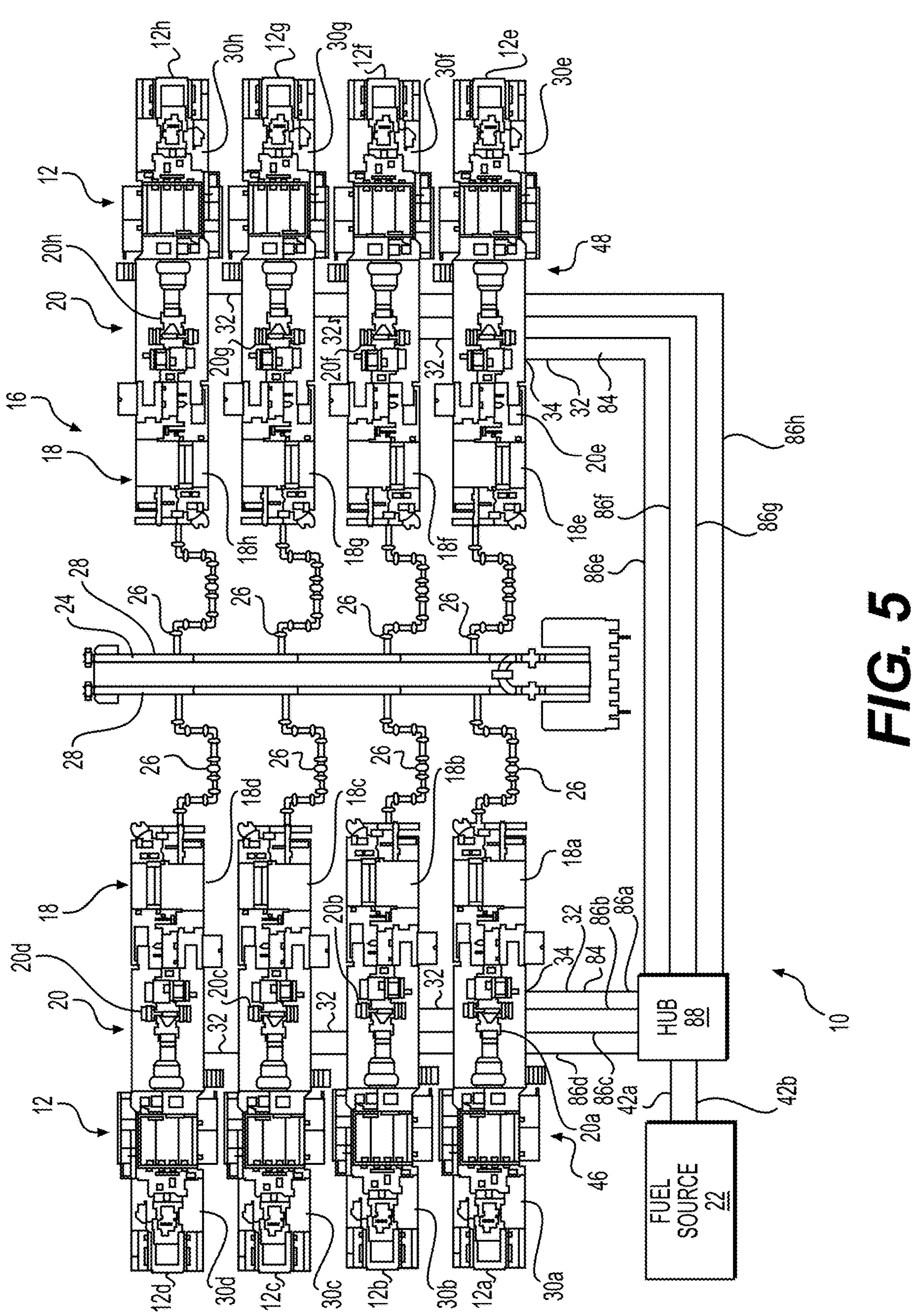
FIG. 5 is a schematic diagram showing another example fuel delivery system for supplying fuel to a plurality of hydraulic fracturing units according to embodiments of the disclosure.

FIG. 5 is a schematic diagram showing another example fuel delivery system 10 for supplying fuel to a plurality of hydraulic fracturing units 12 according to embodiments of the disclosure. As shown in FIG. 5, the inlet end 34 of the manifold line 32 of the first hydraulic fracturing unit 12*a* is connected to an outlet 84 of a main fuel line 86*a*, which is connected to a hub 88 (e.g., a fuel hub). Rather than being connected to an inlet end of another manifold line of the second hydraulic fracturing unit 12*b* as in FIG. 4, the outlet end 36 of the manifold line 32 of the first hydraulic fracturing unit 12*a* is connected to a blocking device (not shown) configured to prevent flow from the outlet end 36 of the manifold line 32 of the first hydraulic fracturing unit 12*a*. The inlet ends of the respective manifold lines of the second hydraulic fracturing unit 12*b*, the third hydraulic fracturing unit 12*c*, the fourth hydraulic fracturing unit 12*d*, the fifth hydraulic fracturing unit 12*e*, the sixth hydraulic fracturing unit 12*f*, the seventh hydraulic fracturing unit 12*g*, and the eighth hydraulic fracturing unit 12*h* (and/or more hydraulic fracturing units) are connected to the hub 88 via respective main fuel lines 86*b*, 86*c*, 86*d*, 86*e*, 86*f*, 86*g*, and 86*h*. The outlet ends of the manifold lines of the second through eighth hydraulic fracturing units 12*b* through 12*h* are each connected to a blocking device (not shown) configured to prevent flow from the outlet ends of the respective manifold lines. The example fuel delivery system 10 shown in FIG. 5 may sometimes be referred to as a "hub and spoke" arrangement.

Figure 6:
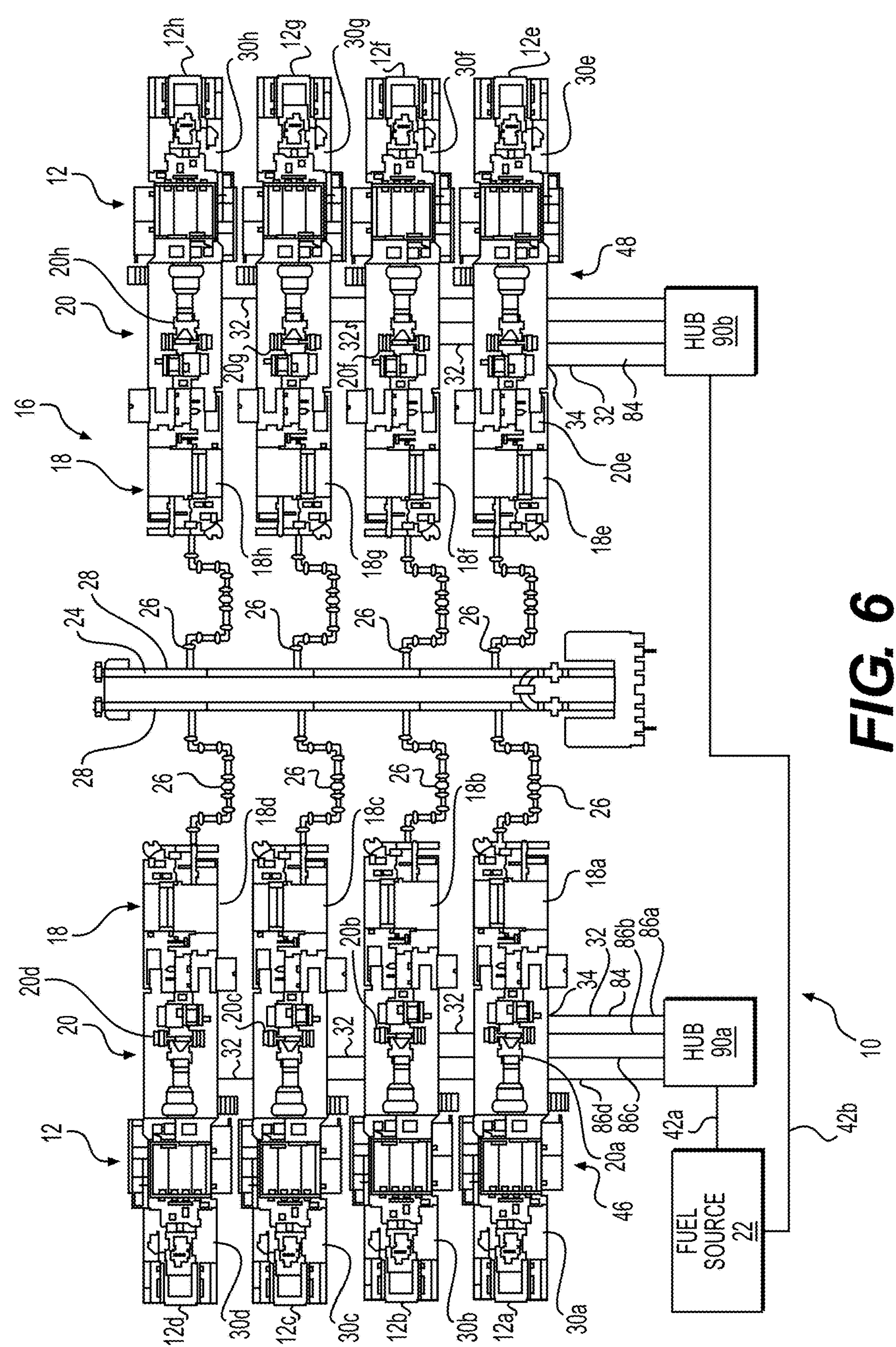
FIG. 6 is a schematic diagram showing a further example fuel delivery system for supplying fuel to a plurality of hydraulic fracturing units according to embodiments of the disclosure.

FIG. 6 is a schematic diagram showing a further example fuel delivery system 10 for supplying fuel to a plurality of hydraulic fracturing units 12 according to embodiments of the disclosure. The example fuel delivery system shown in FIG. 6 is similar to the example fuel delivery system shown in FIG. 5, except that the fuel delivery system 10 includes two hubs 90*a* and 90*b* (e.g., fuel hubs). A first one of the hubs 90*a* is connected to the fuel source 22 via a first fuel line 42, and a second hub 90*b* is connected to the fuel source 22 via a second fuel line 42*b*. The first hub 90*a* may supply fuel to one or more (e.g., each) of the GTEs 20 of the first bank 46 of hydraulic fracturing units 12, and the second hub 90*b* may supply fuel to one or more (e.g., each) of the GTEs 20 of the second bank 48 of hydraulic fracturing units 12. More than two hubs are contemplated. The example fuel delivery system 10 shown in FIG. 5 may sometimes be referred to as a "hub and spoke" arrangement, with two or more hubs.

Figure 7:
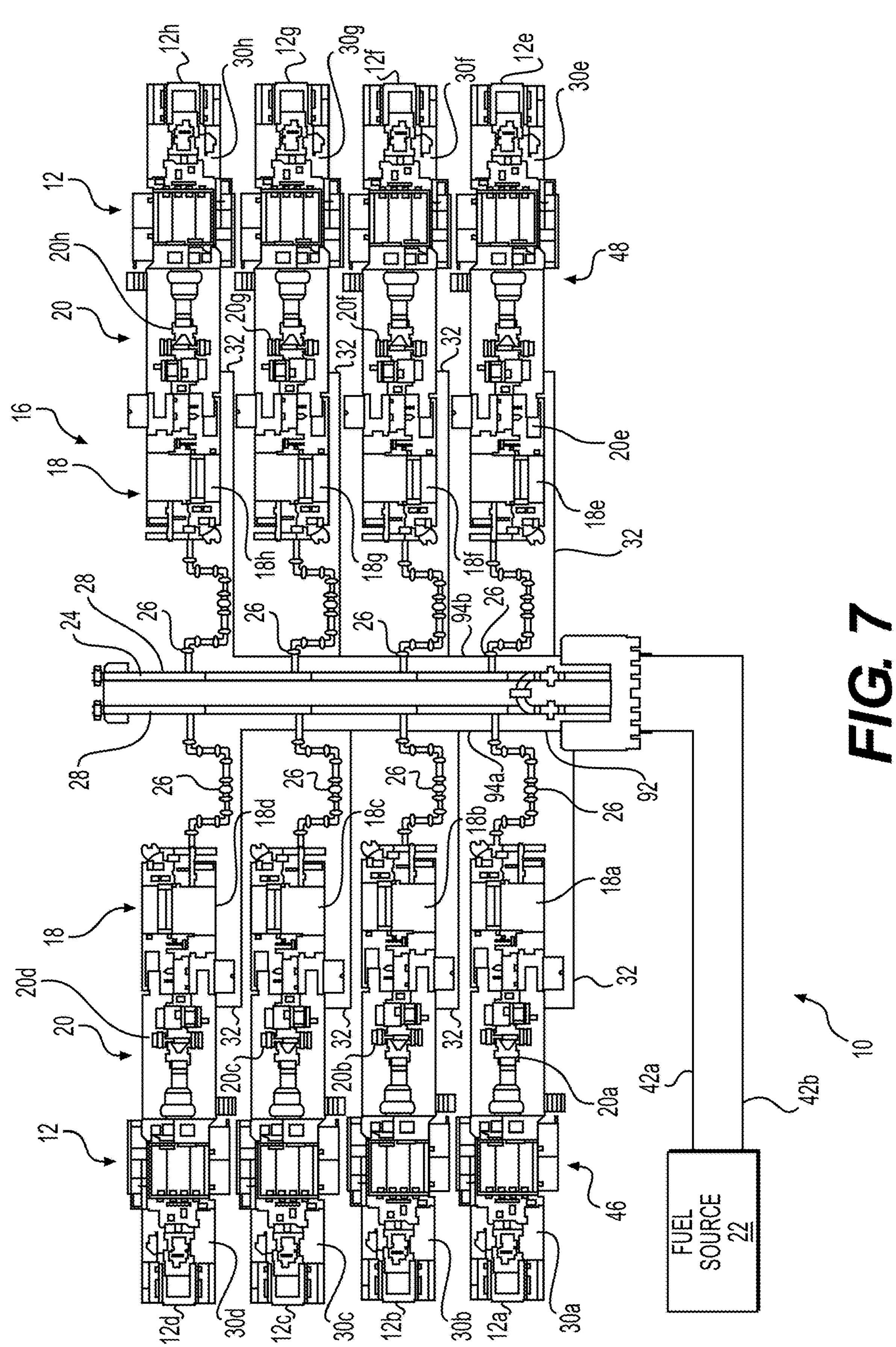
FIG. 7 is a schematic diagram showing another example fuel delivery system for supplying fuel to a plurality of hydraulic fracturing units according to embodiments of the disclosure.

FIG. 7 is a schematic diagram showing another example fuel delivery system 10 for supplying fuel to a plurality of hydraulic fracturing units 12 according to embodiments of the disclosure. The example fuel delivery system 10 shown in FIG. 7 includes a fuel manifold 92, and the example fuel manifold 92 receives fuel from the fuel source 22 via a first fuel line 42*a* and a second fuel line 42*b*, with the first fuel line 42*a* supplying fuel to the GTEs 20 of the first bank 46 of hydraulic fracturing units 12, and the second fuel line 42*b* supplying fuel for the GTEs 20 of the second bank 48 of hydraulic fracturing units 12. In some examples, the inlet end 34 of the manifold line 32 of the first hydraulic fracturing unit 12*a* is connected to a respective outlet of the fuel manifold 92 (e.g., a first bank 94*a* of the fuel manifold 92 the or main fuel line). In the example shown, the outlet end 36 of the manifold line 32 of the first hydraulic fracturing unit 12*a* is connected to a blocking device (not shown) configured to prevent flow from the outlet end 36 of the manifold line 32 of the first hydraulic fracturing unit 12*a*. The inlet ends of the respective manifold lines of the second hydraulic fracturing unit 12*b*, the third hydraulic fracturing unit 12*c*, and the fourth hydraulic fracturing unit 12*d* are connected to the first bank 94*a* of the fuel manifold 92. The outlet ends of the manifold lines of the second through fourth hydraulic fracturing units 12*b* through 12*d* are each connected to a blocking device (not shown) configured to prevent flow from the outlet ends of the respective manifold lines. In the example shown in FIG. 7, the inlet ends of the respective manifold lines of the fifth hydraulic fracturing unit 12*e* through the eighth hydraulic fracturing unit 12*h* are connected to respective outlets of the fuel manifold 92 (e.g., a second bank 94*b* of the fuel manifold 92 or main fuel line). In the example shown, the outlet ends of the respective manifold lines of the fifth through eighth hydraulic fracturing units 12*e* through 12*h* are each connected to a blocking device (not shown) configured to prevent flow from the outlet ends of the respective manifold lines of the fifth through eighth hydraulic fracturing units 12*e* through 12*h*. In some examples, the fuel manifold 92 may be connected to a trailer for portability. The example fuel delivery system 10 shown in FIG. 7 may sometimes be referred to as a "combination" arrangement.

In some examples, the configuration of the fuel line connection assemblies 14 may facilitate arranging the hydraulic fracturing units in (1) a "daisy-chain" arrangement, in which fuel passes through each of manifold lines 32 in a series-type arrangement, (2) a "hub and spoke" arrangement, in which an inlet end of each of the manifold lines 32 is connected to a fuel line from a fuel hub or the fuel source and flow from an outlet end is prevented, or (3) a "combination" arrangement, such as the example shown in FIG. 7, which may include connection of the inlet ends of the manifold lines 32 to a fuel manifold 92. Different arrangements may be desirable depending on a number of factors associated with the fracturing operation, and the flexibility of arrangements provided by at least some examples of the fuel delivery system 10 may reduce the need for multiple sets of parts to achieve each of the different arrangements. In addition, the couplings provided by the manifold lines 32, at least according to some embodiments, may reduce the time and complexity associated with setting-up and/or breaking-down the hydraulic fracturing system 16. In some examples, the number and/or types of tools required to set-up and/or break-down the hydraulic fracturing system 16 may also be reduced.

FIG. 8 is a block diagram of an example method 800 for pressure testing at least a portion of a fuel delivery system for supplying fuel from a fuel source to a plurality of GTEs according to embodiments of the disclosure, illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described blocks can be combined in any order and/or in parallel to implement the methods.

FIG. 8 is a flow diagram of an example method 800 for pressure testing at least a portion of a fuel delivery system for supplying fuel from a fuel source to a plurality of GTEs, for example, associated with pumps in a hydraulic fracturing system, according to embodiments of the disclosure. In some examples, the method 800 may be performed semi- or fully-autonomously, for example, via a controller. The method 800 may be utilized in association with various systems, such as, for example, the example fuel delivery systems 10 shown in one or more of FIG. 1, 2A, 2B, 3-7, or 9-16.

The example method 800, at 802, may include causing a first valve to be in an open condition. The first valve may be configured to facilitate flow communication or prevent flow communication between a fuel source and a GTE of the plurality of GTEs. For example, a controller may be configured to communicate with an actuator to activate the actuator to cause the first valve to be in the open condition, so that flow communication exists between the GTE and the fuel source.

At 804, the example method 800 may further include causing a second valve to be in a closed condition. The second valve may be configured to facilitate flow communication or prevent flow communication between a filter configured to filter one or more of particulates or liquids from fuel and the GTE. For example, the controller may be configured to communicate with an actuator to activate the actuator to cause the second valve to be in the closed condition, so that flow communication between the filter and the GTE is prevented. This may effectively isolate or close-off the GTE from flow communication with the fuel delivery system and/or the remainder fuel line connection assembly (e.g., with the distribution line).

At 806, the example method 800 may also include causing a third valve to be in an open condition. The third valve may be configured to facilitate flow communication or prevent flow communication between a pressure source and the filter. For example, the controller may be configured to communicate with an actuator to activate the actuator to cause the third valve to be in the open condition, so that flow communication exists between the pressure source and the filter.

The example method 800, at 808, may further include increasing pressure via the pressure source in the at least a portion of the fuel delivery system. For example, the controller may be configured to cause the pressure source to increase pressure (or at least attempt to increase pressure) in the fuel line connection assembly and/or the fuel delivery system, for example, to determine whether the fuel line connection assembly and/or the fuel line delivery system is sufficiently leak-tight for pressure to increase to, and/or hold, a predetermined or threshold pressure for a period of time. In some examples, increasing pressure via the pressure source may include activating a compressor in flow communication with the portion of the fuel line connection assembly and/or the fuel delivery system, and/or opening a valve of a pressurized cylinder in flow communication with the portion of the fuel line connection assembly and/or the fuel delivery system.

The example method 800, at 810, may also include initiating a timer. In some examples, the controller may be configured to initiate a timer and cause the increase (or attempt to increase) the pressure until a predetermined time has elapsed.

At 812, the example method 800 may also include monitoring a signal indicative of pressure in the at least a portion of the fuel delivery system. For example, a pressure sensor in flow communication with the fuel line connection system and/or the fuel delivery system may generate one or more signals indicative of the pressure in the assembly and/or system, for example, and the controller may receive the one or more signals and determine whether the pressure increases to the predetermined or threshold pressure.

At 814, the example method 800 may further include, based at least in part on the signal, determining whether the at least a portion of the fuel delivery system has a leak. For example, the controller may receive the one or more signals from the sensor indicative of pressure in the fuel line connection assembly and/or the fuel delivery system and, based at least in part on the one or more signals, determine whether a leak exists in the fuel line connection assembly and/or the fuel delivery system. In some examples, this determination may include comparing the pressure in at least a portion of the fuel delivery system at the end of the predetermined time to a predetermined pressure, and determining whether the portion of the fuel delivery system has a leak when the pressure in the portion of the fuel delivery system is less than the predetermined pressure, or the portion of the fuel delivery system does not have a leak when the pressure in the at least a portion of the fuel delivery system is at least the predetermined pressure by the end of the predetermined time. In some examples, if it has been determined that the pressure in the fuel delivery system has reached the predetermined pressure, for example, prior to the end of the predetermined time, the method may include initiating the timer, waiting for a second predetermined time to elapse, and comparing the pressure in the portion of the fuel delivery system at the second predetermined time to the predetermined pressure. If the pressure in the fuel delivery system remains above the predetermined pressure at the end of the second predetermined time, the controller may be configured to determine that the fuel line connection assembly and/or the fuel delivery system does not have a leak.

The example method 800, at 816, if it has been determined that the fuel delivery system has a leak, may also include generating a signal indicative of the leak. For example, if the controller determines that the fuel line connection assembly and/or the fuel delivery system has a leak, the controller may generate an alarm signal indicative of the leak that may be received by personnel at the hydraulic fracturing site, so that remedial measures may be performed. In some examples, the method may be configured to sequentially isolate fuel line connection assemblies associated with respective hydraulic fracturing units and perform a pressure test on each one of the fuel line connection assemblies associated with each of the hydraulic fracturing units. For example, the controller may be configured to cause valves of fuel line connection assemblies to be in a closed condition, so that a fuel line connection assembly being tested can be isolated and the pressure test performed for the isolated fuel line connection assembly. This process may be repeated for one or more of the other fuel line connection assemblies associated with respective hydraulic fracturing units.

The example method 800, at 818, if no leak has been determined at 814, may further include ceasing the pressure testing, for example, after one or more of the predetermined times have elapsed and no leaks have been detected by the controller. In addition, once a leak has been detected, for example, at 814, the method 800 may also include ceasing the pressure testing. This may include isolating the pressure source from the fuel line connection assembly and/or the fuel delivery system. In some examples, this may include ceasing operation of a compressor, closing a valve on a pressure source, such as a high pressure tank, etc.

At 820, the example method 800 may include causing a fourth valve to be in an open condition. The fourth valve may be configured to release pressure in the at least a portion of the fuel delivery system, such as the fuel line connection assembly and/or the test line. The controller may communicate with an actuator associated with the fourth valve to cause the fourth valve to be in the open condition, thereby releasing pressure increased during the pressure testing from the fuel line connection assembly and/or the fuel delivery system.

At 822, the example method 800 may further include causing the third valve to be in the closed condition and causing the second valve to be in the open condition. For example, the controller may be configured to communicate with actuators associated with the second and third valves and cause the second valve to be in the open condition so that fuel from the fuel source may be supplied to the GTE and cause the third valve to be in the closed condition to prevent fuel from passing to the test line and/or the pressure source during operation of the GTE.

In some examples, once a pressure test has been initiated, the first valve will be caused to be in the open condition for example, to allow pressure from the pressure source to fill at least a portion of the fuel delivery system (e.g., the entire fuel delivery system, including one or more fuel lines from the fuel source). The second valve will be caused to be in the closed condition and isolate the GTE from the fuel delivery system. The third valve will be caused to be in the open condition to allow pressure from the pressure source the fill the fuel delivery system and build pressure therein. The fourth valve will be caused to be in the closed condition to allow pressure to build (or attempt to build) in the fuel delivery system.

Once the first, second, third, and fourth valves are in the above-noted conditions, the pressure source will be activated to build (or attempt to build) pressure in the fuel delivery system. The sensors will generate signals indicative of the pressure in the fuel delivery system, which will be received by the controller. The controller will initiate a timer, and the pressure source will attempt to increase the pressure in the fuel delivery system to a predetermined threshold pressure for a predetermined time. The threshold pressure and/or the predetermined time may be set by an operator and/or automatically controlled via the controller according to a program. If the pressure source is unable to cause the pressure in the fuel delivery system to achieve the pressure threshold before the predetermined time has elapsed, the controller may cause the pressure source to discontinue attempting to increase the pressure in the fuel delivery system (e.g., the controller will cease operation of a compressor serving as the pressure source). The controller may also generate a signal and/or an alarm to notify an operator of a possible leak in the fuel delivery system.

If, however, the pressure in the fuel delivery system reaches the predetermine threshold pressure, the controller may cause the pressure source to discontinue attempting to increase the pressure in the fuel delivery system. The controller may also initiate a new timer and monitor the pressure in the fuel delivery system for a second predetermined time (e.g., five minutes). If the pressure in the fuel delivery system remains stable for the duration of the second predetermined time, the controller may determine that no leaks are present in the fuel delivery system, and the pressure test may be deemed successful. If the pressure drops, for example, greater than a predetermined rate (e.g., greater than 5% during the second predetermined time), the controller may be configured to generate a signal and/or an alarm to notify an operator of a possible leak in the fuel delivery system.

At the end of the pressure test, the controller (and/or the operator) may bleed pressure from the fuel delivery system, causing the fourth valve to change to the open condition to vent the pressure from the fuel delivery system. After pressure has been bled from the fuel delivery system, the controller may cause the first, second, third, and fourth valves to change to the condition consistent with operation of the hydraulic fracturing system, for example, such that the first valve is in the open condition to allow fuel to flow from the pressure source to the filter, the second valve is in the open condition to allow fuel to flow from the filter to the GTE, such that the third valve is in the closed condition to prevent fuel from flowing to the pressure source or to the fourth valve, and such that the fourth valve is in the closed condition, so that if another pressure test is commenced, the fourth valve will prevent bleeding of the pressure from the pressure source.

It should be appreciated that subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Figure 9:
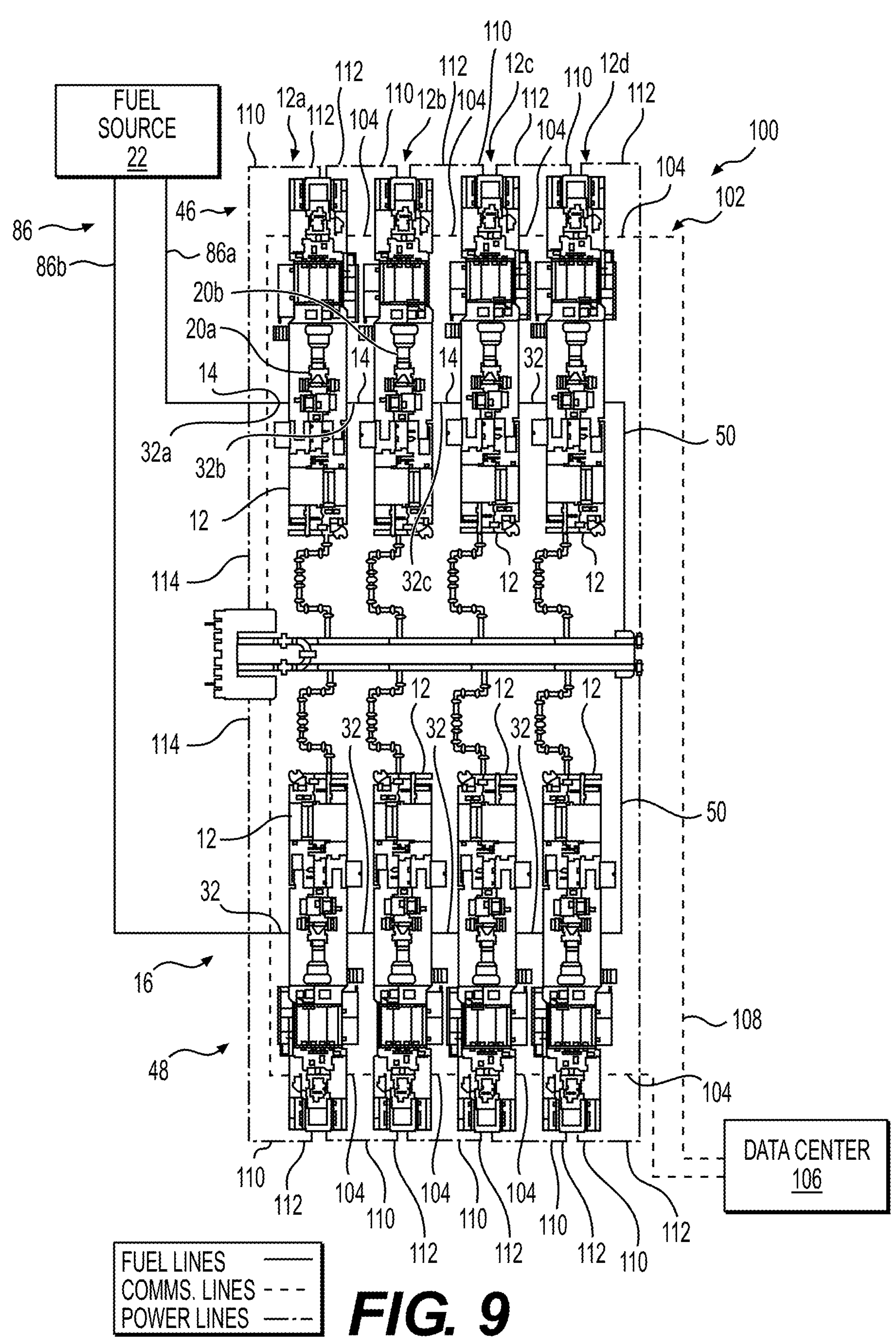
FIG. 9 is a schematic diagram showing an example system for supplying fuel, enabling communications, and conveying electric power associated with operation of a plurality of hydraulic fracturing units according to embodiments of the disclosure.

FIG. 9 is a schematic diagram showing a portion of an example hydraulic fracturing system 16 including an example system 100 for supplying fuel, enabling communications, and conveying electric power associated with operation of a plurality of hydraulic fracturing units 12 according to embodiments of the disclosure. The example system 100 shown in FIG. 9 may sometimes be referred to as a "daisy-chain" arrangement. In the example shown in FIG. 9, the system 100 includes a main fuel line 86 configured to supply fuel from a fuel source 22 to the plurality of hydraulic fracturing units 12. Each of the example hydraulic fracturing units 12 includes a chassis 30 (e.g., including a trailer and/or a truck body), a pump 18 connected to the chassis 30, and a GTE 20 connected to the chassis 30 and configured to convert fuel into a power output for operating the pump 18. In the example shown, the hydraulic fracturing units 12 are arranged into a first bank 46 of hydraulic fracturing units 12 and a second bank 48 of hydraulic fracturing units 12, and the main fuel line 86 includes a first main fuel line 86*a* configured to supply fuel to the first bank 46 of hydraulic fracturing units 12 and a second main fuel line 86*b* configured to supply fuel to the second bank 48 of the hydraulic fracturing units.

In the example system 100 shown in in FIG. 9, a fuel line connection assembly 14 is provided for each of the hydraulic fracturing units to supply fuel from the fuel source 22 to each of the GTEs 20 of the respective hydraulic fracturing units 12. The respective fuel line connection assemblies 14 may include a manifold line 32 defining an inlet end 34, an outlet end 36, and a flow path 38 for fuel extending between the inlet end 34 and the outlet end 36 (see, e.g., FIGS. 1, 2A, 2B, and 3). The manifold line 32 may be configured to provide at least a portion of a flow path for supplying fuel to a first GTE 20 of the respective hydraulic fracturing unit 12. One or more of the fuel line connection assemblies 14 may be configured to provide flow communication between the main fuel line 86 or another GTE 20 (relative to the first GTE 20 associated with the fuel line connection assembly 14) of another hydraulic fracturing unit 12 upstream of the first GTE 20, and another additional GTE 20 of another additional hydraulic fracturing unit 12 downstream of the first GTE 20.

For example, as shown in FIG. 9, the fuel line connection assembly 14 associated with a first GTE 20*a* of a respective first hydraulic fracturing unit 12*a* includes a first manifold line 32*a* having an inlet end configured to be in flow communication with the first main fuel line 86*a* and an outlet end configured to be in flow communication with an inlet end of a manifold line 32*b* of a second hydraulic fracturing unit 12*b* downstream of the first hydraulic fracturing unit 12*a*. The fuel line connection assembly 14 associated with a second GTE 20*b* of the respective second hydraulic fracturing unit 12*b* includes the second manifold line 32*b* having the inlet end configured to be in flow communication with the outlet end of the first manifold line 32*a* of the first hydraulic fracturing unit 12*a* upstream of the second hydraulic fracturing unit 12*b*, and an outlet end configured to be in flow communication with an inlet end of a manifold line 32*c* of a third hydraulic fracturing unit 12*c* downstream of the second hydraulic fracturing unit 12*b*. In some examples, this pattern may be repeated throughout the first bank 46 of hydraulic fracturing units 12*a* through 12*d*, and again throughout the second bank 48 of hydraulic fracturing units 12*e* though 12*h*.

As shown in FIG. 9, in some examples, fuel that reaches the end of the first bank 46 of the hydraulic fracturing units 12 remote from the fuel source 22 and/or fuel that reaches the end of the second bank 48 of the hydraulic fracturing units 12 remote from the fuel source 22 may be combined and/or transferred between the first bank 46 and the second bank 48, for example, via a transfer line 50 configured to provide flow communication between the first bank 46 and the second bank 48. For example, unused fuel supplied to either of the first bank 46 or the second bank 48 of hydraulic fracturing units 12 may be passed to the other bank of the two banks via the transfer line 50, thereby sharing fuel between the banks 46 and 48.

As shown in FIG. 9, the system 100 may also include, for one or more (e.g., each) of the hydraulic fracturing units 12, a communications cable assembly 102 including a length of communications cable 104 connected to a respective one of the hydraulic fracturing units 12 and configured to enable data communications between the respective hydraulic fracturing unit 12 and a data center 106 remote from the respective hydraulic fracturing unit 12 or one or more additional hydraulic fracturing units 12.

For example, as shown FIG. 9, a data center communications cable 108 may provide a communications link between the data center 106 and a first one of the hydraulic fracturing units 12. The hydraulic fracturing unit 12 may include a length of communications cable 104 that extends to a next one of the hydraulic fracturing units 12, and that hydraulic fracturing unit 12 may include a length of communications cable 104 that extends to a next one of the hydraulic fracturing units 12. In some examples, each of the hydraulic fracturing units 12 may include a length of communications cable 104 for extending to a next one of the hydraulic fracturing units 12. In this example fashion, each of the hydraulic fracturing units 12 may be linked to one another and to the data center 104. As shown in FIG. 9, in some examples, a last-in-line hydraulic fracturing unit 12 may include a length of communications cable 104 that runs to the data center 106, thus resulting in a continuous communications link, by which one or more of the hydraulic fracturing units 12 may be in communication with the data center 104. In some examples, the data center 104 may be configured to transmit communications signals and/or receive communications signals, and the communications signals may include data indicative of operation of one or more of the plurality of hydraulic fracturing units 12, including, for example, parameters associated with operation of the pumps 18 and/or the GTEs 20, as well as additional data related to other parameters associated with operation and/or testing of one or more of the hydraulic fracturing units 12.

In some examples, the communications cable 104 may include a first end configured to be connected to a first unit interface connected to a respective hydraulic fracturing unit 12. The length of communications cable 104 may also include a second end configured to be connected to a data center interface of the data center 106 or a second unit interface connected to another one of the hydraulic fracturing units 12. One or more of the first end or the second end of the length of communications cable 104 may include or be provided with a quick connecter configured to be connected to one or more of the first unit interface or the data center interface, for example, as discussed herein with respect to FIG. 18.

In some examples, the communications cable assembly 102 may also include a communications cable storage apparatus connected to the respective hydraulic fracturing unit 12 and configured to store the length of communications cable 104 when not in use and to facilitate deployment of at least a portion of the length of communications cable 104 for connection to the data center 106 or the another hydraulic fracturing unit 12. The communications cable storage apparatus may include a cable reel configured to be connected to the hydraulic fracturing unit 12 and/or a cable support configured to be connected to the hydraulic fracturing unit 12 and to receive windings of at least a portion of the length of communications cable 104.

As shown in FIG. 9, some examples of the system 100 may also include a power cable assembly 110 including a length of power cable 112 connected to one or more (e.g., each) of the hydraulic fracturing units 12 and configured to convey electric power between the hydraulic fracturing units 12 and a remote electrical power source or one or more additional hydraulic fracturing units 12 of the hydraulic fracturing system 16. For example, as shown in FIG. 9, a length of power cable 112 is connected to each of the hydraulic fracturing units 12, and each of the lengths of power cable 112 are configured to be connected to a next-in-line hydraulic fracturing unit 12. In some examples, the length of power cable 112 may extend from one hydraulic fracturing unit 12 to another hydraulic fracturing unit 12 other than a next-in-line hydraulic fracturing unit 12. One or more of the lengths of power cable 112 may include a first end including a power plug configured to be received in a power socket, for example, as discussed herein with respect to FIG. 19.

In some examples, one or more of the power cable assemblies 110 may also include a power cable storage apparatus configured to be connected to the respective hydraulic fracturing unit 12. The power cable storage apparatus, in some examples, may be configured to store the length of power cable 112 when not in use and to facilitate deployment of at least a portion of the length of power cable 112 for use.

As shown in FIG. 9, each of the hydraulic fracturing units 12 in the example shown includes a length of power cable 112. In some such examples, each of the hydraulic fracturing units 12 is configured to supply and/or generate its own electric power, for example, by operation of a generator connected to the GTE 20 and/or to another source of mechanical power, such as another gas turbine engine or reciprocating piston engine (e.g., a diesel engine). In the example configuration shown in FIG. 9, the lengths of power cable 112 run between each of the hydraulic fracturing units 12, thus connecting all the hydraulic fracturing units 12 to one another, such that power may be shared among at least some or all of the hydraulic fracturing units 12. Thus, if one or more of the hydraulic fracturing units 12 is unable to generate its own electric power or is unable to generate a sufficient amount of electric power to meet its operation requirements, electric power from one or more of the remaining hydraulic fracturing units 12 may be used to mitigate or overcome the electric power deficit. As shown additional lengths of power cable 114 may be included in the system 100 to supply electric power between the two banks 46 and 48 of the hydraulic fracturing units 12.

Figure 10:
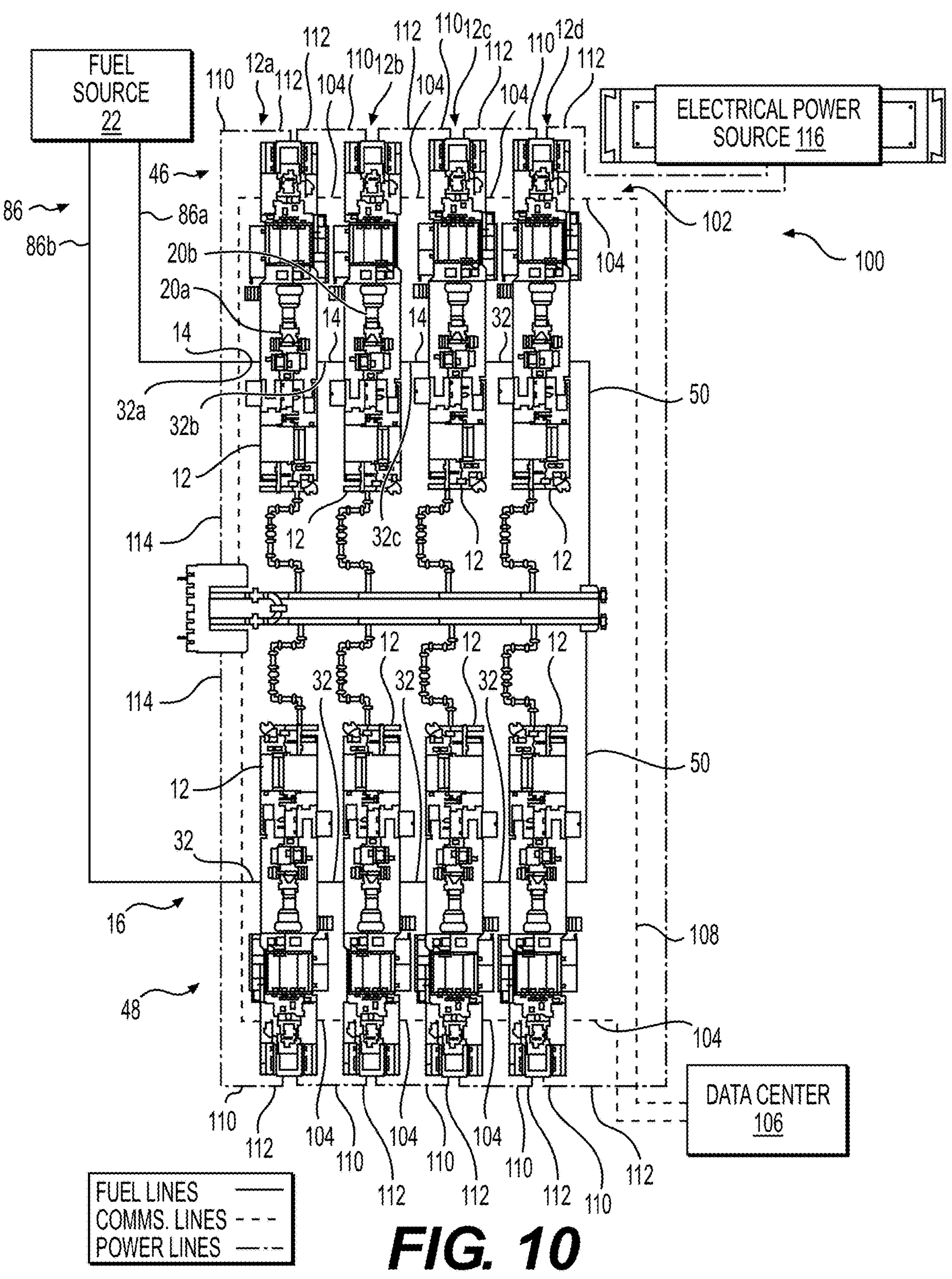
FIG. 10 is a schematic diagram showing another example system for supplying fuel, enabling communications, and conveying electric power associated with operation of a plurality of hydraulic fracturing units according to embodiments of the disclosure.

FIG. 10 is a schematic diagram showing another example system 100 for supplying fuel, enabling communications, and conveying electric power associated with operation of a plurality of hydraulic fracturing units 12 according to embodiments of the disclosure. The example system 100 shown in FIG. 10 is similar to the example system 100 shown in FIG. 9, except that the example system 100 shown in FIG. 10 includes an electrical power source 116 located remotely from each of the hydraulic fracturing units 12, for example, such that the electrical power source 116 is not mechanically connected directly to the chassis 30 of one or more of the hydraulic fracturing units 12. In some examples, the electrical power source 116 may include one or more of one or more power generation devices or one or more batteries. For example, the electrical power source 116 may include one or more gensets (e.g., including an internal combustion engine-driven electrical generator) and/or one or more electric power storage devices, such as, for example, one or more batteries.

As shown in FIG. 10, the electrical power source 116 may be electrically coupled to one or more of the first bank 46 or the second bank 48 of the hydraulic fracturing units 12 via an additional length of power cable 114, and in some examples, the first bank 46 and the second bank 48 of hydraulic fracturing units 12 may be, electrically coupled to one another via additional lengths of power cable 114. In at least some such examples, even if one or more of the hydraulic fracturing units 12 lacks electric power, electric power may be supplied to that particular hydraulic fracturing unit 12 via power cables 104 and/or 114, thereby providing an ability to continue operations of the hydraulic fracturing units 12.

Figure 11:
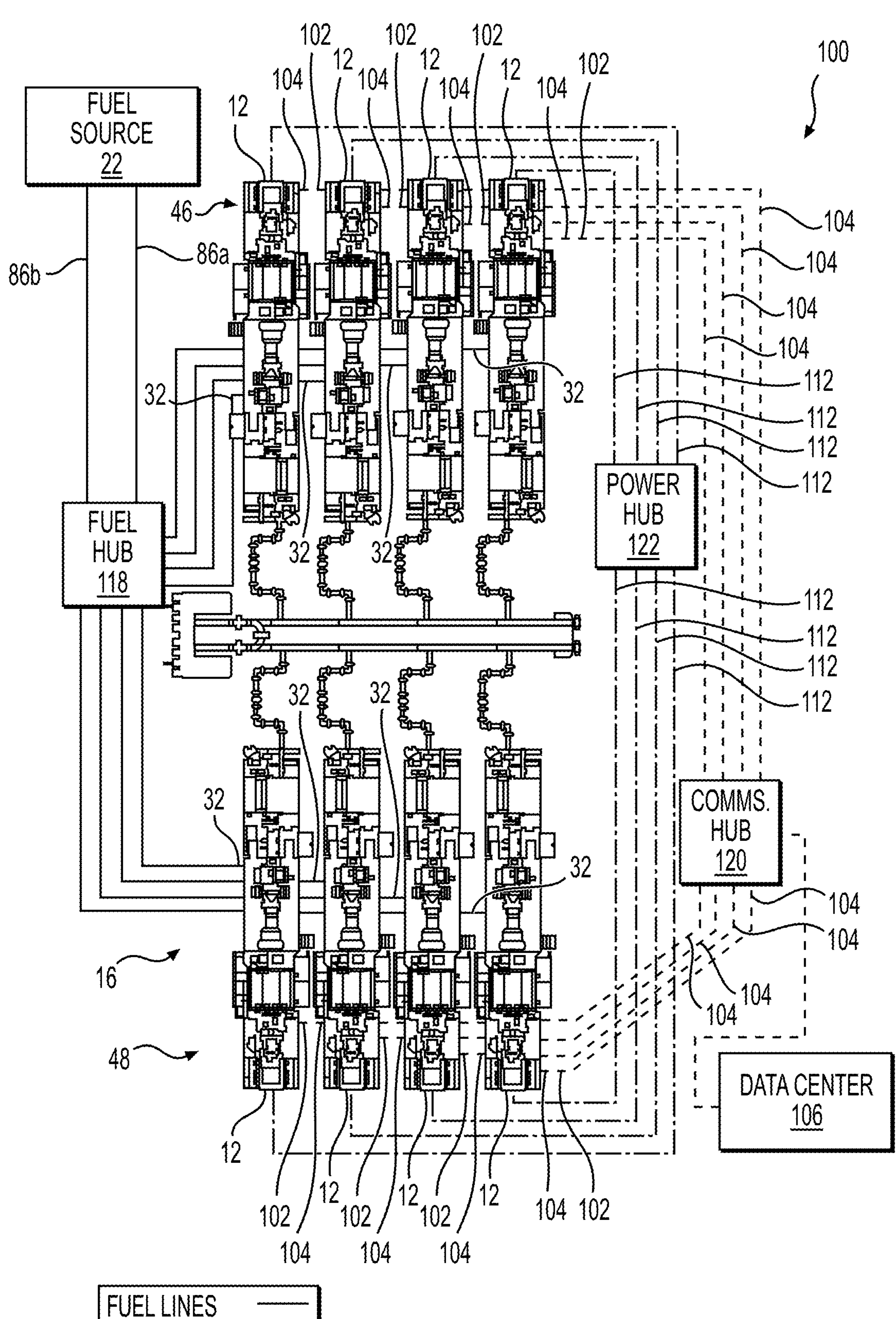
FIG. 11 is a schematic diagram showing a further example system for supplying fuel, enabling communications, and conveying electric power associated with operation of a plurality of hydraulic fracturing units according to embodiments of the disclosure.

FIG. 11 is a schematic diagram showing a further example system 100 for supplying fuel, enabling communications, and conveying electric power associated with operation of a plurality of hydraulic fracturing units 12 according to embodiments of the disclosure. The example system 100 shown in FIG. 11 may sometimes be referred to as a "hub and spoke" arrangement. In the example shown in FIG. 11, the system 100 includes a fuel source 22 for supplying fuel to the plurality of hydraulic fracturing units 12, and a fuel hub 118 for distributing the fuel from the fuel source 22 to each of the plurality of hydraulic fracturing units 12. For example, the fuel hub 118 may be in flow communication with the fuel source 22 via the main fuel lines 86*a* and 86*b*, and the fuel hub 118 may be in flow communication with each of the fuel line connection assemblies 14 of each of the respective hydraulic fracturing units 12 (see, e.g., FIGS. 1, 2A, 2B, and 3). In the example shown, the inlet end 34 of each of the manifold lines 32 of the each of the hydraulic fracturing units 12 is connected to an outlet of the main fuel line 86, for example, via the fuel hub 118. In some such examples, the outlet end 36 of each of the manifold lines 32 of the respective hydraulic fracturing units 12 is connected to a blocking device configured to prevent flow from the outlet end 36 of the manifold line 32.

In the example shown in FIG. 11, the system 100 includes a data center 106 located remotely from each of the hydraulic fracturing units 12 (e.g., the data center 106 is not mechanically connected to the chassis 30 of any of the hydraulic fracturing units 12). The data center 106 is communicatively connected to a communications hub 120, and each of the hydraulic fracturing units 12 is communicatively connected to the communications hub 120 by their respective communications cable assemblies 102, including the respective communications cables 104.

In the example shown in FIG. 11, the system 100 also includes a power hub 122 electrically connected to each of the hydraulic fracturing units 12 via the respective power cable assemblies 110, including the respective power cables 112. In some examples, the power hub 122 may be configured to supply electric power to any of the hydraulic fracturing units 12 unable to supply its own electric power and/or unable to provide a sufficient amount of its own electric power. For example, at least some of the hydraulic fracturing units 12 may be configured to generate electric power, for example, via one or more genets mounted to the respective chassis 30 of the respective hydraulic fracturing unit 12. Any excess electric power generated by one or more of the hydraulic fracturing units 12 may be electrically communicated to the power hub 122 via the respective power cable assembly 110. Such excess power may be electrically communicated from the power hub 122 to any of the hydraulic fracturing units 12 lacking sufficient electric power via the respective power cable assembly 110.

Figure 12:
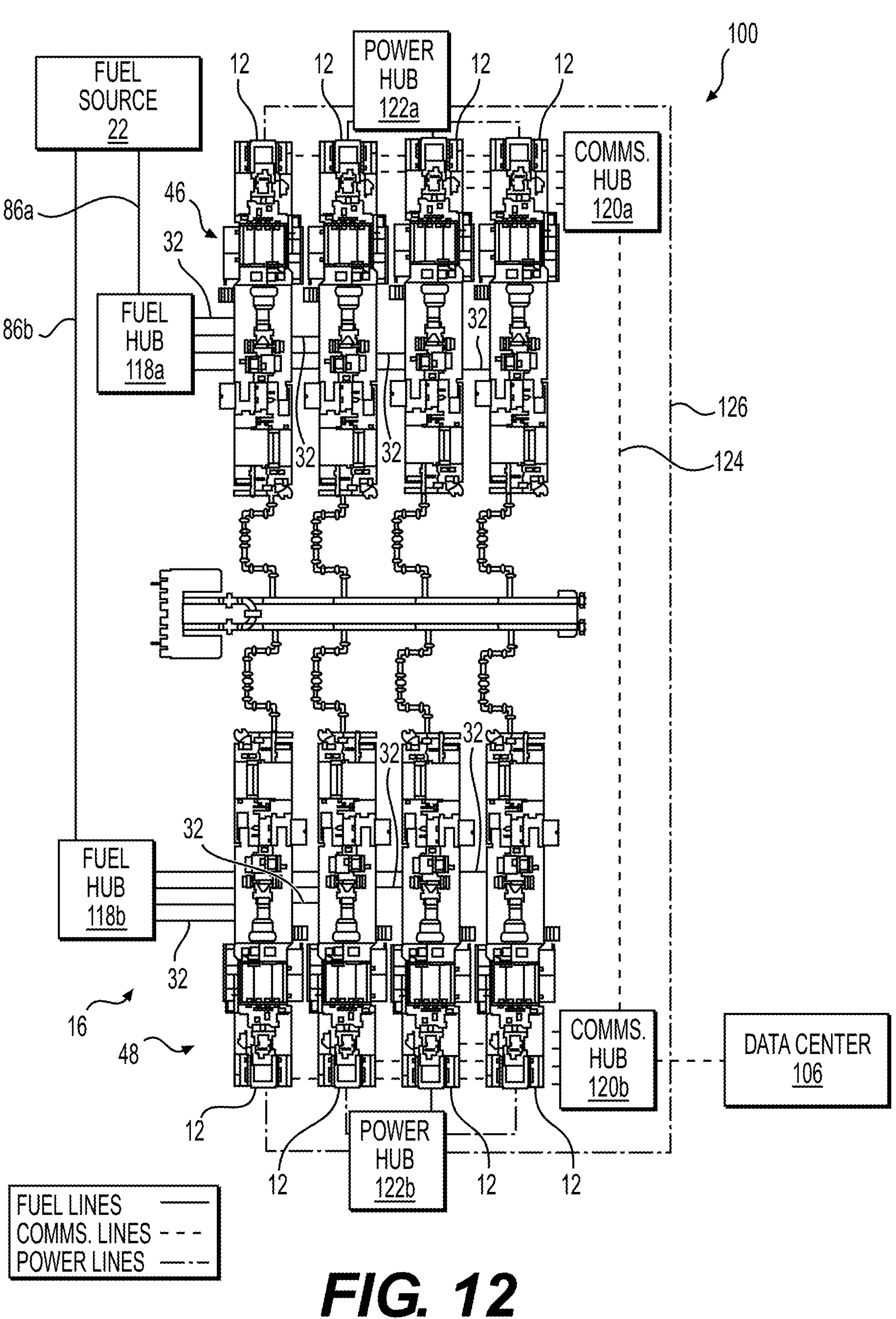
FIG. 12 is a schematic diagram showing another example system for supplying fuel, enabling communications, and conveying electric power associated with operation of a plurality of hydraulic fracturing units according to embodiments of the disclosure.

FIG. 12 is a schematic diagram showing another example system 100 for supplying fuel, enabling communications, and conveying electric power associated with operation of a plurality of hydraulic fracturing units 12 according to embodiments of the disclosure. The example system 100 shown in FIG. 12 is similar to the example system 100 shown in FIG. 11, except that it includes a first fuel hub 118*a* and a second fuel hub 118*b*, a first communications hub 120*a* and a second communications hub 120*b*, and a first power hub 122*a* and a second power hub 122*b*, each respectively supplying fuel, communications, and electric power, to the first bank 46 of hydraulic fracturing units 12 and the second bank 48 of the hydraulic fracturing units 12.

For example, a first main fuel line 86*a* may provide flow communication from the fuel source 22 to the first fuel hub 118*a*, and the second main fuel line 86*b* may provide flow communication from the fuel source 22 to the second fuel hub 118*b*. The first and second fuel hubs 118*a* and 118*b* may respectively supply fuel to each of the manifold lines 32 of the respective hydraulic fracturing units 12 of each of the first and second banks 46 and 48 of the hydraulic fracturing units 12. The first communications hub 120*a* may be communicatively connected to each of the hydraulic fracturing units 12 of the first bank 46, and the second communications hub 120*b* may be communicatively connected to each of the hydraulic fracturing units 12 of the second bank 48, for example, via the communications cable assembly 102 of each of the hydraulic fracturing units 12. In some examples, one or more of the first communications hub 120*a* or the second communications hub 120*b* may be communicatively connected to the data center 104, for example, as shown in FIG. 12. In some examples, the first and second communications hubs 120*a* and 120*b* may be communicatively linked via an intermediate communications cable 124, for example, as shown in FIG. 12.

As shown in FIG. 12, each of the first and second power hubs 122*a* and 122*b* may be electrically connected to the first bank 46 and second bank 48, respectively, of the hydraulic fracturing units 12, for example, via the respective power cable assemblies 110 of each of the hydraulic fracturing units 12. As shown in FIG. 12, in some examples, the first power hub 122*a* and the second power hub 122*b* may be electrically connected to one another via an intermediate power cable 126. In some examples, the first and second power hubs 122*a* and 122*b* may be configured to supply electric power to any of the hydraulic fracturing units 12 unable to supply its own electric power and/or unable to provide a sufficient amount of its own electric power. For example, at least some of the hydraulic fracturing units 12 may be configured to generate electric power, for example, via one or more genets mounted to the respective chassis 30 of the respective hydraulic fracturing unit 12. Any excess electric power generated by one or more of the hydraulic fracturing units 12 may be electrically communicated to the first and second power hubs 122*a* and 122*b* via the respective power cable assembly 110. Such excess power may be electrically communicated from one or more of the first and second power hubs 122*a* and/or 122*b* to any of the hydraulic fracturing units 12 lacking sufficient electric power via the respective power cable assembly 110.

Figure 13:
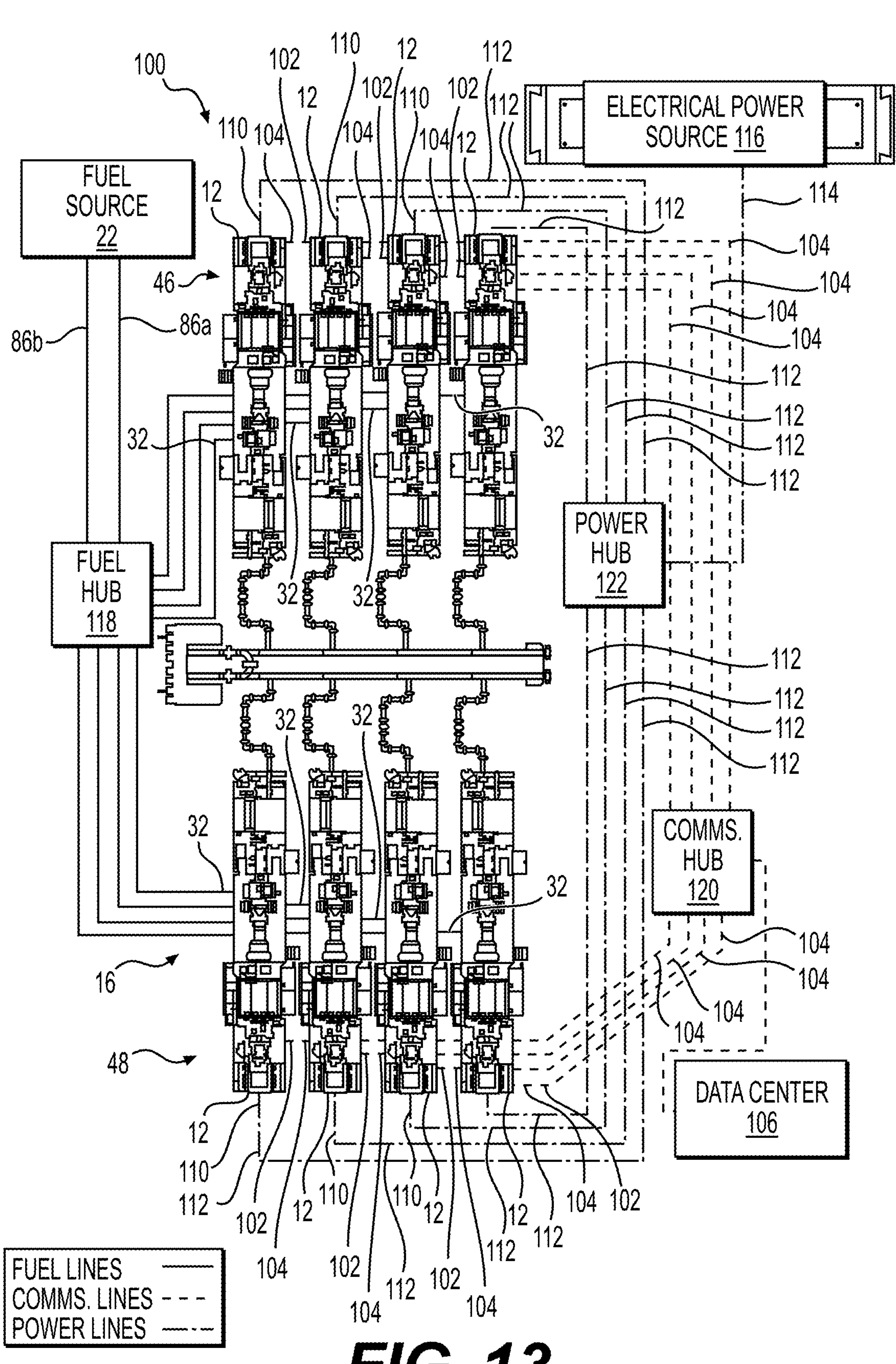
FIG. 13 is a schematic diagram showing a further example system for supplying fuel, enabling communications, and conveying electric power associated with operation of a plurality of hydraulic fracturing units according to embodiments of the disclosure.

FIG. 13 is a schematic diagram showing a further example system 100 for supplying fuel, enabling communications, and conveying electric power associated with operation of a plurality of hydraulic fracturing units 12 according to embodiments of the disclosure. The example system shown in FIG. 13 is similar to the example system 100 shown in FIG. 11, except that the system 100 shown in FIG. 13 includes an electrical power source 116 located remote from the hydraulic fracturing units 12 (e.g., not mechanically connected to any of the chassis 30 of the hydraulic fracturing units 12). The electrical power source 116 may be electrically connected to the power hub 122 via an additional length of power cable 114, and the power hub 122 may be electrically connected to each of hydraulic fracturing units 12 via their respective power cable assemblies 110, for example, as shown in FIG. 13.

Figure 14:
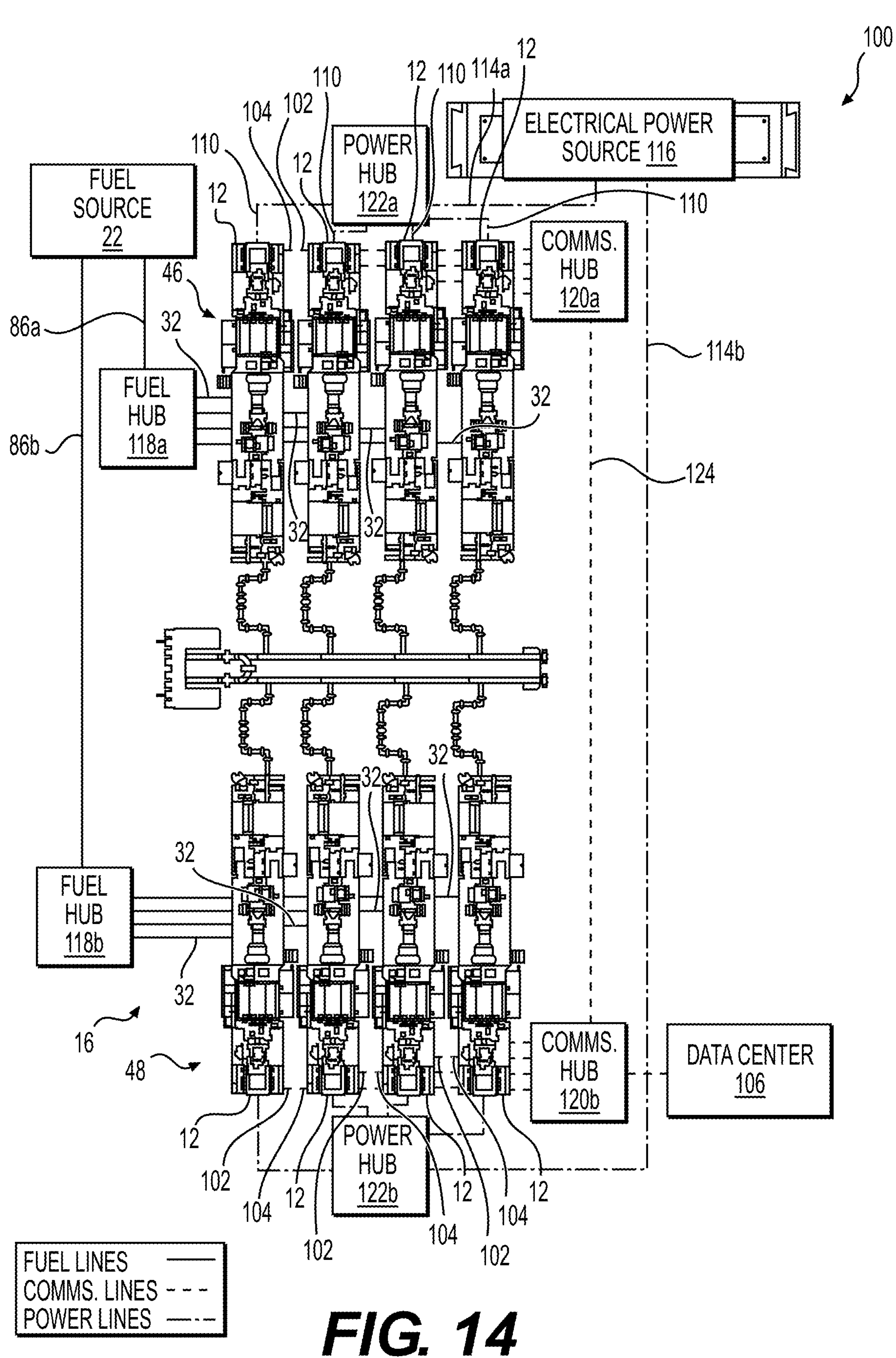
FIG. 14 is a schematic diagram showing another example system for supplying fuel, enabling communications, and conveying electric power associated with operation of a plurality of hydraulic fracturing units according to embodiments of the disclosure.

FIG. 14 is a schematic diagram showing another example system 100 for supplying fuel, enabling communications, and conveying electric power associated with operation of a plurality of hydraulic fracturing units 12 according to embodiments of the disclosure. The example system 100 shown in FIG. 14 is similar to the example system 100 shown in FIG. 12, except that the system 100 shown in FIG. 14 includes an electrical power source 116 located remote from the hydraulic fracturing units 12 (e.g., not mechanically connected to any of the chassis 30 of the hydraulic fracturing units 12). The electrical power source 116 may be electrically connected to the first power hub power hub 122*a* via a first additional length of power cable 114*a*, and connected to the second power hub power hub 122*b* via a second additional length of power cable 114*b*. The first and second power hubs 122*a* and 122*b* may be electrically connected to each of hydraulic fracturing units 12 via their respective power cable assemblies 110, for example, as shown in FIG. 14.

Figure 15:
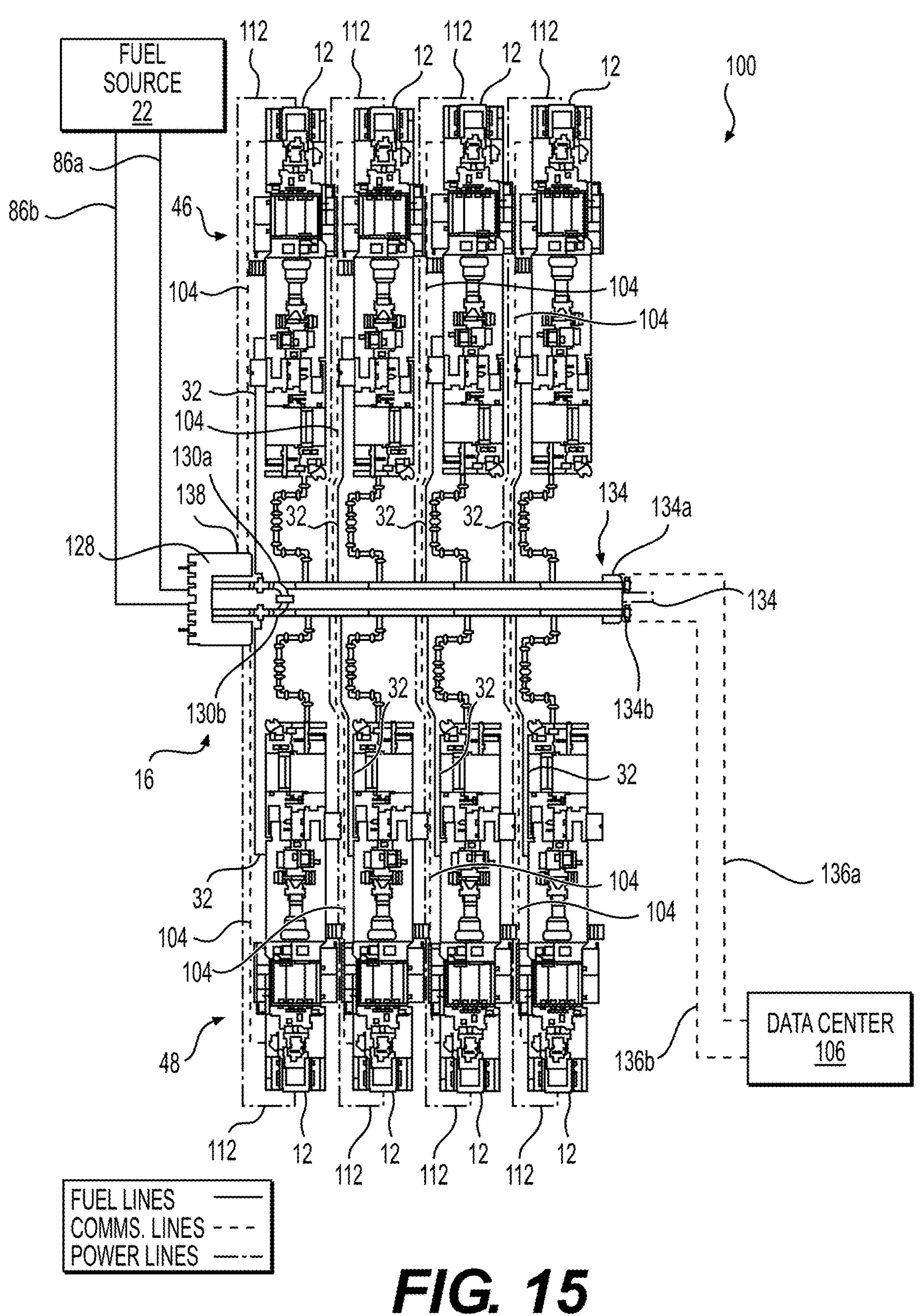
FIG. 15 is a schematic diagram showing a further example system for supplying fuel, enabling communications, and conveying electric power associated with operation of a plurality of hydraulic fracturing units according to embodiments of the disclosure.

FIG. 15 is a schematic diagram showing a further example system 100 for supplying fuel, enabling communications, and conveying electric power associated with operation of a plurality of hydraulic fracturing units 12 according to embodiments of the disclosure. In the example system 100 shown in FIG. 15, the system 100 may include a main fuel manifold 128 in flow communication with the fuel supply 22 via a first main fuel line 86*a* and a second main fuel line 86*b*. In some examples, the main fuel manifold 128 may be mounted on a trailer or a truck body for portability (e.g., on a high-pressure iron manifold trailer) or supported by the ground. In the example shown, the main fuel manifold 128 includes a first fuel line 130*a* and a second fuel line 130*b* running along the length of the main fuel manifold 128. In some examples, each of the first and second fuel lines 130*a* and 130*b* may include a plurality of valves, each of which may be in flow communication with a respective manifold line 32 of each of the hydraulic fracturing units 12. The first fuel line 130*a* may be configured to supply fuel to the first bank 46 of hydraulic fracturing units 12, and the second fuel line 130*b* may be configured to supply fuel to the second bank 48 of the hydraulic fracturing units 12, for example, via the respective manifold lines 32 of the respective hydraulic fracturing units 12. In some examples, the first fuel line 130*a* and the second fuel line 130*b* may be in flow communication with one another via an intermediate fuel line 132, which, in some examples, may assist with equalizing pressure and/or volume between the first fuel line 130*a* and the second fuel line 130*b*.

The example system 100 shown in FIG. 15 also includes a communications harness 134 in communication with the data center 106, for example, via a first communications cable 136*a* and a second communications cable 136*b*. In some examples, the communications harness 134 may be mounted on a trailer or a truck body for portability (e.g., on a high-pressure iron manifold trailer) or supported by the ground. In some examples, the communications harness 134 may include a plurality of connection points along its length configured to facilitate connection to a communications cable 104 from each of the respective hydraulic fracturing units 12 to provide a communications link between each of the hydraulic fracturing units 12 and the data center 106. As shown, some examples of the communications harness 134 may include a first communications harness 134*a* and a second communications harness 134*b* configured to respectively provide communications links with the first bank 46 and the second bank 48 of the hydraulic fracturing units 12.

As shown in FIG. 15, the example system 100 also includes a power harness 138 in electrical communication with the plurality of power cables 112 of the respective hydraulic fracturing units 12. In some examples, the power harness 138 may be mounted on a trailer or a truck body for portability (e.g., on a high-pressure iron manifold trailer) or supported by the ground. In some examples, the power harness 138 may include a plurality of power receptacles located along its length and configured to facilitate connection with a power plug of a respective power cable 112 from each of the respective hydraulic fracturing units 12 to provide a power link between each of the hydraulic fracturing units 12. In some examples, any excess electric power generated by one or more of the hydraulic fracturing units 12 may be electrically supplied to the power harness 138 via the respective power cable assembly 110. Such excess power may be electrically communicated to any of the hydraulic fracturing units 12 lacking sufficient electric power via the respective power cable assembly 110.

In the example shown in FIG. 15, the power harness 138 includes a first power harness line 140*a* and a second power harness line 140*b* configured to supply electric power to the first bank 46 and the second bank 48 of the hydraulic fracturing units 12, respectively. In some examples, an intermediate power cable 142 may be provided to electrically connect the first power harness line 140*a* and the second power harness line 140*b* to one another, for example, so that electric power may be shared between the first power harness line 140*a* and the second power harness line 140*b*.

Figure 16:
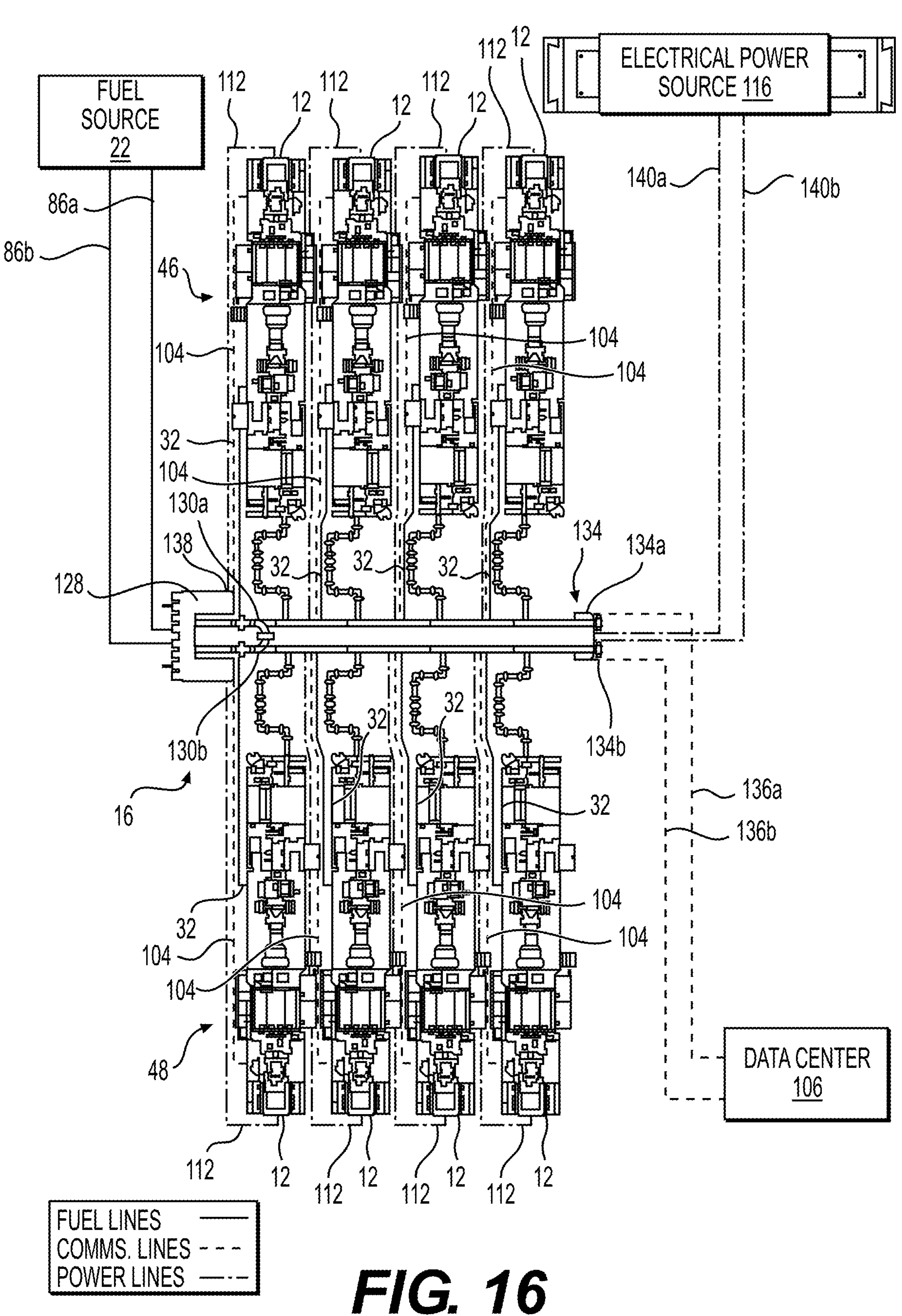
FIG. 16 is a schematic diagram showing another example system for supplying fuel, enabling communications, and conveying electric power associated with operation of a plurality of hydraulic fracturing units according to embodiments of the disclosure.

FIG. 16 is a schematic diagram showing another example system 100 for supplying fuel, enabling communications, and conveying electric power associated with operation of a plurality of hydraulic fracturing units 12 according to embodiments of the disclosure. The example system 100 is similar to the example system 100 shown in FIG. 15, except that that the example 100 shown in FIG. 16 includes an electrical power source 116 located remote from the hydraulic fracturing units 12 (e.g., not mechanically connected to any of the chassis 30 of the hydraulic fracturing units 12). The electrical power source 116 may be electrically connected to the first and second power harness lines 140*a* and 140*b* via first and second additional lengths of power cable 114*a* and 114*b*, respectively. The first and second power harness lines 140*a* and 140*b* may be electrically connected to each of hydraulic fracturing units 12 via their respective power cable assemblies 110, for example, as shown in FIG. 16.

Figure 17A:
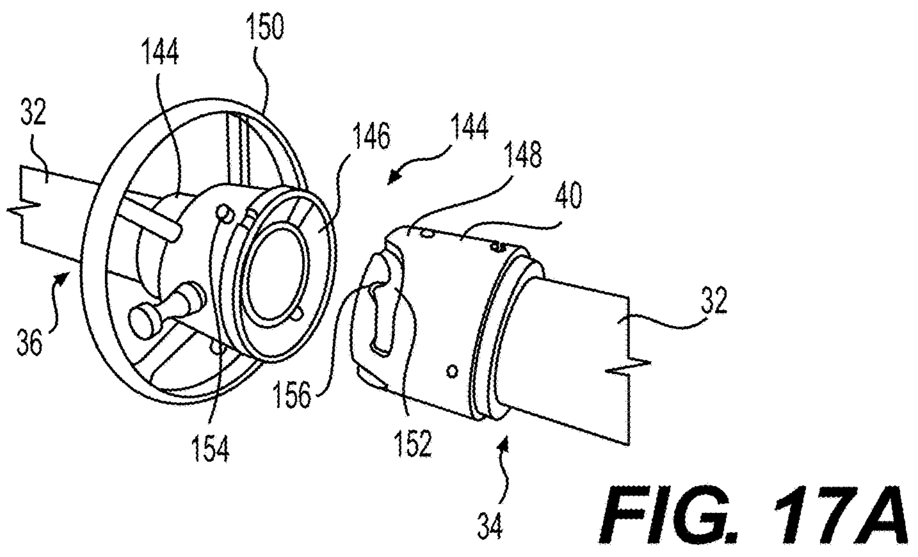
FIG. 17A is a perspective view of an example quick connect coupling for coupling two fuel lines to one another shown in an uncoupled condition according to embodiments of the disclosure.
Figure 17B:
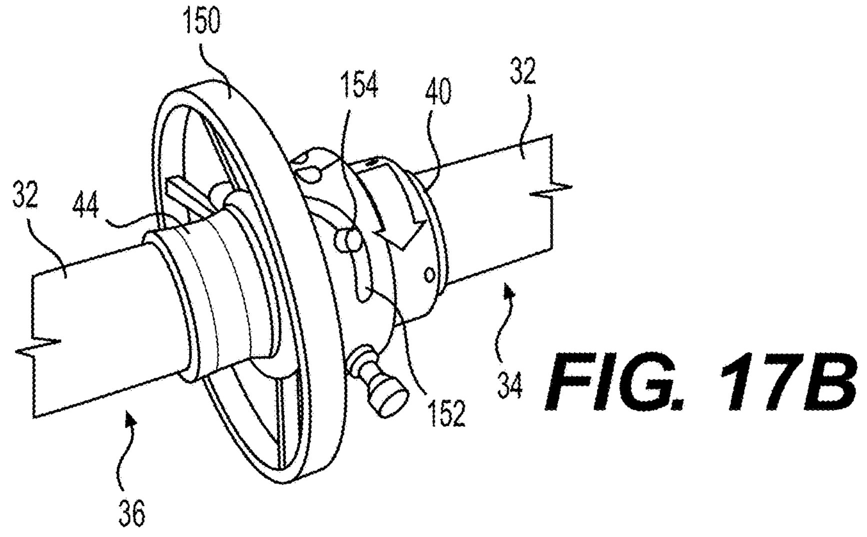
FIG. 17B is a perspective view of the example quick connect coupling shown in FIG. 17A shown in a coupled condition according to embodiments of the disclosure.

FIG. 17A is a perspective view of an example quick connect coupling 144 for coupling two fuel lines 146 to one another shown in an uncoupled condition according to embodiments of the disclosure. FIG. 17B is a perspective view of the example quick connect coupling 144 shown in FIG. 17A shown in a coupled condition according to embodiments of the disclosure. The quick connect coupling 144 may be used with the manifold lines 32 disclosed herein, for example, to couple an inlet end 34 of a first manifold line 32 to an outlet end 36 of a fuel line in flow communication with a fuel source and/or to an outlet end 36 of another manifold line 32 of another hydraulic fracturing unit 12 upstream relative to the first manifold line 32. In addition, the outlet end 36 of the first manifold line 32 may be coupled to an inlet end 34 of yet another manifold line 32 of yet another hydraulic fracturing unit 12 downstream relative to the first manifold line 32 or to a blocking device configured to prevent flow communication from the outlet end of the first manifold line 32. This example configuration may facilitate use of the manifold line 32 to connect manifold lines 32 of multiple hydraulic fracturing units 12 in series or individually to a fuel line from a fuel source.

As shown in FIG. 17A, an outlet end 36 of a first manifold line 32 may include an outlet coupling 44 of the quick connect coupling 144, and the inlet end 34 of a second manifold line 32 may include an inlet coupling 40 of the quick connect coupling 144. In some examples, this may be reversed. As shown in FIG. 17A, the example outlet coupling 44 may include an annular recess 146 configured to receive an annular projection 148 of the inlet coupling 40. In some examples, the outlet coupling 44 may also include a handle 150 (e.g., an annular handle) configured to facilitate rotation of the outlet coupling 44 relative to the inlet coupling 40, once the annular projection 148 is received in the annular recess 146 of the outlet coupling 44. The annular projection 148 may define a groove or slot 152 configured to receive a pin 154 associated with the annular recess 146. When coupling the outlet coupling 44 to the inlet coupling 40, the annular projection 148 is inserted into the annular recess 146, such that the pin 154 is aligned with a leading edge of the groove or slot 152, so that the annular projection 148 can be inserted into the annular recess 146, while twisting the outlet coupling 44 relative to the inlet coupling 40, so that the pin 154 travels in the groove or slot 152 until the pin 154 is able to engage a notch 156 in the groove or slot 152, thereby locking the rotational relationship between the outlet coupling 44 and the inlet coupling 40, for example, as shown in FIG. 17B, which shows the example couplings 40 and 44 engaged with one another. In some examples, the groove or slot 152 may be configured such that the outlet coupling 44 engages with the inlet coupling 40 upon twisting the outlet coupling 44 about one-quarter turn relative to the inlet coupling 40. Other amounts of relative twist for coupling are contemplated. In some examples, the quick connect coupling 144 may include one or more fluid seals configured to prevent fuel from leaking from the quick connect coupling 144. In some examples, the quick connect coupling shown in FIGS. 17A and 17B may include a pressure safety lock.

Figure 17C:
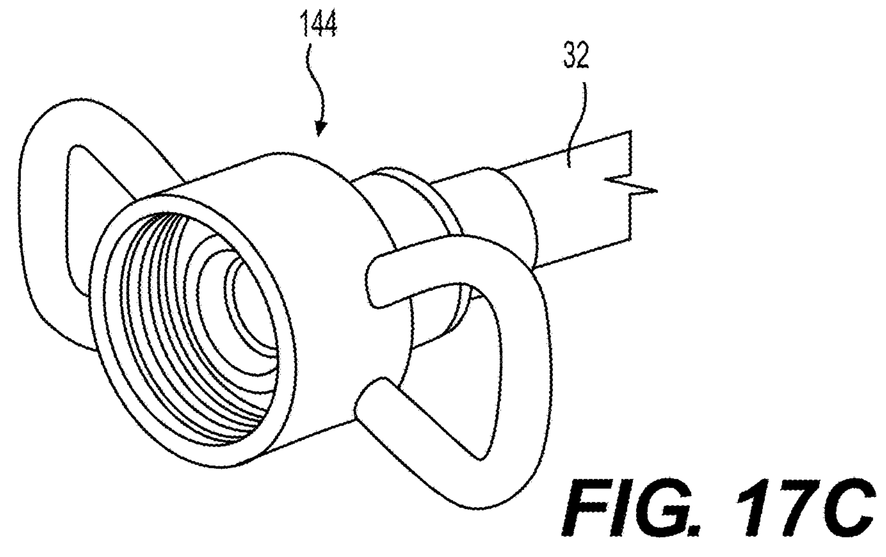
FIG. 17C is a perspective view of another example quick connect coupling for coupling two fuel lines to one another shown in an uncoupled condition according to embodiments of the disclosure.

FIG. 17C is a perspective view of one-half of another example quick connect coupling 144 for coupling two fuel lines to one another shown in an uncoupled condition according to embodiments of the disclosure. The example one-half quick connect coupling 144 shown in FIG. 17C may be configured to threadedly engage another half of the quick connect coupling 144 (e.g., via complimentary male and female threads). In some examples, the quick connect coupling 144 shown in FIG. 17C may include a transfer-loading safety quick coupler.

In some examples, the quick connect coupling 144 may facilitate quickly coupling two or more manifold lines 32 to one another, and/or quickly coupling a manifold line 32 to a fuel line from a fuel source, to a fuel hub, and/or to a blocking device configured to prevent the flow of fuel from the outlet end of the manifold line 32. This may facilitate connection and/or disconnection of manifold lines 32 during set-up or break-down of the hydraulic fracturing system 16. In some examples, the quick connect coupling 144 may facilitate such set-up and assembly without the use of tools. In some examples, the quick connect couplings 144 may help prevent improperly coupling two inlets to one another or two outlets to one another, which may prevent unintended problems with the fuel delivery system.

Figure 18:
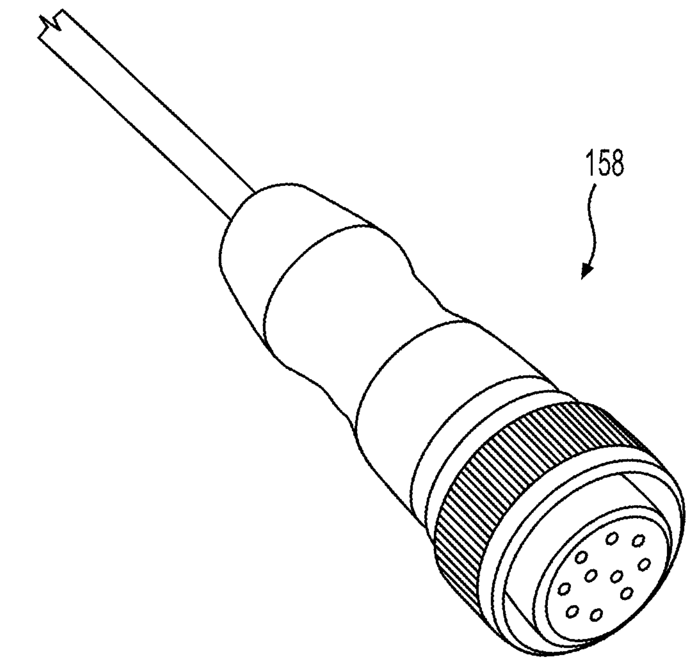
FIG. 18 is a perspective view of an example communications coupling for a communications cable according to embodiments of the disclosure.

FIG. 18 is a perspective view of an example communications coupling 158 for coupling a communications cable from one device to another device according to embodiments of the disclosure. In some examples, the communications coupling 158 may be configured to couple an end of a length of communications cable 104 of a communications assembly 102 associated with a hydraulic fracturing unit 12 to a communications interface of, for example, another hydraulic fracturing unit 12, a communications interface at a data center 106, and/or a communications interface at a communications hub 120, for example, such as those described herein. The communications coupling 158 may, in some examples, be configured to provide a weather-tight quick connection, for example, such as a mil-spec connector. The communications coupling 158 may include a mating pair (e.g., a plug and a receptacle), including a male (e.g., pin) or female (e.g., socket) contact. In some examples, one or more of the coupling halves (e.g., the male or female halves) and/or the respective contacts may be floating, for example, to minimize mechanical stress at the coupling 158. In some examples, the communication cables 104 may have a capacity ranging from 12 volts to 24 volts and may be shielded to prevent communication from high power energy sources from distorting signals communicated via the communications cables 104.

In some examples, the communications coupling 158 may facilitate quickly communicatively coupling two or more devices or machines to one another. This may facilitate connection and/or disconnection of communications cables 104 during set-up or break-down of the hydraulic fracturing system 16. In some examples, the communications coupling 158 may facilitate such set-up and assembly without the use of tools. In some examples, the communications couplings 158 may be configured to have unique communication coupling pairs to prevent coupling the communications cable 104 into an incorrect receptacle, thereby reducing the likelihood of an incorrect rigging and incorrect transfer of data. Other types of communications couplings are contemplated.

Figure 19:
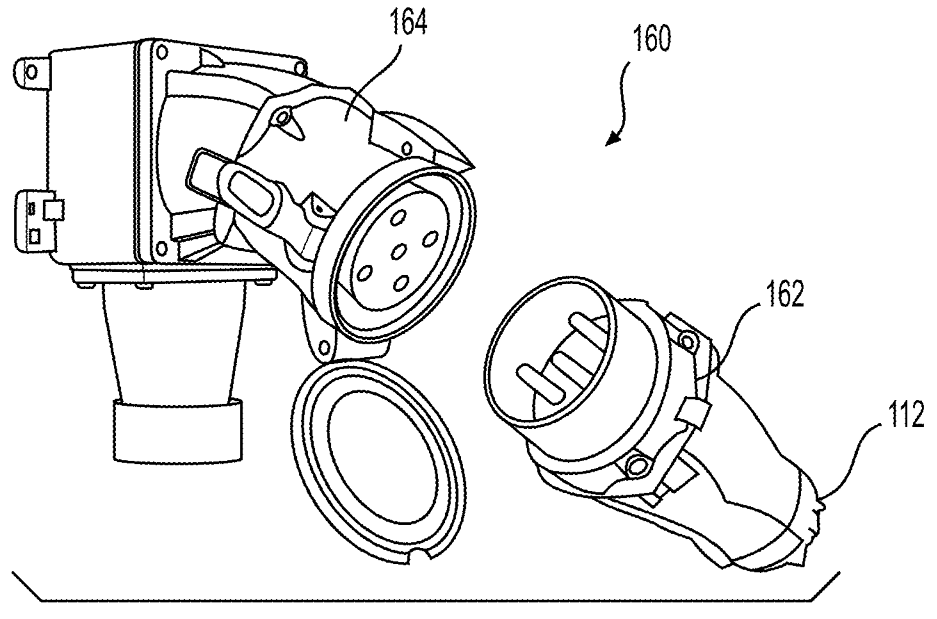
FIG. 19 is a perspective view of an example power coupling for coupling a power cable shown in an uncoupled condition according to embodiments of the disclosure.

FIG. 19 is a perspective view of an example power coupling 160 configured to couple a power cable 112 to a device according to embodiments of the disclosure. As shown in FIG. 19, the power coupling 160 may include a power plug 162 connected to an end of a power cable 112, and a power receptacle 164. For example, the power cable 112 may be connected to a first hydraulic fracturing unit 12, and the power receptacle 164 may be connected to another hydraulic fracturing unit 12, a power hub 122, and/or an electrical power source 116. The power plug 162 may be configured to be inserted into a power receptacle 164 to provide electric power transfer between a device or machine coupled to the power cable 112 and power plug 162, and the device or machine coupled to the power receptacle 164. In some examples, the power coupling 160 include a shore power connector-type that may be configured to be waterproof, locking, and/or capable of handling three-phase, 480 volts, and/or 400 amps, although power couplings of other types and/or having different capabilities are contemplated.

In some examples, the power coupling 160 may facilitate quickly electrically coupling two or more devices or machines to one another. This may facilitate connection and/or disconnection of power cables 112 during set-up or break-down of the hydraulic fracturing system 16. In some examples, the power coupling 160 may facilitate such set-up and assembly without the use of tools.

Having now described some illustrative embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is, therefore, to be understood that the embodiments described herein are presented by way of example only and that, within the scope of any appended claims and equivalents thereto, the invention may be practiced other than as specifically described.

This application is a continuation of U.S. Non-Provisional application Ser. No. 18/213,468, filed Jun. 23, 2023, titled "FUEL, COMMUNICATIONS, AND POWER CONNECTION SYSTEMS AND RELATED METHODS," which is a continuation of U.S. Non-Provisional application Ser. No. 17/895,757, filed Aug. 25, 2022, titled "FUEL, COMMUNICATIONS, AND POWER CONNECTION SYSTEMS AND RELATED METHODS," now U.S. Pat. No. 11,761,846, issued Sep. 19, 2023, which is a continuation of U.S. Non-Provisional application Ser. No. 17/717,328, filed Apr. 11, 2022, titled "FUEL, COMMUNICATIONS, AND POWER CONNECTION SYSTEMS AND RELATED METHODS," now U.S. Pat. No. 11,460,368, issued Oct. 4, 2022, which is a divisional of U.S. Non-Provisional application Ser. No. 15/929,708, filed May 18, 2020, titled "FUEL, COMMUNICATIONS, AND POWER CONNECTION SYSTEMS AND RELATED METHODS," now U.S. Pat. No. 11,604,113, issued Mar. 14, 2023, which claims priority to and the benefit of U.S. Provisional Application No. 62/900,100, filed Sep. 13, 2019, titled "ON BOARDING HOSES AND ELECTRICAL CONNECTIONS," U.S. Provisional Application No. 62/900,112, filed Sep. 13, 2019, titled "FUEL LINE CONNECTION SYSTEM AND METHODS FOR SAME," and U.S. Provisional Application No. 62/704,401, filed May 8, 2020, titled "FUEL, COMMUNICATIONS, AND POWER CONNECTION SYSTEMS AND RELATED METHODS," the entire disclosures of all of which are incorporated herein by reference.

Furthermore, the scope of the present disclosure shall be construed to cover various modifications, combinations, additions, alterations, etc., above and to the above-described embodiments, which shall be considered to be within the scope of this disclosure. Accordingly, various features and characteristics as discussed herein may be selectively interchanged and applied to other illustrated and non-illustrated embodiment, and numerous variations, modifications, and additions further can be made thereto without departing from the spirit and scope of the present invention as set forth in the appended claims.

What is claimed is:

1. A hydraulic fracturing system comprising:
a plurality of hydraulic fracturing units, each of the hydraulic fracturing units comprising:
a chassis;
a reciprocating pump connected to the chassis and configured to pump fracturing fluid; and
a gas turbine engine connected to the chassis and configured to convert fuel into a power output for operating the reciprocating pump;
a frac manifold;
a system for supplying fuel, comprising:
a main fuel manifold to supply fuel from a fuel source to:
(i) a first gas turbine engine of a first of a plurality of hydraulic fracturing units,
(ii) a second gas turbine engine of a second of the plurality of the hydraulic fracturing units, and
(iii) a third gas turbine engine of a third of the plurality of the hydraulic fracturing units,
the main fuel manifold in flow communication with a plurality of fuel line connection assemblies comprising:
a first distribution line in flow communication with the main fuel manifold and the first gas turbine engine;
a second distribution line in flow communication with the main fuel manifold and the second gas turbine engine; and
a third distribution line in flow communication with the main fuel manifold and the third gas turbine engine.

2. The hydraulic fracturing system of claim 1, wherein the main fuel manifold is disposed on the frac manifold.

3. The hydraulic fracturing system of claim 1, wherein at least a portion of the main fuel manifold is disposed between the frac manifold and at least one of the plurality of hydraulic fracturing units.

4. The hydraulic fracturing system of claim 1, wherein the main fuel manifold is connected to the frac manifold.

5. The hydraulic fracturing system of claim 1, wherein the frac manifold is located on a frac manifold trailer.

6. The hydraulic fracturing system of claim 5, wherein the main fuel manifold is connected to the frac manifold trailer.

7. The hydraulic fracturing system of claim 1, wherein the main fuel manifold comprises a first fuel line and a second fuel line.

8. The hydraulic fracturing system of claim 7, wherein the first fuel line and the second fuel line run along a length of the frac manifold.

9. The hydraulic fracturing system of claim 7, wherein the first fuel line and the second fuel line are connected to the frac manifold.

10. The hydraulic fracturing system of claim 7, wherein the frac manifold is located on a frac manifold trailer, and wherein the first fuel line and the second fuel line are mounted on the frac manifold trailer.

11. The hydraulic fracturing system of claim 1, wherein the fuel source comprises field gas, line gas, CNG, or combinations thereof.

12. A hydraulic fracturing unit, comprising:
a gas turbine engine operably connected to a pump; and
a fuel line connection assembly comprising:
a distribution line having an inlet end and an outlet end, the inlet end connected to one of a plurality of fuel manifolds and configured to provide flow communication between the fuel manifold and the gas turbine engine;
an inlet coupling proximate the inlet end and configured to be connected to a fuel line providing flow communication with a fuel source via the fuel manifold;
an outlet coupling proximate the outlet end and configured to be connected to the gas turbine engine; and
a valve positioned in the distribution line and configured to change between an open condition through which fluid flows and a closed condition preventing fluid flow,
wherein the fuel line connection assembly is configured to be in flow communication with a first outlet of a plurality of outlets of the fuel manifold that are each configured to discharge fuel from the fuel source;
each fuel manifold of the plurality of fuel manifolds is configured to provide an independent fuel supply from the fuel source; and
a transfer line is configured to provide flow communication between the plurality of fuel manifolds.

13. The hydraulic fracturing unit of claim 12, further comprising a blocking device connected to the first outlet of the fuel manifold.

14. The hydraulic fracturing unit of claim 12, further comprising a controller in communication with the valve and configured to cause operation of the valve.

15. The hydraulic fracturing unit of claim 12, further comprising a filter disposed in a flow path between the fuel manifold and the gas turbine engine, the filter configured to filter one or more of particulates or liquids from fuel in flow communication with the gas turbine engine.

16. A hydraulic fracturing unit, comprising:
a gas turbine engine operably connected to a pump; and
a fuel line connection assembly comprising:
a manifold line having an inlet end and an outlet end, the inlet end connected to one of a plurality of fuel manifolds and configured to provide flow communication between the fuel manifold and the gas turbine engine;
an inlet coupling proximate the inlet end and configured to be connected to a fuel line providing flow communication with a fuel source via the fuel manifold;
an outlet coupling proximate the outlet end and configured to be connected to the gas turbine engine; and
a valve positioned in the manifold line and configured to change between an open condition through which fluid flows and a closed condition preventing fluid flow,
wherein the fuel line connection assembly is configured to be in flow communication with a first outlet of a plurality of outlets of the fuel manifold that are each configured to discharge fuel from the fuel source;
each fuel manifold of the plurality of fuel manifolds is configured to provide an independent fuel supply from the fuel source; and
a transfer line is configured to provide flow communication between the plurality of fuel manifolds.

17. The hydraulic fracturing unit of claim 16, further comprising a blocking device connected to the first outlet of the fuel manifold.

18. The hydraulic fracturing unit of claim 16, further comprising a plurality of blocking devices, each of the plurality of blocking devices being connected to each of the plurality of outlets the fuel manifold.

19. The hydraulic fracturing unit of claim 16, further comprising a controller in communication with the valve and configured to cause operation of the valve.

20. The hydraulic fracturing unit of claim 16, further comprising a filter disposed in a flow path between the fuel manifold and the gas turbine engine, the filter configured to filter one or more of particulates or liquids from fuel in flow communication with the gas turbine engine.

* * * * *